United States Patent
Nakamichi et al.

(10) Patent No.: US 6,226,265 B1
(45) Date of Patent: *May 1, 2001

(54) PACKET FLOW MONITOR AND CONTROL SYSTEM

(75) Inventors: Koji Nakamichi; Takeshi Kawasaki; Tomohiro Ishihara; Toshio Soumiya; Masato Okuda; Michio Kusayanagi; Naotoshi Watanabe; Masafumi Katoh; Toshiyuki Sudo, all of Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/679,362

(22) Filed: Jul. 8, 1996

(30) Foreign Application Priority Data

| Jul. 25, 1995 | (JP) | ................................................. 7-189134 |
| Aug. 29, 1995 | (JP) | ................................................. 7-219987 |
| Dec. 14, 1995 | (JP) | ................................................. 7-325414 |

(51) Int. Cl.[7] .............................. H04J 1/16; H04L 12/28

(52) U.S. Cl. ............................................ 370/235; 370/395

(58) Field of Search ........................................ 370/229–236, 370/249, 252, 253, 395, 397, 409, 414, 418, 444, 454, 465, 503, 509, 510, 543, 545, 905

(56) References Cited

U.S. PATENT DOCUMENTS

| 5,390,299 | * | 2/1995 | Rege et al. ............................ 370/232 |
| 5,414,697 | | 5/1995 | Osaki . | |
| 5,434,984 | * | 7/1995 | Deloddere et al. ................... 395/325 |
| 5,515,359 | * | 5/1996 | Zheng ................................... 340/235 |
| 5,519,689 | * | 5/1996 | Kim ...................................... 370/232 |
| 5,524,006 | * | 6/1996 | Hluchyj et al. ....................... 370/233 |
| 5,541,926 | * | 7/1996 | Saito et al. ............................ 370/395 |
| 5,568,468 | * | 10/1996 | Ogasawara et al. .................. 370/230 |
| 5,675,384 | * | 10/1997 | Ramamurthy et al. ............... 370/468 |
| 5,745,478 | * | 4/1998 | Van Der Wal ........................ 370/234 |
| 5,757,780 | * | 5/1998 | Janczyk ................................ 370/253 |
| 5,784,358 | * | 7/1998 | Smith et al. .......................... 370/230 |

FOREIGN PATENT DOCUMENTS

| 0 366 635 | 5/1990 | (EP) . |
| 0 499 150 A1 | 8/1992 | (EP) . |
| 0 647 081 A2 | 4/1995 | (EP) . |
| 0651537 | 5/1995 | (EP) . |
| WO 95/19077 | 7/1995 | (WO) . |

* cited by examiner

Primary Examiner—Chau Nguyen
Assistant Examiner—Chiho Andrew Lee
(74) Attorney, Agent, or Firm—Helfgott & Karas, P C.

(57) ABSTRACT

In a first UPC, a PCR is set as a monitor rate for each connection. If a transfer rate of a cell exceeds the PCR set for the connection, the cell is discarded. In a second UPC, an ACR is set as a monitor rate for each connection. If the transfer rate of the cell exceeds the ACR set for the connection, a lower priority is assigned to that cell. Additionally, with a configuration where one UPC monitors a varying rate, a parameter change process is controlled by obtaining a time between a passage time of a detected B-RM cell and an arrival of a user cell and comparing the obtained time with maximum and minimum delay standard values. A parameter table including some parameters is provided. A header of an arrived cell in a forward direction is extracted, and it is determined whether or not the arrived cell is a violation cell using the leaky bucket algorithm, etc. If the arrived cell is a violation cell, it is discarded. An RM cell in a backward direction is received and extracted, and the parameter table is updated by calculating the minimum cell interval, etc. based on data included in a payload of the RM cell.

18 Claims, 49 Drawing Sheets

| Field | Bytes |
|---|---|
| GFC/VPI \| VPI | 1 |
| VPI \| VCI | 1 |
| VCI | 1 |
| VCI \| PT \| CLP | 1 |
| CRC | 1 |
| RM PROTOCOL ID | 1 |
| DIR \| BN \| CI \| NI \| RA \| Res \| Res \| Res | 1 |
| ER | 2 |
| CCR | 2 |
| MCR | 2 |
| QL | 4 |
| SN | 4 |
| Res | 30 |
| Res \| CRC | 1 |
| CRC | 1 |

The first 5 rows form the HEADER.

FIG. 3  PRIOR ART

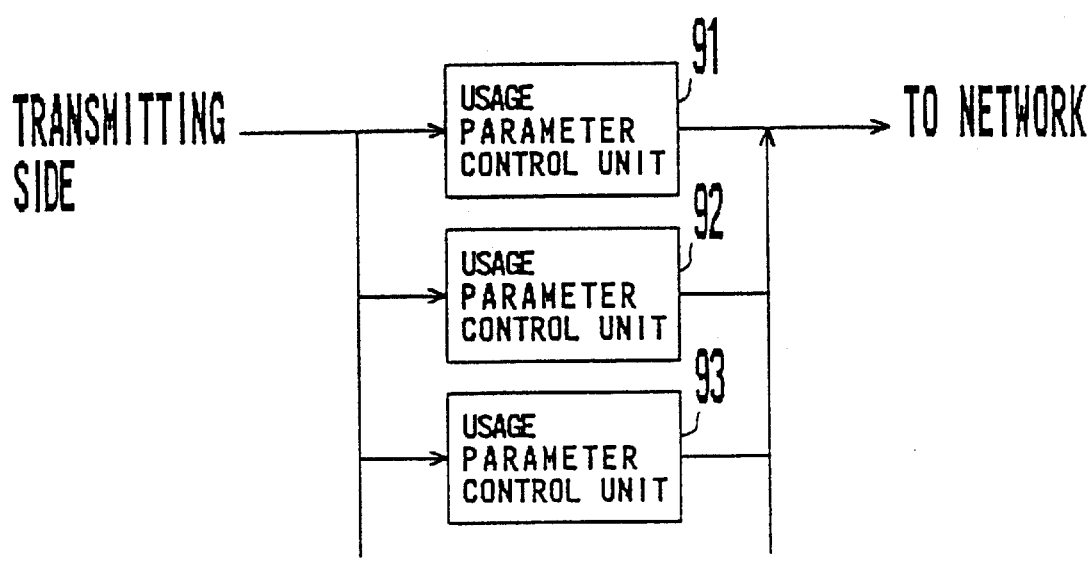
F I G. 9

| | VCI/VPI | MONITOR RATE PARAMETER |
|---|---|---|
| FIRST UPC | #1 | PCR (#1) |
| | #2 | PCR (#2) |
| | #3 | PCR (#3) |
| | ... | ... |
| SECOND UPC | #1 | MCR (#1) |
| | #2 | MCR (#2) |
| | #3 | MCR (#3) |
| | ... | ... |

133

1: VCI/VPI OF CONNECTION 1
2: VCI/VPI OF CONNECTION 2
3: VCI/VPI OF CONNECTION 3

PCR(#1): PCR VALUE OF CONNECTION 1
PCR(#2): PCR VALUE OF CONNECTION 2
PCR(#3): PCR VALUE OF CONNECTION 3

MCR(#1): MCR VALUE OF CONNECTION 1
MCR(#2): MCR VALUE OF CONNECTION 2
MCR(#3): MCR VALUE OF CONNECTION 3

FIG. 13

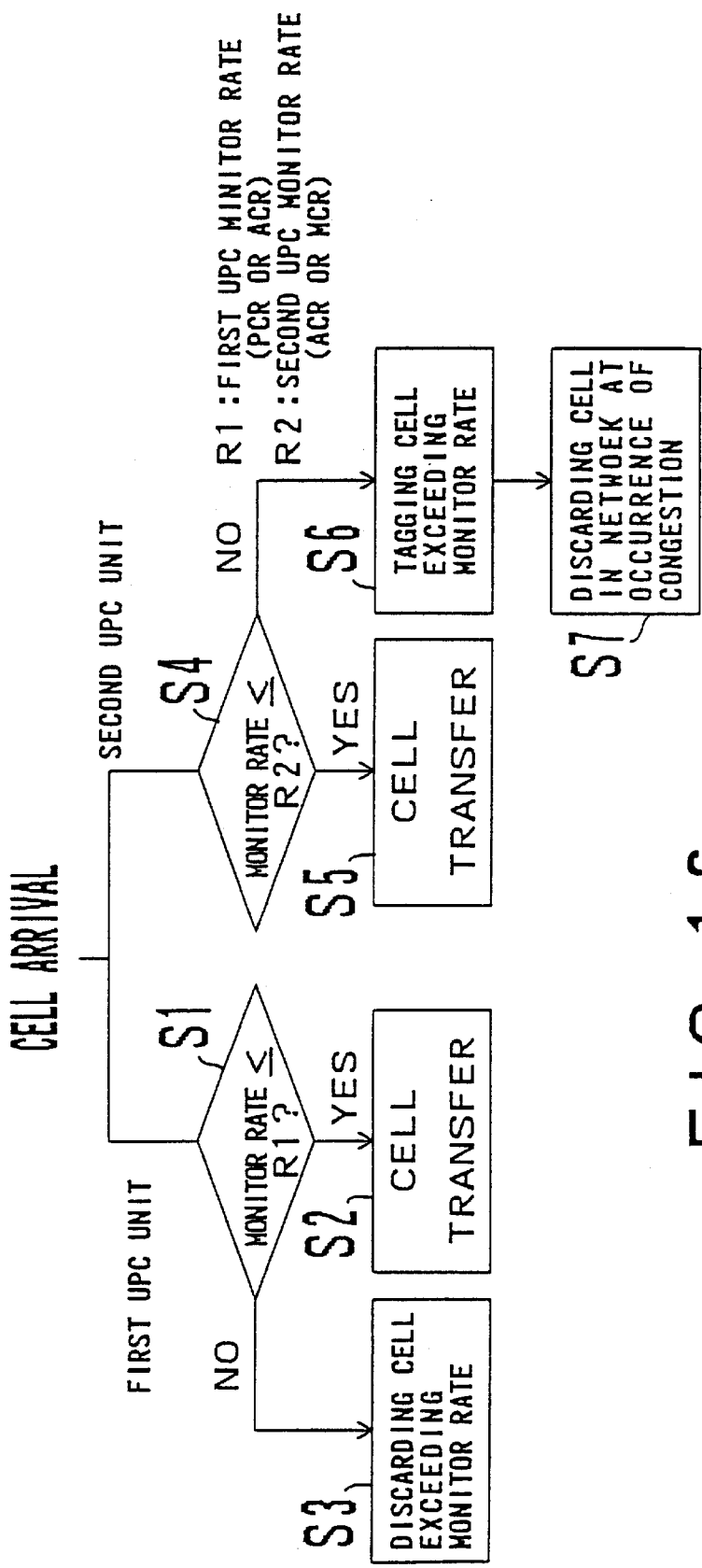
F I G. 16

| IDENTIFICATION FLAG bit | VCI/VPI | MONITOR RATE PARAMETER |
|---|---|---|
| 0 | #1 | PCR(#1) |
| | #2 | PCR(#2) |
| | #3 | PCR(#3) |
| | ... | ... |
| 1 | #1 | MCR(#1) |
| | #2 | MCR(#2) |
| | #3 | MCR(#3) |

152

IDENTIFICATION FLAG 0 : FOR NORMAL MONITORING
IDENTIFICATION FLAG 1 : FOR CONGESTION MONITORING

1 : VCI/VPI OF CONNECTION 1
2 : VCI/VPI OF CONNECTION 2
3 : VCI/VPI OF CONNECTION 3

PCR(#1) : PCR VALUE OF CONNECTION 1
PCR(#2) : PCR VALUE OF CONNECTION 2
PCR(#3) : PCR VALUE OF CONNECTION 3

MCR(#1) : MCR VALUE OF CONNECTION 1
MCR(#2) : MCR VALUE OF CONNECTION 2
MCR(#3) : MCR VALUE OF CONNECTION 3

F I G. 2 1

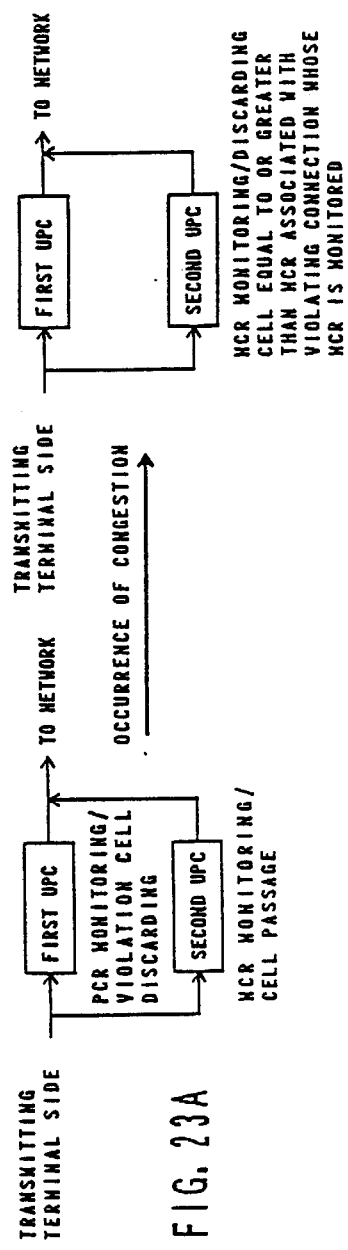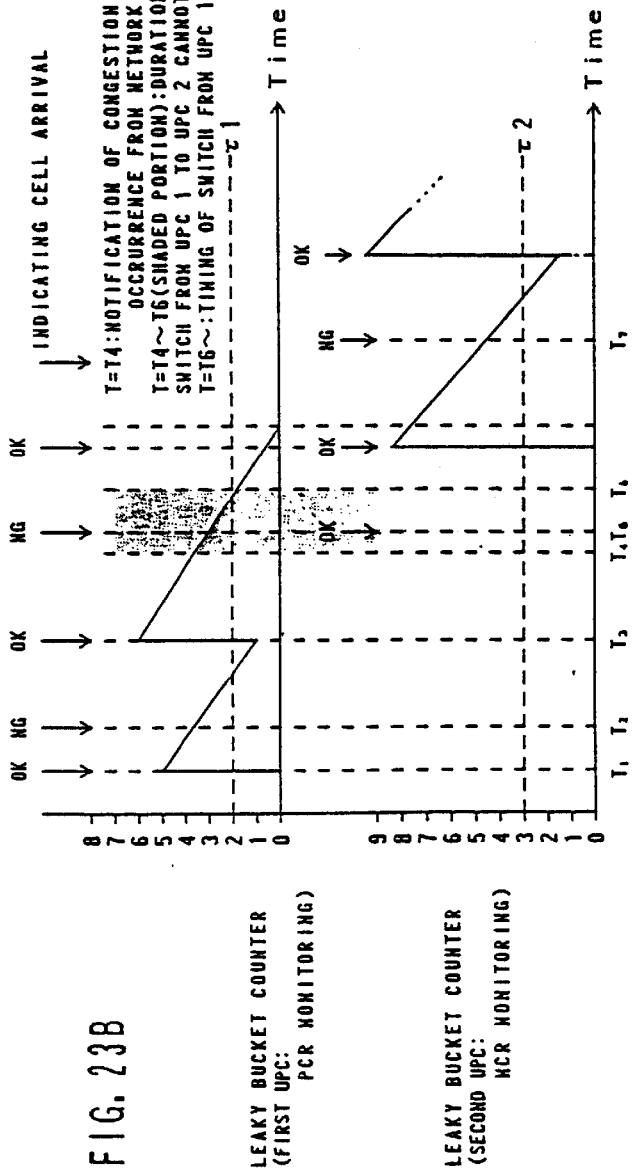

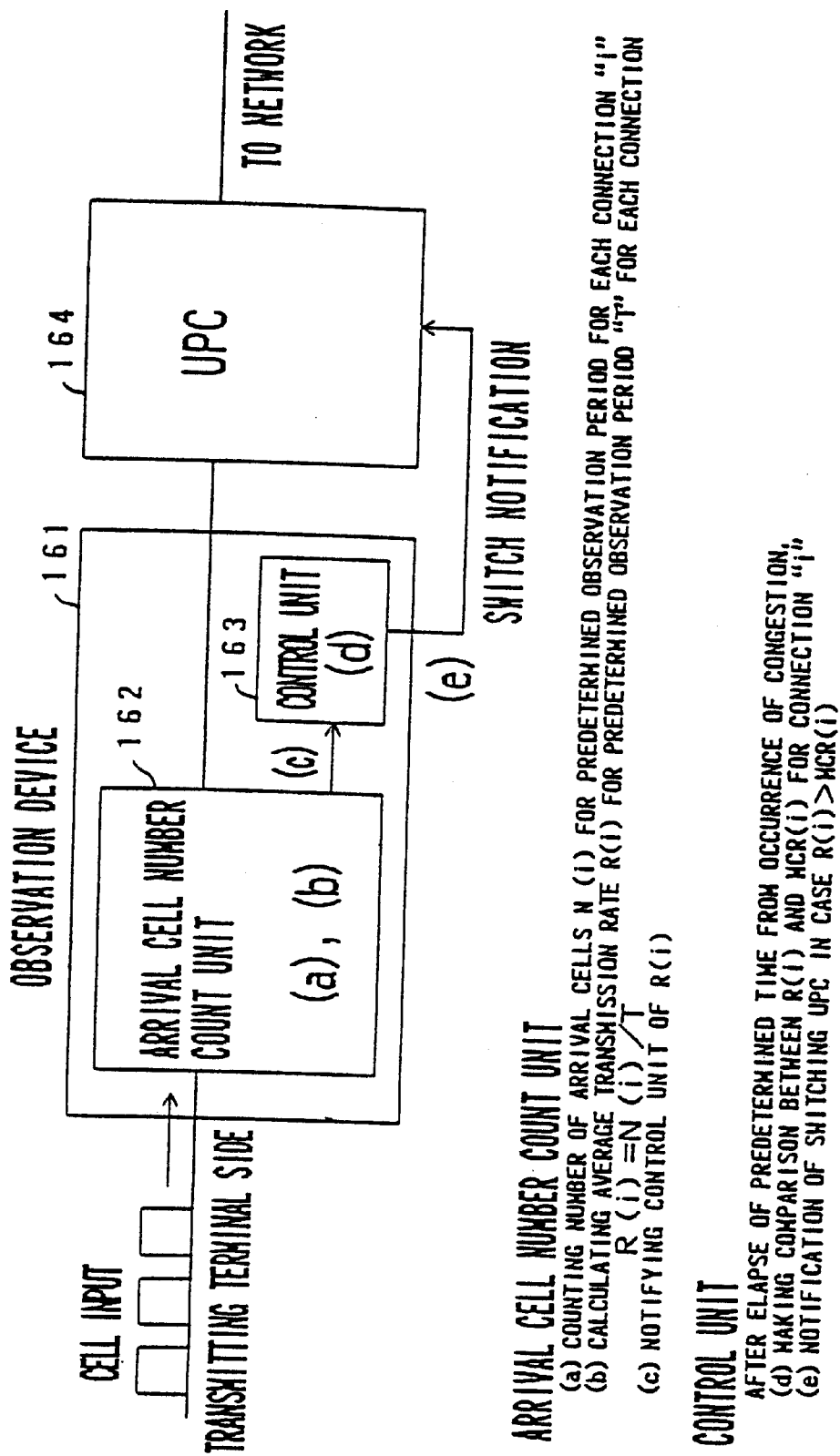

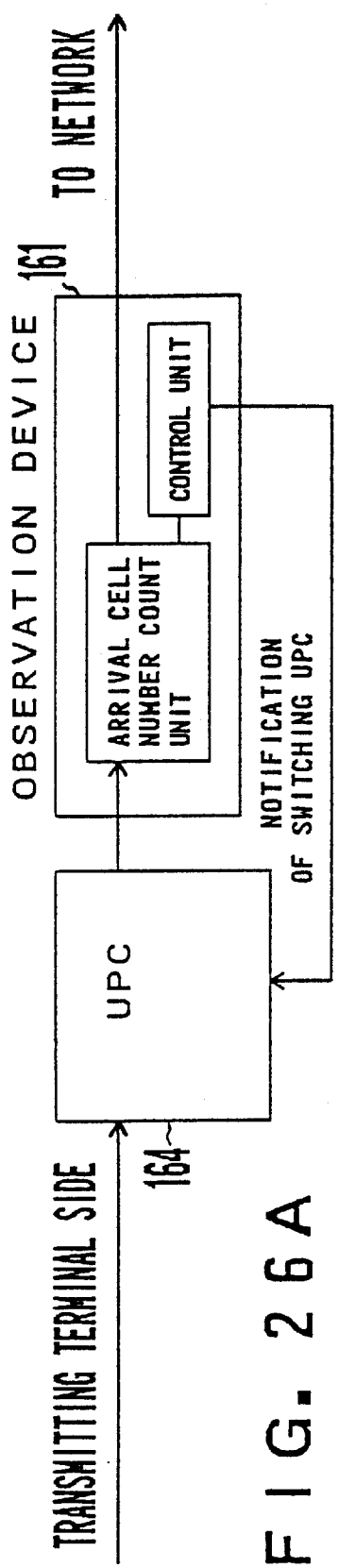
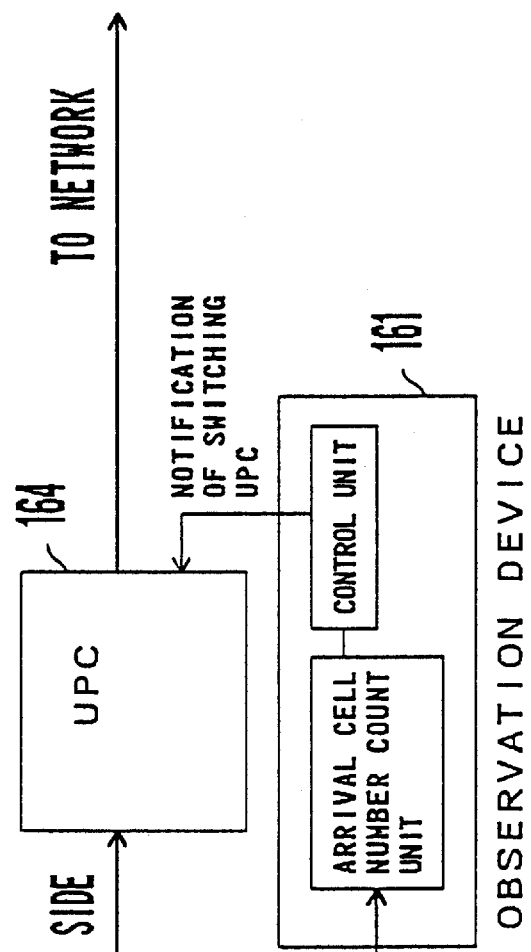
F I G. 2 6 A
F I G. 2 6 B

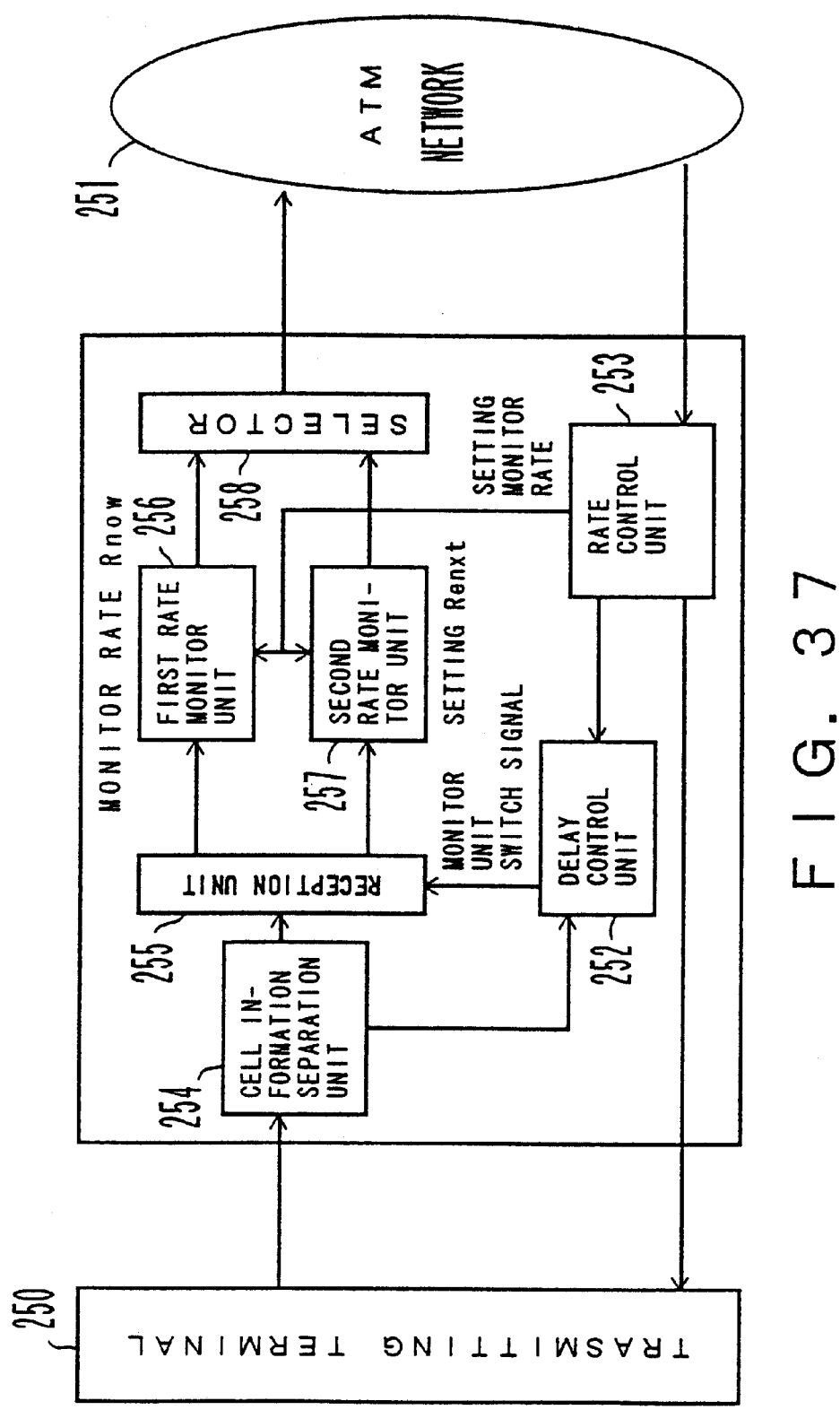
F I G. 37

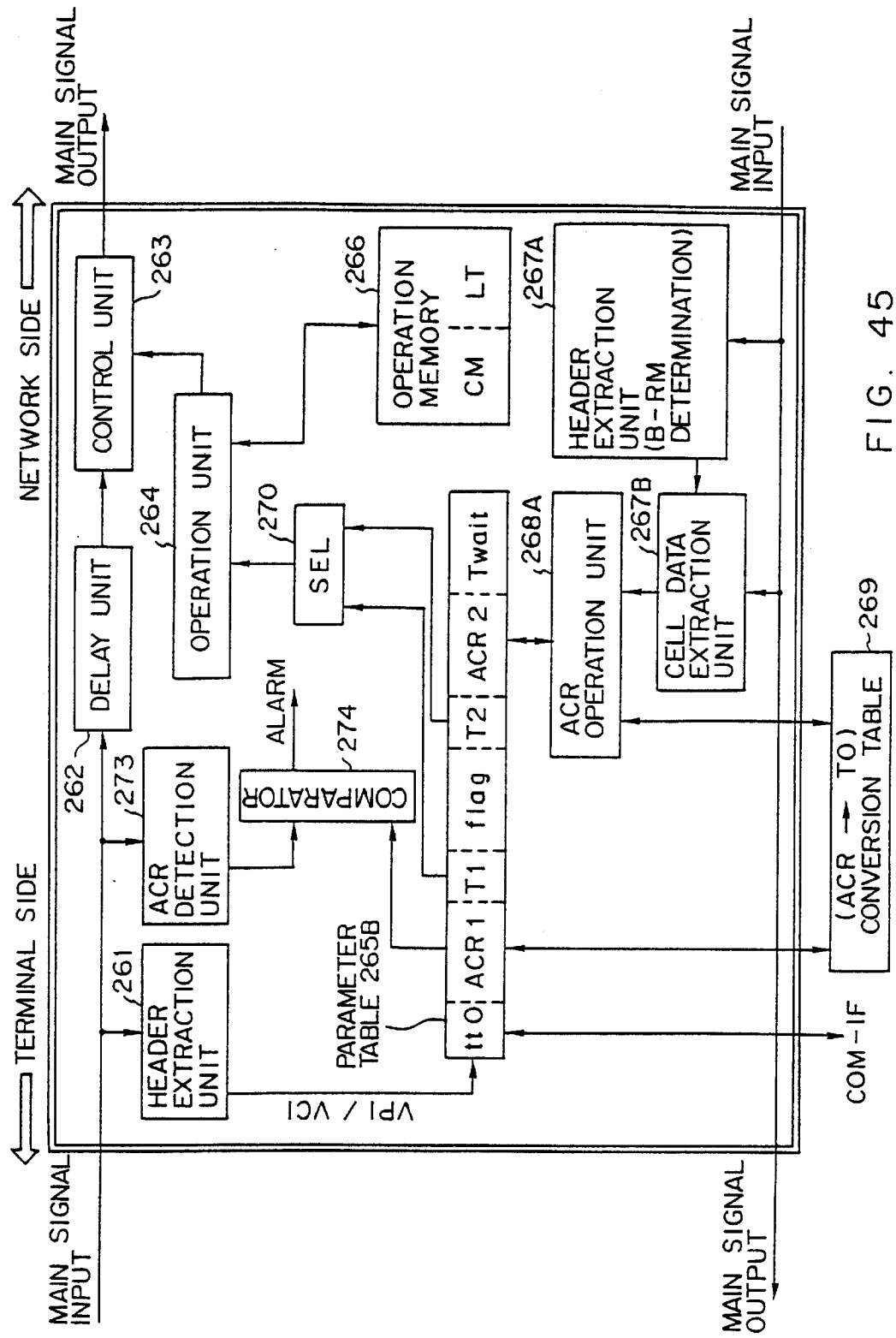
F I G. 45

PACKET FLOW MONITOR AND CONTROL SYSTEM

BACKGROUND OF THE INVENTION

1. Field of the Invention

The present invention relates to a system for monitoring a flow of packets in a network, and particularly relates to a system for monitoring a flow of cells of an ABR communication in an ATM network.

2. Description of the Related Arts

In recent years, a service handling various types of communications, including image data which requires a higher transmission speed, in addition to voice data, text data, etc., has become more and more essential. The core technique of such a service is an ATM (Asynchronous Transfer Mode) method.

The ATM method takes advantage of a cell where control information called a header is added to its payload, divided into a fixed length of 48 octets, as a data transmission unit (data exchange unit).

Currently, discussions about an ABR (Available Bit Rate) service class are frequently made as a method for applying the ATM technique to a high-speed data communication network such as a LAN, a WAN, etc. In the ABR service class, congestion control is performed between a network and a terminal for each connection.

A CBR (Constant Bit Rate) service which allocates a fixed transmission band for each connection, monitors a maximum request band PCR, while a VBR (Variable Bit Rate) service which dynamically allocates a transmission band for each connection according to band information managed by a CAC (Call Admission Control), monitors the maximum request band PCR and an average request band SCR (Sustainable Cell Rate), in order to perform a congestion control using respective results of monitoring the above described bands.

For the ABR communication, a minimum available band MCR (Minimum Cell Rate) and the maximum request band PCR (Peak Cell Rate), are set by a negotiation between a user and a network, when a call is established. These settings are made by the CAC for each connection.

Also for the ABR communication, a data transmitting terminal transmits a cell called an RM (Resource Management) cell for each predetermined number of transmission data cells. The network or a receiving terminal writes control information indicating whether or not resource information or congestion occurs in the network, etc., to the RM cell, and returns that RM cell to the transmitting terminal. When receiving the RM cell to which the control information, etc. is written, the transmitting terminal calculates a transmission allowed band ACR (Allowed Cell Rate) according to the control information. The ACR is a cell rate at which the transmitting terminal is allowed to perform a transmission to a network (cell transfer speed). This cell rate varies between the minimum available band MCR and the maximum request band PCR. The transmitting terminal transmits a cell at a transfer rate within an allowable range of the ACR transfer rate. Thus, for the ABR communication, a cell rate at which a transmitting terminal is allowed to perform a transmission to a network is determined depending on a use state of a network by using feedback control.

If a network is not in congestion state, a transmitting terminal can transmit a cell in the maximum request band PCR. If the network is in congestion state, the transmitting terminal recognizes the congestion state by an RM cell fed back from the network, and progressively reduces a size of an ACR. The minimum value of the ACR is an MCR. Assume that the ACR at a certain transmitting terminal is the MCR. If the transmitting terminal transmits a cell at a transmission rate equal to or higher than the MCR (that is, if the transmitting terminal transmits the cell beyond the transmission-allowable range), the congestion state continues. This is because a large amount of cells flow into the network even though the network is in the congestion state. Even if the network is in a normal state (not in congestion state), the network may often enter a congestion state when the transmitting terminal transmits a cell at a transmission rate equal to or higher than the PCR or the ACR.

To prevent a network from entering congestion state, a process such as monitoring a flow of cells (an amount of data) at an entry point of the network, discarding a cell which violates a predetermined transmission rate (a PCR or an MCR), etc. must be performed. As a method for monitoring the flow of cells, a method for making a comparison between an actual flow of cells and a predetermined transmission rate (a PCR or an MCR) can be considered.

As described above, for the ATM technique which is the basic technique of a B-ISDN (Broadband-Integrated Service Digital Network), a usage parameter control technique (or a polcing technique) for controlling a flow of cells by determining whether or not a flow of user cells from a user terminal into an ATM network exceeds a value set by a user, becomes essential.

With the usage parameter control technique UPC, a flow of user cells is measured for each connection such as a virtual path (VP), a virtual channel (VC), etc., and a comparison between the flow of user cells and an amount of flow set by the user is made. As a result of the comparison, a violation cell is discarded or tagged (attached with a violation tag). As such a congestion control method in an ATM network, the above described ABR (Available Bit Rate) method is known.

A service implemented by the ABR method monitors a congestion caused by a concentration of traffic. If a congestion occurs, the transmission rate at a transmitting terminal must be lowered. To lower the transmission rate, it is currently being discussed to notify the transmitting terminal of a currently allowable transmission rate or a currently occurring congestion, so that the transmitting terminal which receives the notification can voluntarily lower its transmission rate.

With the service implemented by the ABR method, a user terminal reports a minimum cell rate (MCR), a peak cell rate (PCR), etc., when establishing a call, and transmits data based on these parameters. A network instructs the user terminal to vary an ACR (Allowed Cell Rate) according to its congestion state, depending on need. The usage parameter control UPC implemented by the ABR method performs a usage parameter control for the varying ACR.

FIG. 1 is a schematic showing an ATM network.

The ATM network is configured by, for example, interconnecting an arbitrary number of ATM switches (SWs), and arranging a virtual path VP and a virtual channel VC between a transmitting terminal and a receiving terminal as shown in FIG. 1, in order to transmit an ATM cell. In this case, a usage parameter control unit UPC monitoring if a user transmits cells as set is positioned at an entry point of the ATM network.

The usage parameter control UPC determines whether or not an arrived cell is a violation cell. If the arrived cell is determined to be a violation cell, it is discarded or tagged. The leaky bucket algorithm, for example, is recommended as a standard algorithm by the ITU-T, etc. The virtual scheduling algorithm equivalent to the leaky bucket algorithm is also well-known.

FIGS. 2A and 2B are schematics showing a notification process of a congestion. 21 indicates a user transmitting terminal. 22 indicates a user receiving terminal. 23 and 24 indicate switches such as an ATM switch (SW1 and SW2). The ATM network is configured by these switches 23 and 24. FIG. 2A is a schematic diagram showing a congestion notification method implemented by a forward notification, while FIG. 2B is a schematic diagram showing a congestion notification method implemented by a backward notification.

User cells are transmitted from the user terminal 21, and an RM cell is inserted as a control cell for each predetermined number of user cells. When it receives the RM cell, the receiving terminal 22 returns the RM cell. In this case, the RM cell transmitted from the transmitting terminal 21 to the receiving terminal 22 is called an F-RM (Forward RM) cell, while the RM cell transmitted from the receiving terminal 22 to the transmitting terminal 21 is called a B-RM (Backward RM) cell.

FIG. 3 shows a format of a resource management cell (RM cell) which performs a congestion notification, a transmission rate notification, etc. A 5-byte header is composed of a GFC which is a 4-bit controller for performing a general flow control, a VPI which is an 8- or 12-bit virtual path identifier, a VCI which is a 16-bit virtual channel identifier, a PT which indicates a 3-bit payload type, a CLP which displays a 1-bit cell loss priority, and a CRC which is an 8-bit controller for performing a header error control. For the PT, for example, a bit pattern "000" indicates a user cell in a non-congestion state, and a bit pattern "110" indicates a resource management cell.

A 48-byte payload of the resource management cell is composed of a 1-byte resource management protocol identifier "RM Protocol ID", another one byte including fields such as a 1-bit DIR (Direction) field, a 1-bit BN (Backward Explicit Congestion Notification) field, a 1-bit CI (Congestion Indication) field, a 1-bit NI (No Increase: invariable cell) field, a 1-bit RA (Request/Acknowledge) field, and 3-bits of unused fields (Res), a 2-byte ER (Explicit Cell Rate) field, a 2-byte CCR (Current Cell Rate) field, a 2-byte MCR (Minimum Cell Rate) field, a 4-byte QL (Queue Length) field, a 4-byte SN (Sequence Number) field, 30-bytes and 6-bits of unused fields (Res), and 10-bit CRC (Cyclic Redundancy Check) fields.

The GFC/VPI included in the header is used as a flow control GFC for a user network interface (UNI), while it is used as part of a virtual path identifier VPI for a network node interface (NNI). Accordingly, the virtual path identifier VPI is 8 bits for the UNI, while it is 12 bits for the NNI.

The DIR (Direction) is a direction instructing bit. The value "0" indicates an F-RM cell, and the value "1" indicates a B-RM cell. The BN is a backward congestion notification bit indicating a B-RM cell generated in a switch (SW) in an ATM network or in a receiving terminal. The CI is a congestion indication bit, the NI is an invariable cell rate bit, and the RA is a request/acknowledgement bit not used in an ABR service.

The ER is a 2-byte allowed cell rate, the CCR is a 2-byte current cell rate, the QL is a 4-byte queue length not used in the ABR service, and the SN is a 4 byte sequence number. The resource management cell also includes 30-bytes and 6-bits of unused fields (Res), and a 10-bit CRC (Cyclic Redundancy) field at the end of the format.

The RM cell configured as above is transmitted from a transmitting terminal to a receiving terminal via a plurality of switches (SWs). When a congestion occurs in an ATM network, the EFCI (Explicit Forward Congestion Indication) bit in the user cell passing through the congested SW may be set, or an allowed cell rate in the plurality of switches (SWs) may be written to an ER field of the RM cell. The receiving terminal which receives a RM cell returns that cell to the transmitting terminal. When receiving terminal turns a RM cells, the receiving terminal set a congestion indication flag in the RM cell if the previous user cell's EFCI is set. The receiving terminal which receives such an RM cell returns that cell. The transmitting terminal determines whether or not a congestion occurs according to the returned RM cell, and controls a cell transmission rate according to a result of the determination. That is, in the above described ABR service, the transmitting terminal controls the transmission rate depending on a state of the ATM network.

In the ATM network, a usage parameter control unit UPC is used for monitoring if cells are transmitted as set by a user as described above, and the cells are monitored using, for example, the leaky bucket algorithm.

When transmitting an F-RM cell, the transmitting terminal sets a peak cell rate PCR set by the user in an allowed cell rate field ER of the F-RM cell when a call is established. Additionally, the transmitting terminal sets an allowed cell rate ACR in a current cell rate field CCR, and sets the minimum cell rate in a minimum cell rate field MCR. When receiving a B-RM cell, the transmitting terminal can raise a cell rate within an allowable range of the PCR according to a predetermined rule if a congestion indication bit CI does not indicate an occurrence of a congestion, and if a no increase bit NI indicates that the cell rate can be raised. If the congestion indication bit CI indicates the occurrence of the congestion, the cell rate must be dropped in a range not lower than the MCR according to a predetermined rule.

With the congestion notification method implemented by a forward notification shown in FIG. 2A, an explicit forward congestion indication (EFCI) bit of a cell transmitted to a receiving terminal 22 is set to "1", when a congestion marked with an asterisk occurs in a switch 23. The receiving terminal 22 terminates a user cell, and returns an F-RM cell as a B-RM cell whose congestion indication bit CI is set to "1" by the receiving terminal, to the transmitting terminal 21. When receiving the B-RM cell where the congestion indication bit CI is set to "1" indicating an occurrence of a congestion, the transmitting terminal 21 lowers the transmission cell rate, thereby avoiding the congestion in the switch 23.

In the meantime, with the congestion notification method implemented by a backward notification shown in FIG. 2B, the congestion indication bit CI of the B-RM cell is set to "1" in the switch 23 and transmitted, when the congestion marked with the asterisk occurs in the switch 23 in a similar manner as in the above described case. When receiving the B-RM cell whose congestion indication bit CI is set to "1", the transmitting terminal 21 determines the occurrence of the congestion and lowers the cell transmission rate. Otherwise, the transmitting terminal 21 may make the cell transmission rate equal to or lower than the allowed cell rate ER of the B-RM cell.

FIG. 4 is a block diagram showing a conventional usage parameter control device: 41 indicates a cell information separation unit; 42 indicates a cell delay unit; 43 indicates a cell control unit; 44 indicates a flow measurement unit; 45 indicates a parameter storage unit; and 46 indicates a B-RM cell detection unit. In a similar manner as in a fixed bit rate CBR service and a variable bit rate VBR service, a B-RM cell detection unit 46 is removed from the above described configuration when performing a cell flow control according to a value set by a user. The value set by the user is stored in the parameter storage unit 45. A VPI and a VCI included in a header of a user cell separated by the cell information separation unit 41 are identified to measure flows of user cells for each VPI and VCI. Each of the measured flows is compared with the value set by the user stored in the parameter storage unit 45. As a result of the comparison, user cells of the flows exceeding the value set by the user are discarded or tagged in the cell control unit 43. The cell delay unit 42 is intended to supply cells for the cell control unit 43 to compensate for any delay in a process caused by the flow measurement unit, etc.

Additionally, in the ABR service, the B-RM cell detection unit 46 detects a B-RM cell transmitted from the receiving terminal. If the CI bit of the detected B-RM cell is set to "1", it indicates an occurrence of a congestion. Therefore, to avoid the congestion, the flow of user cells is controlled by changing a parameter for a usage parameter control, stored in the parameter storage unit 45. The transmitting terminal which receives this B-RM cell lowers the cell transmission rate.

FIG. 5 is a schematic diagram showing a process of a conventional delay control. Between a transmitting terminal 51 and an interface 52 in a switch (ATM switch), a time "Tsi" is required from a transmission of the above described B-RM cell from the interface 52 till an arrival of the cell, transmitted at a rate changed by the transmitting terminal 51 which receives that B-RM cell on a route indicated by the dotted line.

Accordingly, a parameter of the usage parameter control in the interface 52 in the switch is normally changed after the time "Tsi" elapses from the transmission of the B-RM cell. It is impossible, however, to fix the time "Tsi". This is because a processing time of the B-RM cell in the transmitting terminal 51 and a distance from the transmitting terminal to the interface 52 may vary and fluctuate.

As a result, the maximum value $\tau 2$ and the minimum value $\tau 3$ of the time Tsi are set in the interface 52 as delay standard values. Assuming that a B-RM cell passes through the interface 52 at a time t0, a duration from the time t0 till a time t2 is the minimum value $\tau 3$, and a duration from the time t0 till a time t3 is the maximum value $\tau 2$. If the time is divided into three, i.e., the duration A from time t0 to time t2, the duration B from time t2 to time t3, and the duration C from time t3, the relationship between $\tau 3$, Tsi, and $\tau 2$ is therefore $\tau 3 \leq Tsi \leq \tau 2$.

Since user cells in the duration A are not affected by the B-RM cell, there is no need to change the parameters.

In the next duration B, it cannot be determined whether or not user cells in the duration B are affected by the B-RM cell. Therefore, when a cell rate is lowered according to a congestion indication such as CI=1, etc., the parameters are not changed as shown in (a). When the congestion is resolved and the value of the CI is changed from 1 to 0, the parameters must be changed so that the cell rate can be raised as shown in (b). This is because raising the cell rate is a control which does not discard the user cells. In the duration C, since all of user cells are affected by the B-RM cell, the parameters are changed even when the cell rate is lowered as shown in (a).

FIG. 5 also shows the case where a B-RM cell of another connection passes at the time t1, and the maximum value of this VP/VC is set to $\tau 2'$. That is, the maximum and minimum values of the time Tsi can be set for each VP/VC.

As described above, to perform the usage parameter control by setting the maximum value $\tau 2$ and the minimum value $\tau 3$ for the time Tsi, a configuration as shown in FIG. 6 may be adopted. In this figure, 61 indicates a cell information separation unit, 62 indicates a cell delay unit, 63 indicates a cell control unit, 64 indicates a flow measurement unit, 65 indicates a parameter storage unit, 66 indicates a B-RM cell detection unit, 67 indicates a delay control unit, in which 68 indicates a counter for measuring a duration of the maximum value $\tau 2$, 69 indicates a counter for measuring a duration of the minimum value $\tau 3$, and CLK indicates a clock signal.

When B-RM cell detection unit 66 detects a B-RM cell, the counters 68 and 69 start counting the clock signal CLK. Assuming that the B-RM cell passes the time t0 in FIG. 5 and the counters 68 and 69 start counting, the counter 69 feeds a minimum value elapsed time signal to the parameter storage unit 65 at the time t2. Since the value of the counter 68 reaches the maximum value $\tau 2$ at the time t3, the counter 68 feeds a maximum value elapsed time signal to the parameter storage unit 65.

In this case, to lower the cell rate due to an occurrence of a congestion, parameters are changed according to the maximum value elapsed time signal. To raise the cell rate due to clearing of the congestion, the parameters are changed according to the minimum value elapsed time signal.

FIG. 7 is a block diagram showing details of a conventional usage parameter control device UPC, which is slightly different from the above described configuration of FIG. 4.

The correspondence between the configuration of FIG. 7 and that of FIG. 4 is as follows. 71 indicates a header extraction unit corresponding to the cell information separation unit 41. 72 indicates a delay unit corresponding to the cell delay unit 42. 73 indicates a control unit corresponding to the cell control unit 43. An operation unit indicated by 74 and an operation memory indicated by 76 correspond to the flow measurement unit 44. A parameter table indicated by 75 corresponds to the parameter storage unit 45. In the parameter table 75, a value tt indicates a violation threshold value, and T0 indicates a minimum cell interval. A value LT indicates an arrival time of a preceding cell, and CM indicates a leaky bucket counter in the memory 76. The violation threshold value tt and the minimum cell interval T0 are set, updated, etc. by a computer not shown in the drawing, etc. via a computer interface COM-IF. The parameter table 75 and the operation memory 76 are formed for each virtual path VP or each virtual channel VC. The parameter table 75 and the operation memory 76 are accessed using a virtual path identifier VPI or a virtual channel identifier VCI of a header extracted by the header extraction unit 71, as an address.

FIG. 8 is a flowchart showing the leaky bucket algorithm. If a cell arrives at a time Ta (step (a)), a leaky bucket counter CM arranged in the operation memory 76 is updated to CM=CM−(Ta−LT) (step (b)), based on the assumption that an arrival time of a preceding cell is LT.

Then, it is determined whether or not the contents of the leaky bucket counter CM is smaller than 0 (step (c)). If it is smaller than 0, it indicates a case where a return rate is made lower and a cell arrives later than an expected arrival time of the cell. Therefore, the CM is set to 0 (step (d)), and the process goes to step (e). If it is not smaller than "0", it is further determined whether or not the value of the leaky bucket counter CM is greater than the violation threshold value tt set in the parameter table 75 (step (e)). If it is greater than the violation threshold value tt, the transmission rate is made higher, and violation cells whose number increases, which arrive at an interval shorter than the minimum cell interval T0, are discarded (step (f)). If it is not greater than the violation threshold value tt, the arrival time of the preceding cell LT is defined as the cell arrival time Ta, and the value of the leaky bucket counter CM is updated to a value obtained by adding the minimum cell interval T0 to the current value of the leaky bucket counter CM (step (g)).

As described above, the operation unit 74 references the violation threshold value tt and the minimum cell interval T0 set in the parameter table 75 corresponding to each virtual path identifier VPI or each virtual channel identifier VCI of a header extracted by the header extraction unit 71, and discards an arrived cell by controlling the control unit 73 when determining a cell as being a violation cell, while updating the arrival time of the preceding cell LT and the value of the leaky bucket counter CM. The delay unit 72 is intended to feed the above described time corresponding to the process time to the arrival cell.

As described above, for the ABR communication, a PCR, an MCR, and an ACR are defined as parameters associated with a transmission rate. The specification of the ABR communication, however, is currently still being discussed, and congestion control in consideration of these three parameters has not yet been performed.

In the ABR communication, the ACR varies depending on a state of a network. Accordingly, to monitor a flow of cells using the ACR, a monitor parameter set in a UPC must be dynamically changed. If a conventional method is simply applied to the ABR communication, and the process of discarding a cell exceeding the minimum available band MCR is performed, the following problem may arise. That is, if the network is in a congestion state and the ACR of a terminal drops to the MCR, discarding the cell exceeding the MCR is an appropriate process. However, if all of cells exceeding the MCR are discarded in a state where the network is not in the congestion state and the ACR of the terminal is greater than the MCR, even cells in an allowed transmission band are discarded.

Accordingly, in the ABR communication, the monitor parameter must be dynamically changed according to the ACR which varies depending on a state of the network. Such a method, however, has not been offered up to now.

Also in a device which dynamically changes a monitor parameter (usage parameter), a B-RM cell exists for each VP/VC. Accordingly, for the above described delay control process, the counter 68 whose maximum value is τ2, and the counter 69 whose minimum value is τ3, which start counting the clock signal CLK by detecting the B-RM cell, must be arranged for each VP/VC. As a result, the scale of the delay control unit becomes huge.

Furthermore, as shown in FIG. 5, the case may arise where the maximum values of a plurality of connections are different values τ2, and τ2', and the passage times of the B-RM cells corresponding to the plurality of connections are different, so that the times when the parameters are changed are the same, such as at the time t3. Also the minimum value τ3 may vary depending on each connection. If there is a difference between the passage times of the B-RM cells for the plurality of connections, there will be a strong possibility that the parameters must be changed at the same time. Thus, when the parameters are changed simultaneously, a conflict of parameter change requests may occur. As a result, a usage parameter control cannot be performed stably.

The parameter used for the usage parameter control is composed of ten-odd bytes, including an allowed cell rate, etc. To change such a parameter, it must be rewritten immediately. To perform this change operation, a high-speed storage device or a storage device equipped with a wide bus may be adopted. However, implementation using these devices is impossible considering the cost and scale of the circuits, etc.

Additionally, the usage parameter control unit UPC, which is positioned at a transmitting terminal side in an ATM network, determines whether or not a pell transmitted by the transmitting terminal is a violation cell. The violation threshold value tt, the minimum cell interval T0, etc. in the parameter table 75 are set via a computer interface COM-IF. For the ABR service, a cell rate can be raised if a congestion does not occur, while the cell rate is lowered if the congestion occurs, thereby effectively using the ATM network. To cope with such a varying cell rate, a traffic parameter must be dynamically changed for a determination of whether or not the cell is a violation cell. With the conventional usage parameter control unit, however, the traffic parameter cannot be dynamically changed. This is because the traffic parameter is set and updated by a computer via the computer interface COM-IF.

SUMMARY OF THE INVENTION

The object of the present invention is to provide a method for monitoring and controlling a data flow in a communications service where an allowed transmission band ACR varies depending on a state of a network.

The second object of the present invention is to provide a method for monitoring a PCR, an ACR, and an MCR, which are defined in an ABR service class in an ATM network.

The third object of the present invention is to simplify a mechanism of a delay control and facilitate a parameter change control.

The fourth object of the present invention is to enable a determination of a violation cell in the ABR service by dynamically updating a traffic parameter.

FIG. 9 shows a principle of the first embodiment of the present invention.

A packet flow monitor and control system according to the first embodiment of the present invention assumes a configuration which monitors a flow of fixed-length packets in a communications service for transferring data by changing an allowed transmission rate of each connection in a network depending on a state of the network being used for routing the fixed-length packets.

In this embodiment, at least two usage parameter control units (91, 92, 93, . . . in this figure) to which different monitor parameters are assigned, are arranged at an entry point of the network, and the flow of fixed-length packets is monitored using the usage parameter control units 91, 92, and 93, . . . . For the ABR communication service taking advantage of an ATM network, a PCR (peak rate), an MCR (minimum rate), and an ACR (allowed rate) are set.

Each of the parameter control units 91, 92, 93, . . . performs a predetermined process for a fixed-length packet depending on a use-state of the network. It changes a process for a fixed-length packet which violates a monitor parameter, for example, depending on whether the network is either in a congestion state or in a non-congestion state.

Additionally, the flow of fixed-length packets may be monitored using one predetermined usage parameter control unit among the usage parameter control units 91, 92, 93, . . . , depending on a use-state of the network.

With the packet flow monitor and control system according to the first embodiment of the present invention, an operation for monitoring the flow of fixed-length packets is changed depending on a use-state of the network, so that the flow of fixed-length packets in each connection can be properly monitored in a communications service which transfers data by changing an allowed transmission rate of each connection in the network.

FIG. 10 shows a principle of the second embodiment of the present invention.

The packet flow monitor and control system according to the second embodiment of the present invention assumes a configuration which monitors the flow of fixed-length packets into a network which routes the fixed-length packets.

A usage parameter control unit 111 in which a first monitor rate is set, monitors a flow of fixed-length packets using the first monitor rate. A usage parameter control unit 112 in which a second monitor rate is set, monitors the flow of fixed-length packets using the second monitor rate.

A switching unit 113 switches either of the two usage parameter control units 111 and 112 to a valid state, and switches the other of the two usage parameter control units 111 and 112 to a wait state, alternately. Either of the usage parameter control units 111 and 112 in a valid state monitors the flow of fixed-length packets.

A setting unit 114 receives transfer rate instruction information from the network, and sets a transfer rate specified by the transfer rate instruction information to either of the usage parameter control units 111 or 112 which is in a wait state, as a monitor rate.

With the packet flow monitor and control system according to the second embodiment of the present invention, the transfer rate instructed by the network is set in the usage parameter control unit 112 as a next monitor rate, while the usage parameter control unit 111 performs a monitor operation. Therefore, switching between the states of the usage parameter control units 111 and 112 enables a monitor operation of the flow of fixed-length packets at the latest transfer rate instructed by the network. Thereafter, while the usage parameter control unit 112 performs a monitor operation, the transfer rate instructed by the network at that time is set in the usage parameter control unit 111 as a next monitor rate.

Accordingly, by repeatedly switching between the states of the usage parameter control units 111 and 112, a flow of packets can be properly monitored at a rate which quickly changes as the allowed transmission speed varies in a communications service where the allowed transmission rate of each connection in the network varies depending on a use-state of the network.

Additionally, with the above described configuration, each of the usage parameter control units monitors only one set rate. One usage parameter control unit, however, may monitor a varying rate.

That is, the usage parameter control unit as another configuration of the packet flow monitor and control system according to the present invention is intended to determine whether or not an arrived cell is a violation cell according to a parameter stored in a parameter storage unit, change the parameter according to information of a control cell, and control a flow of user cells. The usage parameter control unit comprises a delay control unit for controlling a parameter change by storing a passage time of a control cell in a backward direction, obtaining a time from a passage of the control cell (RM cell) till an arrival of the user cell using a difference between the passage time of the control cell in a backward direction and the arrival time of the user cell, and making a comparison between the obtained time and a predetermined delay standard value.

The delay control unit, which comprises a passage time storage unit storing a passage time of a control cell for each connection, compares the time obtained by using the difference between the passage time of the control cell and the arrival time of the user cell, with a maximum value $\tau 2$ and a minimum value $\tau 3$ as delay standard values, and controls a change of a parameter stored in the parameter storage unit in the case where the time is smaller than the minimum value $\tau 3$, in the case the time is equal to or greater than the minimum value $\tau 3$ and smaller than the maximum value $\tau 2$, and in the case the time is equal to or greater than the maximum value $\tau 2$, as a result of the comparison.

The delay control unit comprises a delay standard value register where a delay standard value is set for each connection.

The parameter storage unit possesses at least two parameter areas for storing parameters, and a valid area flag indicating a parameter area where a parameter used for an operation is stored. The parameter storage unit switches between the parameter storage areas storing the parameters used for the operation by changing the value of the valid area flag. The parameter storage unit further possesses a greater/smaller flag indicating a greater/smaller relationship between a parameter value in a parameter area currently being used, and a parameter value in a parameter area to be used and switched next. The parameter storage unit controls a timing of a parameter change by referencing the greater/smaller flag, when the delay control unit changes the parameter.

The usage parameter control unit for controlling a flow of user cells by determining whether or not an arrived user cell is a violation cell according to a parameter stored in the parameter storage unit, and changing the parameter according to information of a control cell, may further comprise a delay control unit for controlling a change of the parameter stored in the parameter storage unit by storing a time obtained by adding a predetermined delay standard value to a passage time of a control cell in a backward direction, and comparing the obtained time with an arrival time of the user cell.

Another variation of the usage parameter unit according to the present invention including a header extraction unit for extracting a header of an arrived cell to identify a cell type, a parameter table for storing parameters such as a violation threshold value tt, a minimum cell interval T0, etc., an operation unit for determining whether or not the cell is a violation cell by referencing the contents of the parameter table, and a control unit for discarding the cell when the operation unit determines that cell is a violation cell, further comprises a reception extraction unit for extracting contents of a resource management cell in a backward direction, and a parameter operation unit for updating the contents of the parameter table according to the contents of the resource management cell extracted by the reception extraction unit.

The resource management cell in the backward direction is extracted by the reception extracting unit. The violation threshold value and the minimum cell interval, etc. are calculated by the parameter operation unit according to an allowed cell rate set in a payload, so that the parameter table is updated. Accordingly, the parameter can be dynamically updated to provide the ABR service.

The usage parameter control unit may further comprise a conversion table for extracting an allowed cell rate set in the resource management cell in the backward direction, and obtaining the minimum cell rate T0 according to the allowed cell rate ACR.

For the conversion table, a unit of the allowed cell rate ACR is, for example, "cells/sec", and a unit of the minimum cell interval T0 is, for example, "secs". The conversion table performs a conversion into the minimum cell interval T0 according to the allowed cell rate ACR extracted from the resource management cell in the backward direction, in order to update the parameter table.

The parameter table includes areas of an unupdated parameter and an unupdated parameter, and an area storing time information for switching these two areas. The operation unit performs an operation of whether or not an arrived cell is a violation cell by switching from the unupdated parameter to the updated parameter, after an elapse of time according to the time information for switching the areas.

The parameter table may be configured double. That is, the unupdated parameter is stored in one of the parameter tables, while the updated parameter is stored in the other of the parameter tables. Switching the parameters by the operation unit can be implemented by switching the parameter tables after an elapse of time according to the time information.

The parameter table includes the areas of unupdated and updated parameters, and an area including time information for switching these two areas. The operation unit immediately switches to the updated parameter when a cell rate is raised according to the parameter, and switches, from the unupdated parameter to the updated parameter after an elapse of time according to the time information for switching the areas when the cell rate is lowered according to the parameter, so that the determination of whether or not the arrived cell is a violation cell can be made.

When the updated parameter indicates a raise of the cell rate, there is almost no possibility that a cell is discarded, even if the operation of determining whether or not the arrived cell is a violation cell is immediately performed. On the other hand, when the updated parameter indicates a lowering of the cell rate, there is a possibility that a transmission rate might be raised at a transmitting terminal which has not yet received the resource management cell in the backward direction, in the case the parameter is immediately used. As a result, the possibility of an occurrence of a violation cell may be greater. Accordingly, to lower the cell rate, the transmitting terminal can control the transmission rate by switching to the parameter table including a different parameter after an elapse of time according to the time information. Thus, the possibility of an occurrence of a violation cell can be eliminated.

Additionally, the resource management cell (RM cell) in the backward direction may be written to a memory in synchronization with a frame pulse in the backward direction, read from the memory in synchronization with a frame pulse in a forward direction, and fed to the parameter operation unit.

Since a cell in a forward direction is not always synchronous with a cell in a backward direction, a conflict of memory accesses for processing the respective cells may occur. Therefore, by processing the cell in the backward direction in synchronization with the frame pulse in the forward direction, the conflict of the memory accesses, etc. can be avoided.

The usage parameter control device may also comprise a comparator for comparing an allowed cell rate set in the CCR field of a resource management cell in a forward direction, with an allowed cell rate written to the parameter table, and transmitting an alarm when both of the allowed cell rates do not match. This is because the mismatch is determined as an external fault.

In a resource management cell in a forward direction, an allowed cell rate ACR calculated by the transmitting terminal is set in the CCR field of that cell. This allowed cell rate ACR is a rate at which a cell transmission is performed, notified to an ATM network by the transmitting terminal. Since a calculation algorithm of the allowed cell rate calculated by the transmitting terminal is the same as that of the allowed cell rate ACR calculated by the usage parameter control unit, both rates should be the same. Accordingly, if the two rates do not match as a result of a comparison made by the comparator, the mismatch is determined as an external fault and an alarm is transmitted.

The usage parameter control device further comprises a backward resource management cell transmission unit for rewriting an allowed cell rate in a parameter table to a minimum cell rate, and transmitting a resource management cell after setting the minimum cell rate in an allowed cell rate field of the resource management cell in a backward direction, if an allowed cell rate set in a payload of the resource management cell in a forward direction is greater than the allowed cell rate written to the parameter table.

If the allowed cell rate of the resource management cell in the forward direction is greater than the allowed cell rate written to the parameter table, the usage parameter control device determines that the allowed cell rate of that cell is greater than that of the usage parameter control unit, and determines that transmission rate of the transmitting terminal is higher than the rate allowed by the network. The allowed cell rate of the resource management cell in the forward direction is replaced with the minimum cell rate MCR in order to equalize the allowed cell rates. At the same time, the minimum cell rate MCR is set in an allowed cell rate field of the resource management cell in the backward direction, and notified to the transmitting terminal, in order to equalize the transmission rate of the transmitting terminal and a monitor rate.

Additionally, the usage parameter control device comprises a backward resource management cell generation unit for generating a resource management cell in a backward direction, and transmitting the cell after setting the minimum cell rate of the parameter table in the payload of the resource management cell, if the allowed cell rate set in the payload of the resource management cell in the forward direction is greater than the allowed cell rate written to the parameter table.

If the allowed cell rate of the transmitting terminal is greater than that of the parameter table, the backward resource management cell generation unit generates a resource management cell in a backward direction, transmits the generated cell after setting the minimum cell rate MCR of the parameter table in a payload of the resource management cell, and replaces the allowed cell rates of the transmitting terminal and the usage parameter control unit with the minimum cell rate MCR, so that the transmission rate and the monitor rate can be equalized.

The usage parameter control unit further comprises a backward resource management cell transmission unit for setting the allowed cell rate of the parameter table in an allowed cell rate field of the resource management cell in the backward direction, and transmitting that cell, if the allowed cell rate set in the payload of the resource management cell in a forward direction is smaller than the allowed cell rate written to the parameter table.

If the allowed cell rate of the transmitting terminal is smaller than that of the parameter table, the allowed cell rate of the parameter table is set in an allowed cell rate field of the resource management cell in the backward direction. The resource management cell is then transmitted to the transmitting terminal, so that the transmission rate and the monitor rate can be equalized.

Furthermore, the usage parameter control device comprises a backward resource management cell generation unit for generating a resource management cell in a backward direction, setting the allowed cell rate of the parameter table in a payload of the resource management cell, and transmitting that cell, if the allowed cell rate set in the payload of the resource management cell in a forward direction is smaller than the allowed cell rate written to the parameter table.

If the allowed cell rate of the transmitting terminal is smaller than that of the parameter table, the backward resource management cell generation unit generates a resource management cell transmitted in a backward direction, sets the allowed cell rate of the parameter table in its payload, and transmits that cell, so that the transmission rate and the monitor rate can be equalized.

BRIEF DESCRIPTION OF THE DRAWINGS

FIG. 3 shows a format of an RM cell;

FIG. 9 shows a principle of the first embodiment of the present invention;

FIG. 13 shows a structure of a table storing a monitor rate for each VPI/VCI;

FIG. 16 is a flowchart showing a process performed by the cell flow monitor and control system shown in FIGS. 12A—12C, FIGS. 14A and 14B, and FIGS. 15A and 15B;

FIG. 21 shows a structure of a conversion table for storing a correspondence between a VPI/VCI and a monitor parameter;

FIG. 23A is a schematic diagram showing a configuration of a UPC;

FIG. 23B is a schematic diagram showing operations performed by a leaky bucket counter;

FIG. 24 is a block diagram showing a cell flow monitor and control system with a cell transfer rate observation device arranged outside the UPC;

FIGS. 26A and 26B show variations of the cell flow monitor and control system shown in FIG. 24;

FIG. 37 is a block diagram showing a rate monitor system for monitoring a dynamically varying rate using a conventional rate monitor device;

FIG. 45 is a block diagram showing a variation of the usage parameter control device according to the eighth embodiment of the present invention;

DESCRIPTION OF THE PREFERRED EMBODIMENTS

Figure 11:
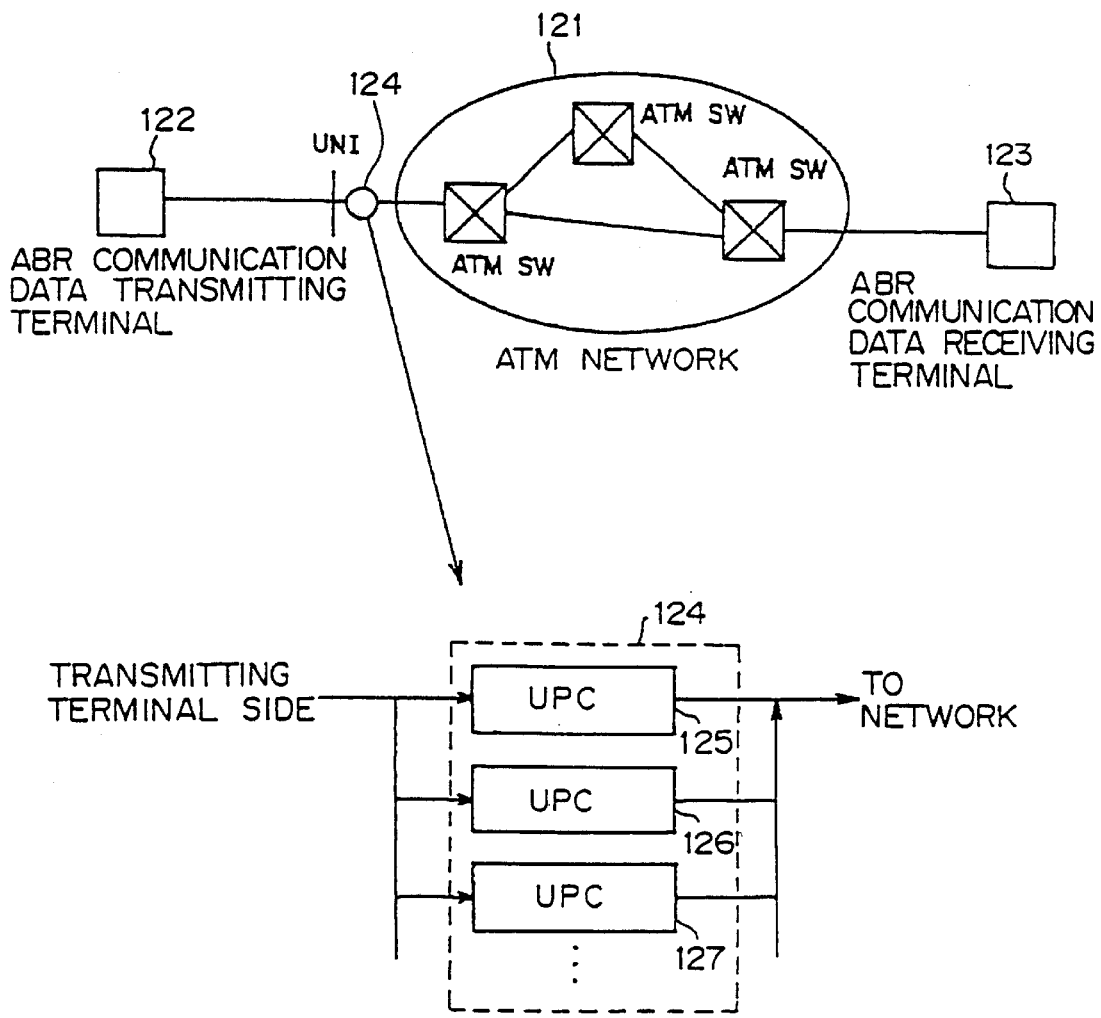
FIG. 11 is a schematic diagram showing a simplified structure of an ATM network to which a cell flow monitor and control system according to the present invention is applied.

FIG. 11 is a schematic diagram showing a simplified configuration of an ATM network to which a cell flow monitor and control system is applied.

Figure 6:
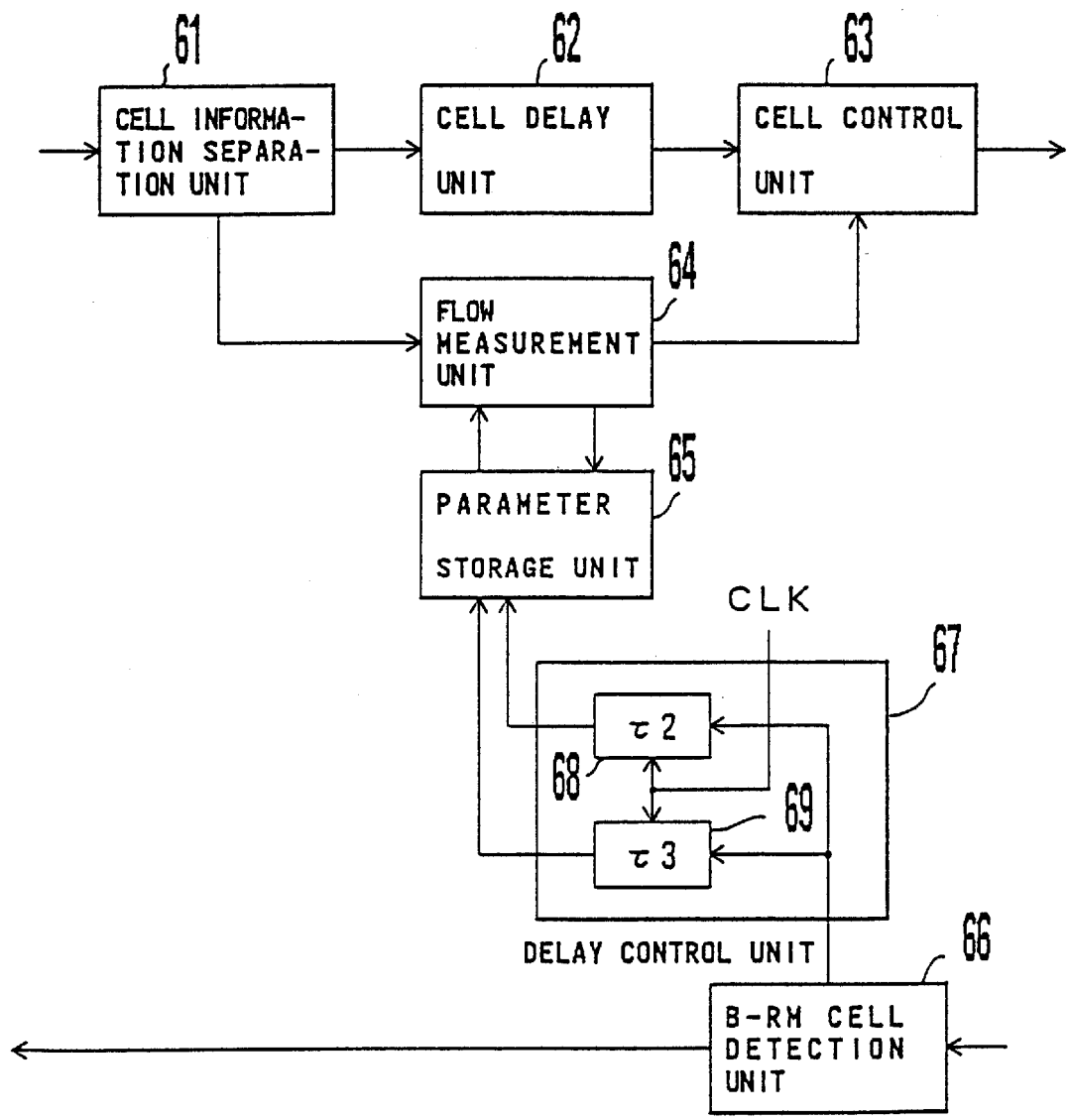
FIG. 6 is a block diagram showing a conventional usage parameter control device in an ABR service.
Figure 7:
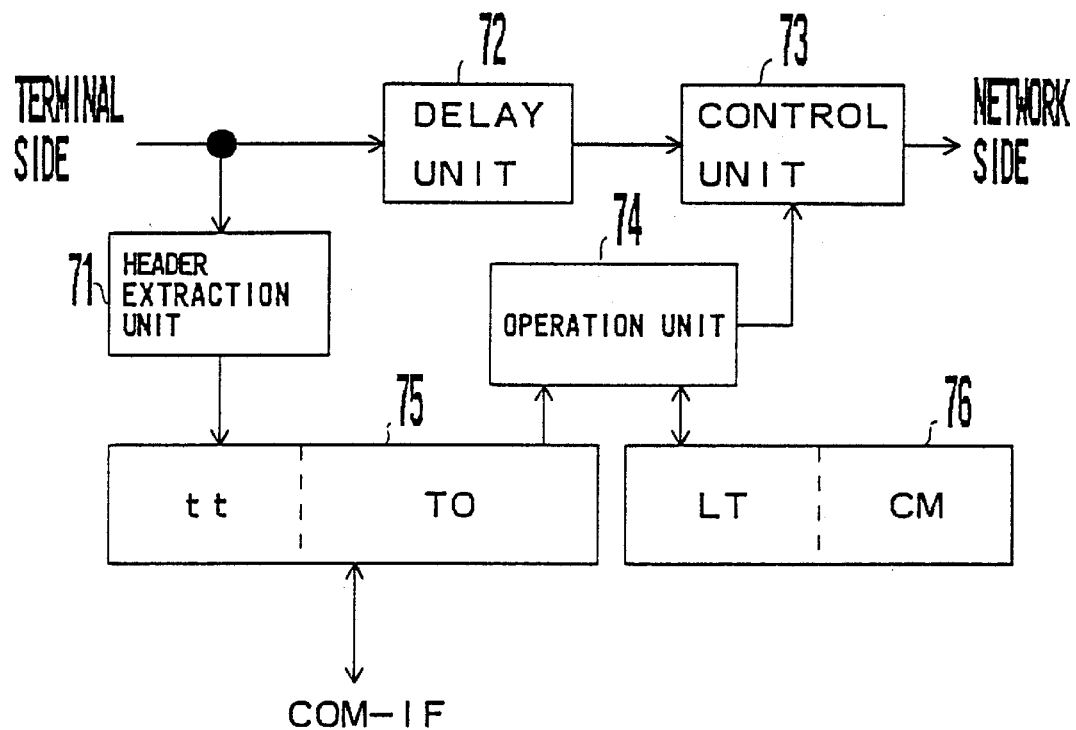
FIG. 7 is a block diagram showing a conventional usage parameter control device.
Figure 8:
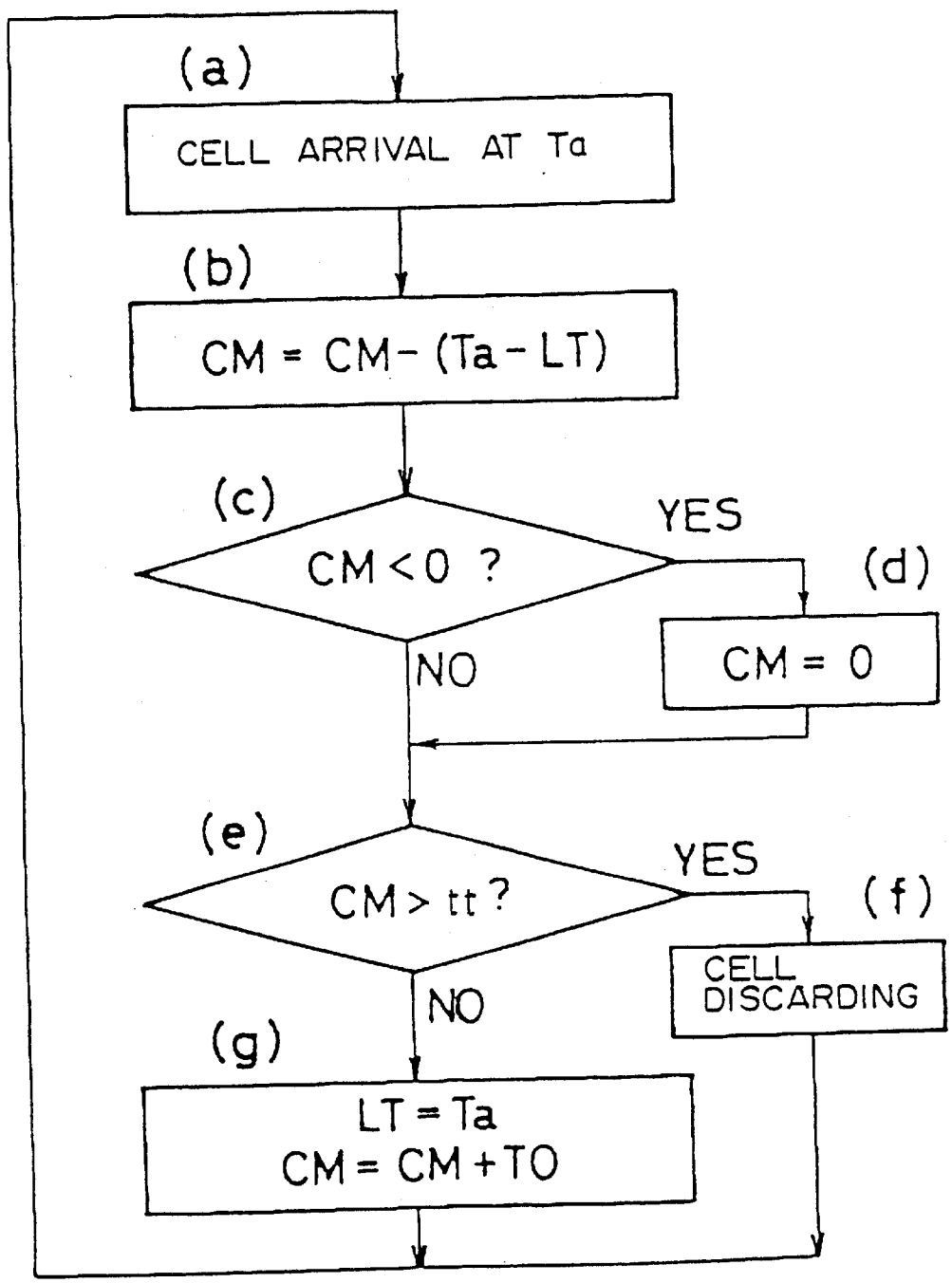
FIG. 8 is a flowchart showing the leaky bucket algorithm.
Figure 10:
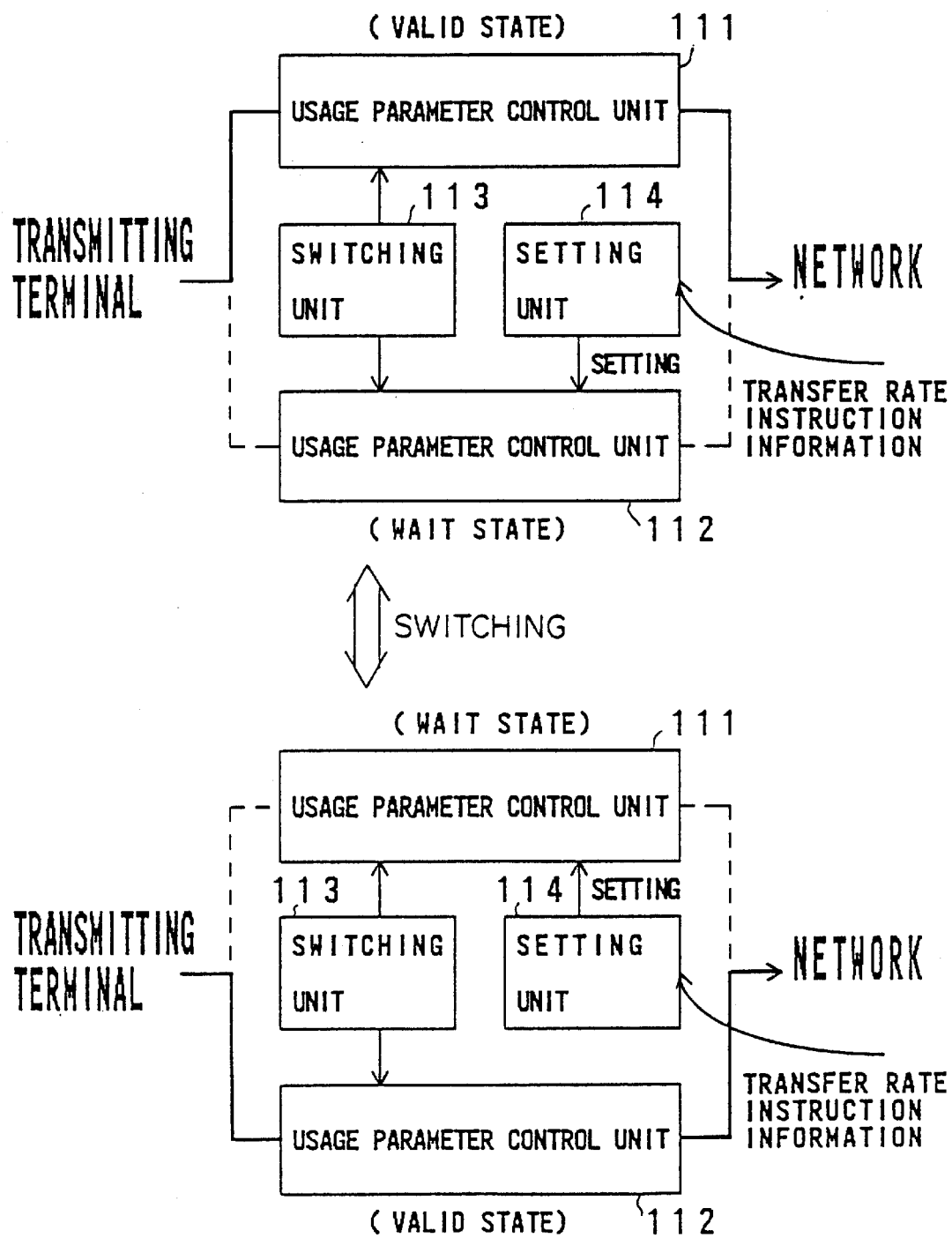
FIG. 10 is a block diagram showing a principle of the second embodiment of the present invention.

In FIG. 11, each of UPCs 125, 126, 127, . . . included in the cell flow monitor and control system 124 assumes a conventional UPC intended for monitoring one rate. Accordingly, its block diagram corresponds to the one shown in FIG. 4 from which the B-RM cell detection unit is removed, or the one shown in FIG. 7. Note that, however, the conventional UPC intended for monitoring one rate cannot monitor a varying rate ACR in one of the UPCs 125, 126, 127, . . . . A UPC which can change a monitor rate in one UPC shown in FIG. 6 can be used in this case.

An ATM network 121 includes ATM switches, and is connected to a plurality of terminals 122, 123, . . . . The plurality of terminals 122 and 123 are intended for an ABR communication service class. When data is transferred from the terminal 122 to the terminal 123, the terminal 122 attaches an identifier VPI/VCI (Virtual Path Identifier/Virtual Channel Identifier) indicating a route from the terminal 122 to the terminal 123 to a header of each cell, and transmits the cell to the ATM network 121. The cell is self-routed according to the VPI/VCI in a predetermined ATM switch, and output to a line connected to the terminal 123. The terminals 122 and 123 periodically output an RM (Resource Management) cell. The RM cell is transferred to a destination terminal via the ATM network 121 for each connection, doubled back at the destination terminal, and returned to a source terminal. At that time, information indicating a use-state of the ATM network 121 (congestion information) is written to that cell. Accordingly, the source terminal can determine whether or not the ATM network 121 is in a congestion state according to the RM cell. In such a configuration of a network, a cell flow monitor and control system according to this embodiment is implemented by a UPC (Usage Parameter Control) unit arranged in a UNI (User Network Interface).

With the ATM method, several transfer rates (reported values) are set by negotiations between users and the ATM network for each connection when a call is established. Note that a connection in this embodiment indicates a virtual communication path uniquely specified by a VPI/VCI. Therefore, if each of the users works according to his or her set value, the ATM network is not congested, and a quality of each service taking advantage of the ATM network is assured. If a user work according to the set value, the ATM network 121 may become congested. If such a congestion occurs, the quality of the service of the user following his or her set value may also be degraded. Accordingly, it must be monitored whether or not a transfer rate set for each connection (a flow of cells from each of the terminals 122, 123, . . . into the ATM network 121 per unit time) is observed, at an entry point of the ATM network. Some penalty must be imposed on a connection which does not observe its set value. The UPC performs the above described monitor operation, and discards a cell transferred via a violating connection, or reassigns a lower priority to that cell.

The cell flow monitor and control system 124 includes a plurality of UPC 125, 126, 127, . . . , in order to monitor data of the ABR communication. Each of the UPC 125, 126, 127, . . . monitors a transfer rate of a user cell flowing from a source terminal (the terminal 122 in this case) into the ATM network 121 via a UNI. Each of the UPC 125, 126, and 127 monitors parameters such as a PCR, an ACR, and an MCR, associated with three types of transfer rates determined in the ABR service class.

The PCR (Peak Cell Rate) and the MCR (Minimum Cell Rate) are user-set values, which are set by a negotiation (CAC: Call Admission Control) between a user and the ATM network 121 for each connection, when a call is established. The PCR indicates an upper limit of a cell transfer rate for each connection, which is a maximum request band. The MCR is a minimum available band where cells are guaranteed not to be discarded even if the ATM network is in congestion state, when the cells are transmitted at a transfer rate equal to or lower than the MCR.

The ACR (Allowed Cell Rate) is a cell transfer rate at which a transmitting terminal is allowed to perform a transmission to the ATM network 121, and is called a transmission-allowed band. The ACR is calculated as follows. That is, if the transmitting terminal transmits an RM cell to the ATM network 121 for each connection, the ATM network 121 or a receiving terminal writes information indicating whether or not a congestion occurs in the network, or a cell transfer rate at which a transmission to the ATM network 121 via the connection is allowed, to the RM cell, and returns that cell to the transmitting terminal. The transmitting terminal calculates the ACR of the connection based on the above described information or the cell transfer rate written to the RM cell. The maximum and the minimum values of the ACR are respectively PCR and MCR reported by the user for each connection. For example, if an amount of communications taking advantage of the ATM network 121 is small, the ACR of each connection becomes the value equal to or near the PCR. While if the ATM network 121 becomes congestion state the ACR of each connection becomes lower. If the congestion state continues, the ACR drops to the MCR. That is, the ACR is a value varying between the MCR and the PCR depending on a use-state of the ATM network 121. Thus, the transmitting terminal calculates the ACR according to the RM cell received from the ATM network 121 using a predetermined algorithm, and transfers data at a cell transfer rate observing the ACR.

As described above, the cell flow monitor and control system 124 comprises the UPC 125, 126, 127, . . . , each of which monitors the transfer rates of a cell flowing into the ATM network 121, such as the PCR, ACR, and MCR determined in the ABR service class. That is, the UPC 125 monitors if the transfer rate of a cell flowing into the ATM network 121 via a certain connection does not exceed the PCR set for the connection. In the meantime, the UPC 126 monitors if the transfer rate of the cell flowing into the ATM network 121 does not exceed the ACR. Similarly, the UPC 127 monitors if the transfer rate of the cell flowing into the ATM network 121 does not exceed the MCR. The above described monitor operations are performed for each connection (each VPI/VCI).

If each of the UPC 125 through 127 detects a connection whose transfer rate exceeds the monitor rate (the PCR, ACR, or MCR), it discards a cell exceeding the monitor rate among cells transferred via the connection, or assigns a lower priority to the cell, etc.

As the method for assigning a priority to the cell, the following two methods can be adopted. One of the methods is to use a CLP (Cell Loss Priority) bit in a header of each cell. That is, for a cell with a high priority (prioritized cell), the value "0" is assigned to the CLP bit of that cell. For a cell with a low priority (non-prioritized cell), the value "1" is assigned to the CLP bit of that cell. The second methods is to write priority information to tag information attached to a cell in a switch. For both these methods, the process of assigning the value "1" to the CLP bit of a cell, or the process of writing information indicating a non-prioritization in order to assign a low priority to the cell, is called "tagging". "Tagging" means an attachment of a tag. The following embodiments assume the method using the CLP bit.

Provided below is the explanation about a method for monitoring two rates among the transfer rates of an ABR communication using two UPC, by referring to FIGS. 12A through 16. The number of possible combinations of selecting two of the three transfer rates PCR, ACR, and MCR determined in the ABR communication is three, and examples of these three combinations are shown in FIGS. 12A–C, 14A–B, and 15A–B.

Figure 12A:
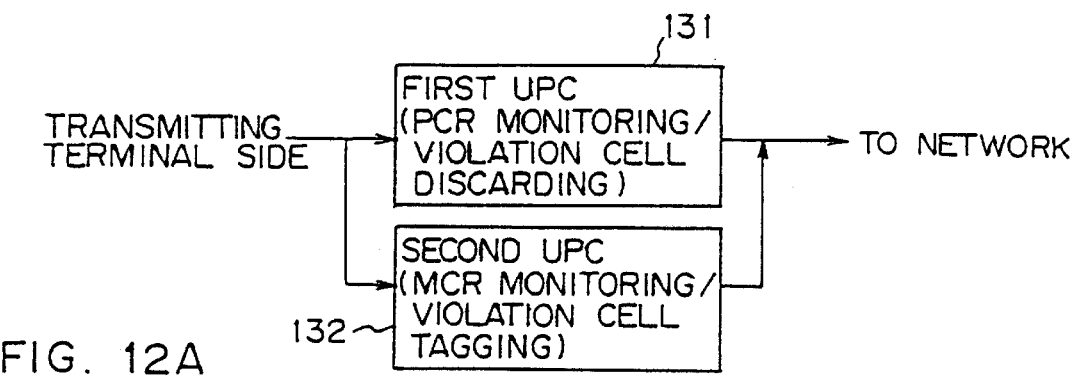
FIG. 12A is a block diagram showing a cell flow monitor and control system for monitoring a PCR and an MCR.
Figure 12B:
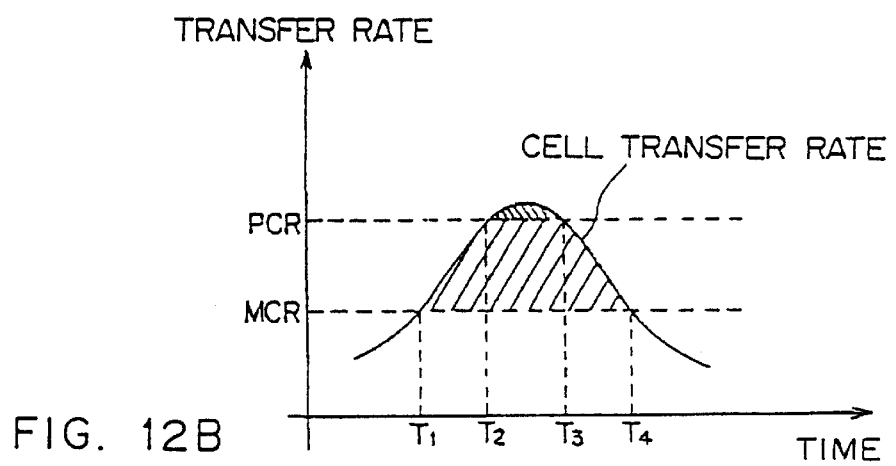
FIGS. 12B and 12C are schematic diagrams showing operations performed by the cell flow monitor and control system shown in FIG. 12A.

FIG. 12A is a block diagram showing a cell flow monitor and control system for monitoring a PCR and an MCR. The cell flow monitor and control system shown in this figure comprises a first UPC 131 for monitoring if a transfer rate of a cell flowing from a transmitting terminal into an ATM network does not exceed the PCR, and a second UPC 132 for monitoring if the transfer rate of the cell flowing from the transmitting terminal into the ATM network does not exceed the MCR. The cell flow monitor and control system further comprises a conversion table 133 shown in FIG. 13. The conversion table 133 stores the monitor rates PCR and MCR for each VPI/VCI.

When a cell is input to the cell flow monitor and control system configured as above, a control unit, not shown in the drawing, searches the conversion table 133 using a VPI/VCI of that cell. Assuming that the VPI/VCI is #1, a PCR(#1) and an MCR (#1) are retrieved and set in the first and the second UPC 131 and 132, respectively.

If a transfer rate of the cell input via the connection (VPI/VCI=#1) exceeds the PCR (#1), the first UPC 131 discards a cell exceeding the PCR (#1). Assume that the cell transfer rate is in a state shown in FIG. 12B. In a duration from a time T2 till a time T3, the cell transfer rate exceeds the PCR. In this case, the first UPC 131 discards cells in the shaded area above the PCR level. "Discarding the cells whose transfer rate exceeds the PCR" means that 30 cells are discarded, for example, in the case that the transfer rate determined by the PCR is 1000 cells/unit time, and a transfer rate at an arbitrary time in the duration from the time T2 till the time T3 is 1030 cells/unit time.

The process of discarding the cells is performed with the leaky bucket method. With the leaky bucket method, if an interval between cells flowing into the ATM network via a certain connection is shorter than a predetermined value calculated from the PCR (expected cell interval value calculated as the inverse of the PCR), those cells are recognized as violation cells and discarded. Taking advantage of this process can prevent a cell from flowing into the ATM network at a transfer rate higher than the PCR.

Similarly, if the transfer rate of a cell input via that connection (VPI/VCI=#1) exceeds the MCR (#1), the second UPC 132 tags (assigns the value "1" to the CLP bit) a cell exceeding the MCR (#1). In the example shown in FIG. 12B, cells in the shaded area between the PCR and the MCR levels are tagged in a duration from the time T1 till the time T4. Assuming that a transfer rate determined by the MCR is 500 cells/unit time, and the transfer rate at an arbitrary time in the duration from the time T1 till the time T2 is 700 cells/unit time, 200 cells are tagged (the value "1" is assigned to each of the CLP bits of the 200 cells.)

Also the tagging process can be performed using the leaky bucket method. In this case, if an interval between cells flowing into the ATM network via a certain connection is shorter than a predetermined value calculated from the MCR (expected cell interval value calculated as the inverse of the MCR), those cells are recognized as violation cells and tagged. Since a tagged cell is handled as a non-prioritized cell in an ATM network, it is discarded prior to a prioritized cell in a buffer arranged in an ATM switch or prior to the ATM switch when the ATM network enters a congestion state.

As described above, the cell whose transfer rate is equal to or higher than the MCR, and equal to or lower than the PCR, flow into the ATM network as a non-prioritized cell. A cell whose transfer rate is equal to or lower than the MCR flows into the ATM network as a prioritized cell.

Figure 12C:
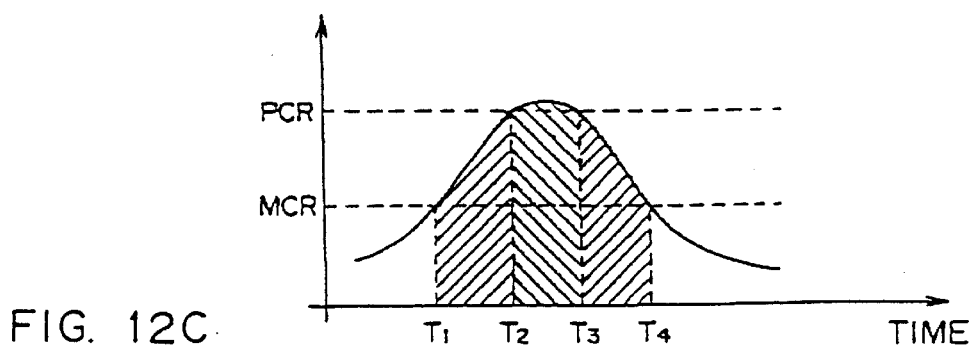

If a cell transfer rate of a certain connection exceeds the monitor rate PCR or MCR, the discarding process or the tagging process shown in FIG. 12C may be performed. That is, if the cell transfer rate exceeds the PCR in the duration from the time T2 till the time T3, the first UPC 131 discards all of cells transferred via the above described connection. Or, if the cell transfer rate exceeds the MCR in the duration from the time T1 till the time T2 or the duration from the time T3 till the time T4, the second UPC 132 tags all of the cells transferred via the connection in these durations.

This method can be implemented by arranging a unit for determining whether or not the monitor rate of the PCR or the MCR is observed for each connection, and using a notification from that unit. Additionally, this method can be applied to a configuration shown in FIGS. 14A and 14B, or in FIGS. 15A and 15B.

Figure 14A:
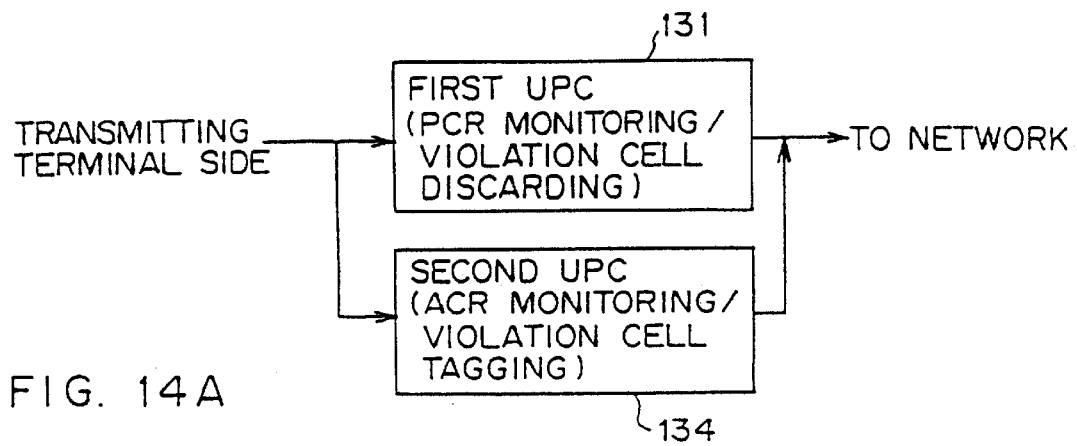
FIG. 14A is a block diagram showing the cell flow monitor and control system for monitoring the PCR and the ACR.
Figure 14B:
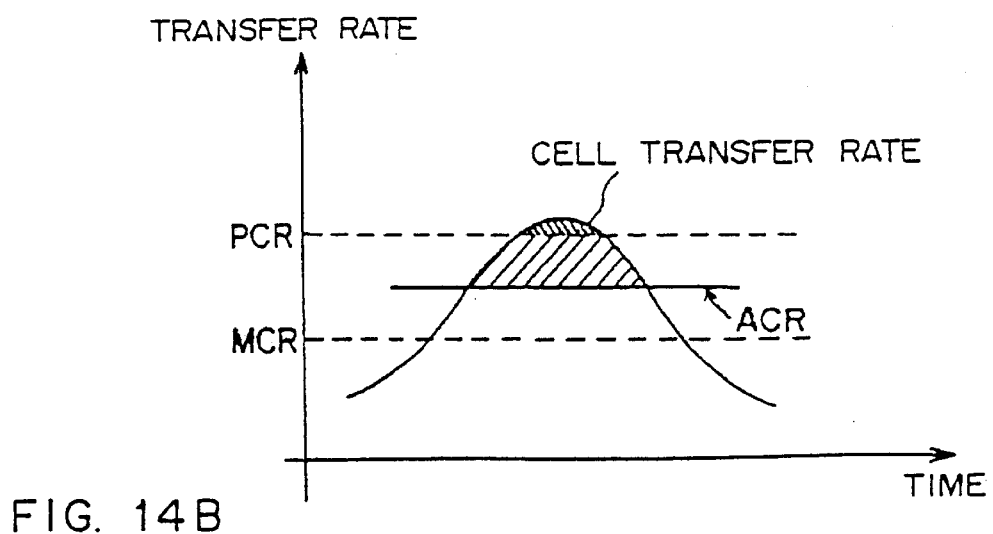
FIG. 14B is a schematic diagram showing operations performed by the cell flow monitor and control system shown in FIG. 14A.

FIG. 14A is a block diagram showing a cell flow monitor and control system for monitoring a PCR and an ACR. The cell flow monitor and control system shown in this figure is composed of a first UPC 131 and a second UPC 134 for monitoring if a transfer rate of a cell flowing from a transmitting terminal into an ATM network does not exceed the ACR of each connection, as shown in FIG. 14A.

If the transfer rate of a cell input via a monitored connection exceeds the ACR, the second UPC 134 tags a cell exceeding the ACR. In the example shown in FIG. 14B, cells in a shaded area above the PCR level are tagged.

As described above, the ACR monitored by the second UPC 134 is a parameter which varies depending on a use-state of the ATM network. If a table storing the ACR for each VPI/VCI is arranged to manage the ACR in a similar manner as in the configuration shown in FIG. 13, contents of the table must be rewritten depending on a use-state of the ATM network. Note that, however, when the scale of the ATM network becomes large, it is difficult to rewrite the table in real time due to a problem of a processing capability of a processor or an access time of a memory. The cell flow monitor and control system according to this embodiment, to be described in detail later, monitors a cell transfer rate which quickly follows as a parameter varies, without comprising a table storing the ACR for each VPI/VCI.

According to the cell flow monitor and control system show in FIG. 14A, a cell whose transfer rate is between the ACR and the PCR flows into an ATM network as a non-prioritized cell, while a cell whose transfer rate is equal to or higher than the PCR is discarded.

Figure 15A:
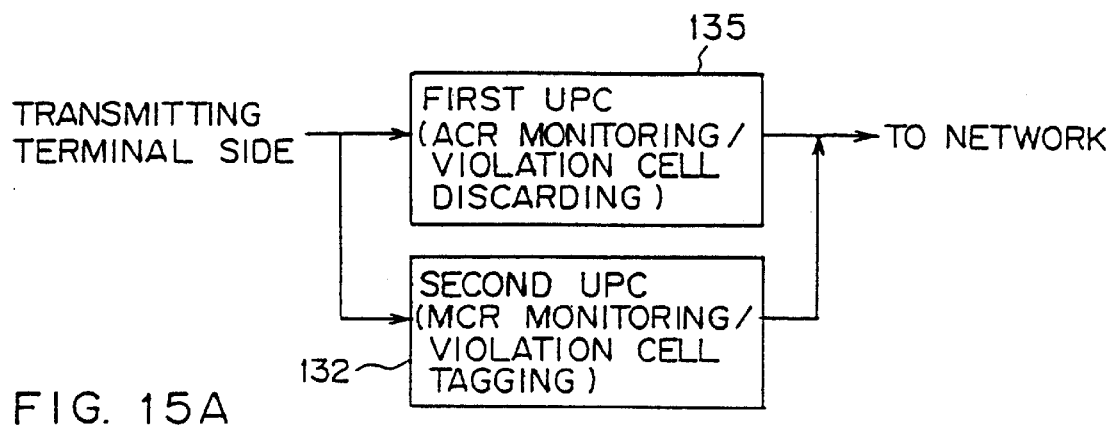
FIG. 15A is a block diagram showing a cell flow monitor and control system for monitoring an ACR and an MCR.
Figure 15B:
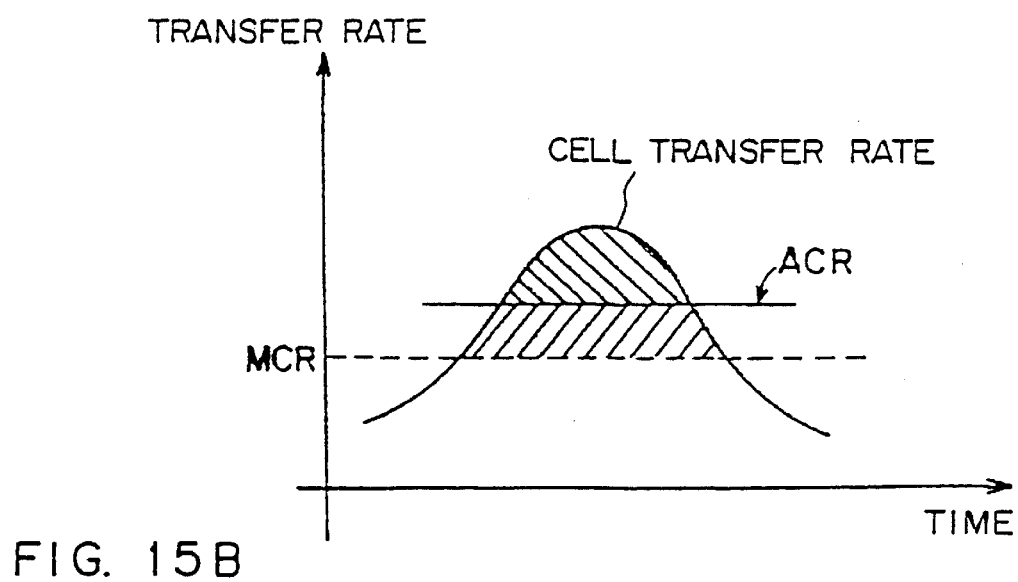
FIG. 15B is a schematic diagram showing operations performed by the cell flow monitor and control system shown in FIG. 15A.

FIG. 15A is a block diagram showing a cell flow monitor and control system for monitoring an ACR and an MCR. The cell flow monitor and control system shown in this figure is composed of a first UPC 135 for monitoring if a transfer rate of a cell flowing from a transmitting terminal into an ATM network does not exceed the ACR of each connection, and a second UPC 132 as shown in FIG. 12A. If the transfer rate of a cell input via a monitored connection exceeds the ACR, the first UPC 135 discards that cell. In the example shown in FIG. 15B, cells in the shaded area above the ACR level are discarded.

Thus, according to the cell flow monitor and control system shown in FIG. 15A, a cell whose transfer rate is between the MCR and the ACR flows into an ATM network as a non-prioritized cell, while a cell whose transfer rate is equal to or higher than the ACR is discarded.

As described above, the cell flow monitor and control system shown in FIGS. 12A, 14A, or 15A, sets two monitor rates using the first and the second UPCs tags a cell whose transfer rate exceeds a lower monitor rate (the MCR or the ACR) to make it flow into the ATM network, and discards a cell exceeding a higher monitor rate (the ACR or the PCR) without giving permission to flow into the ATM network.

FIG. 16 is a flowchart showing a process performed by the cell flow monitor and control system shown in FIGS. 12A through 12C, 14A and 14B, or 15A and 15B.

A cell flowing from a transmitting terminal into an ATM network is input to a first and a second UPCs The first UPC checks to see if a transfer rate of a connection which transfers that cell is equal to or lower than a monitor rate R1 in step S1. The process performed in step S1 is implemented by, for example, the leaky bucket method. The monitor rate R1 is a PCR in the example shown in FIG. 12A or in FIG. 14A, and an ACR in the example shown in FIG. 15A.

If the transfer rate of the connection is equal to or lower than the monitor rate R1, the cell is transferred to the ATM network in step S2. If the transfer rate exceeds the monitor rate R1, the cell is discarded in step S3.

The second UPC checks to see if the transfer rate of the connection which transfers that cell is equal to or lower than the monitor rate R2. The monitor rate R2 is shown as the MCR in FIG. 12A or in FIG. 15A, and as the ACR in FIG. 14A.

If the transfer rate of the connection is equal to or lower than a monitor rate R2, the cell is transferred to the ATM network as it is in step S5. If the transfer rate exceeds the monitor rate R2, the value "1" is assigned to a CLP bit of that cell (tagging) in step S6. The tagged cell is discarded in the ATM network if the ATM network enters a congestion state in step S7.

In the above described process, the first and the second UPCs perform a monitor operation in parallel. Alternatively, a cell passing through the first UPC may subsequently be input to the second UPC.

Figure 17:
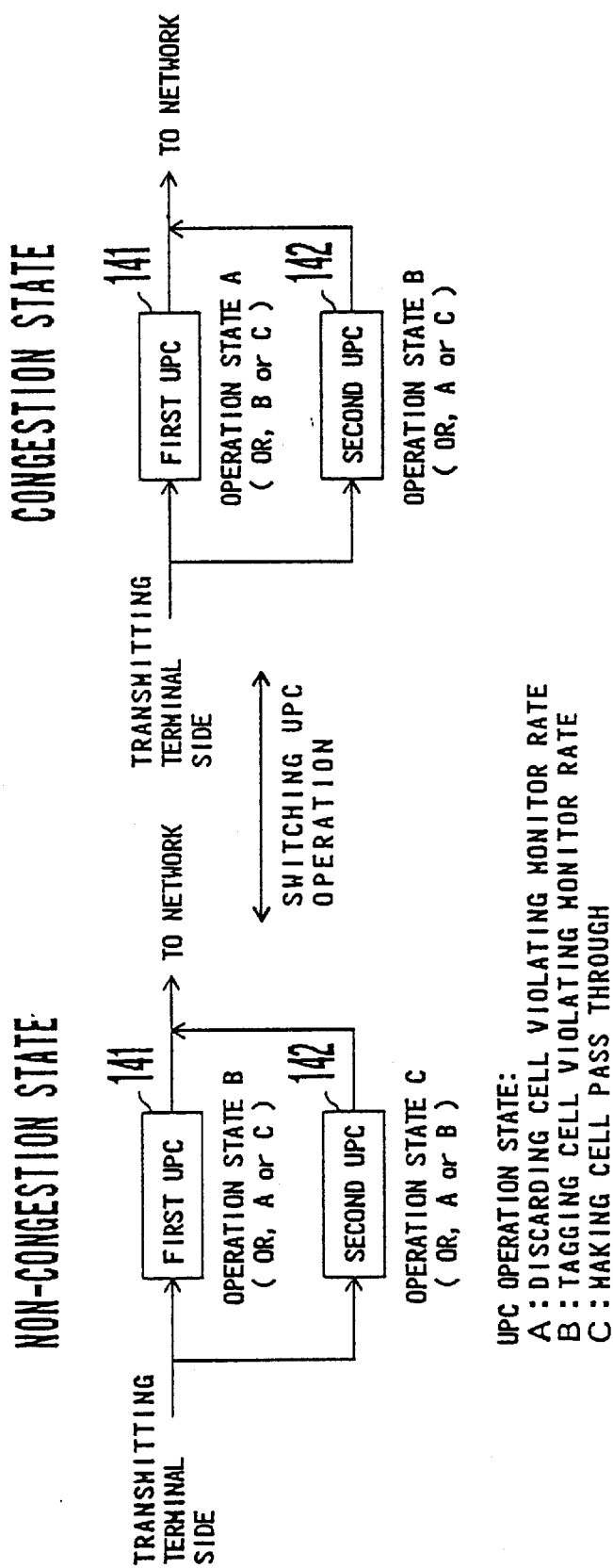
FIG. 17 is a block diagram showing a principle of the operations performed by a UPC for switching a process depending on a use-state of an ATM network.

FIG. 17 is a schematic showing a principle of a switch process depending on a use-state of an ATM network, performed by the UPC.

The cell flow monitor and control system shown in FIG. 17 is composed of a first UPC 141 and a second UPC 142, in which different monitor rates are respectively set. The first UPC 141 and the second UPC 142 switches the process depending on a use-state of the ATM network (congestion state/non-congestion state).

As a monitor and control process performed by the first UPC 141 and the second UPC 142, any of the following three processes is performed for a monitored cell transfer rate. That is: A: discarding a cell exceeding a monitor rate (violation cell); B: tagging a cell exceeding the monitor rate (violation cell); C: making a cell which does not exceed the monitor rate pass through as it is.

For example, if an ATM network charges from a normal state to a congestion state, the first UPC 141 switches its operation state from B to A. At that time, the second UPC 142 switches its operation state from C to B. Note that the cell flow monitor and control system can determine a use-state of an ATM network (congestion state/non-congestion state) according to an RM cell received from the ATM network.

Figure 18:
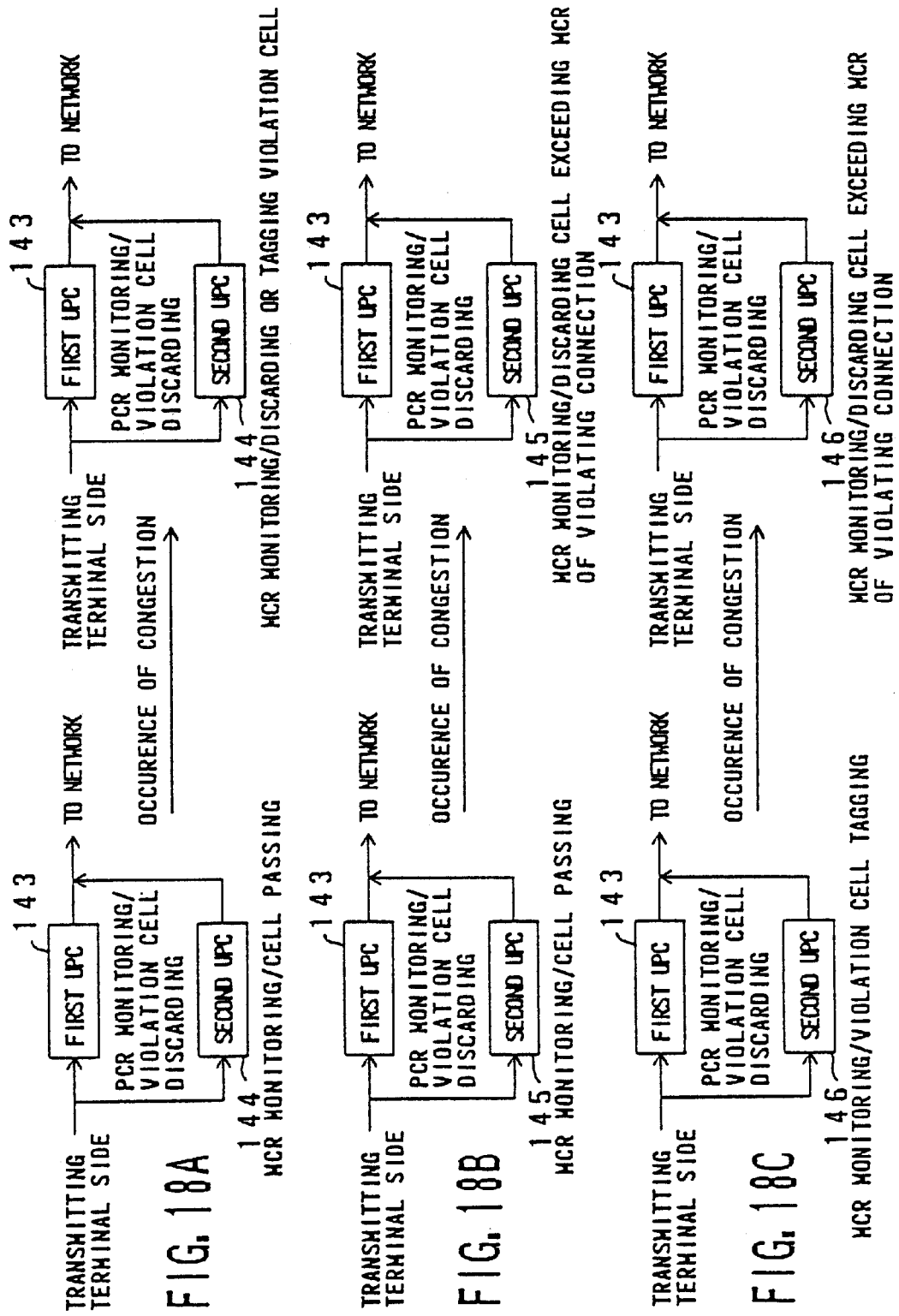
FIGS. 18A, 18B, and 18C are block diagrams showing variations of the cell flow monitor and control system shown in FIG. 17.

FIGS. 18A through 18C show variations of the cell flow monitor and control system shown in FIG. 17.

In the configuration shown in FIG. 18A, a PCR is set as a monitor rate in a first UPC 143, while an MCR is set as a monitor rate in a second UPC 144. If an ATM network is in a normal state (non-congestion state), the first UPC 143 discards a violation cell (a cell exceeding the PCR) and the second UPC 144 makes the cell pass through as it is. If the ATM network enters a congestion state, the second UPC 144 switches its operation. That is, when determining the congestion state according to an RM cell received from the ATM network, the second UPC 144 discards or tags (assigns the value "1" to the CLP bit) a violation cell (a cell exceeding the MCR). Note that setting and monitoring the PCR and the MCR are performed for each connection.

Figure 19:
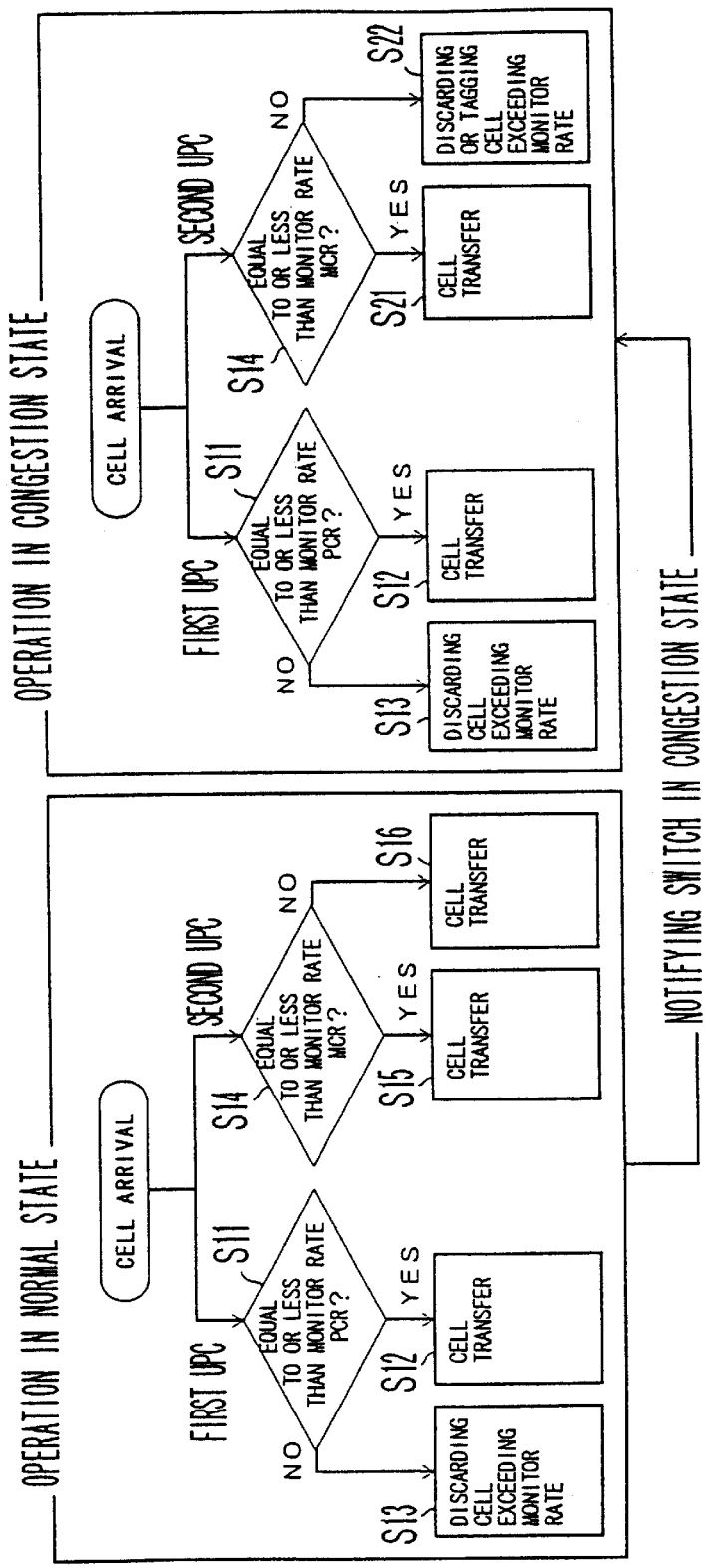
FIG. 19 is a flowchart showing operations performed by the cell flow monitor and control system shown in FIG. 18A.

FIG. 19 is a flowchart showing operations performed by the cell flow monitor and control system shown in FIG. 18A.

If an ATM network is in a normal state (non-congestion state), the first UPC 143 determines whether or not a transfer rate of an input cell is equal to or lower than a PCR in step S11. If the transfer rate of the input cell is equal to or lower than the PCR, the process goes to step S12 where that cell is transferred to an ATM network as it is. If the transfer rate of the input cell exceeds the PCR, the process goes to step S13 where a cell exceeding the PCR is discarded and a cell which does not exceed the PCR is transferred to the ATM network.

The second UPC 144 determines whether or not the transfer rate of the input cell is equal to or lower than the MCR in step S14. However, if the ATM network is in a normal state (non-congestion state), the second UPC 144 transfers that cell unchanged to the ATM network regardless of whether or not the transfer rate of the input cell is equal to or lower than the MCR in step S15 or in step S16. Thus, when the ATM network is in a normal state, only the first UPC 143 performs a monitor operation, and discards only a cell whose transfer rate exceeds the PCR.

If the ATM network is in a congestion state, the first UPC 143 performs the above described steps S11 through S13. That is, the first UPC 143 discards a cell whose transfer rate exceeds the PCR, regardless of a use-state of the ATM network.

In the meantime, if the transfer rate of the input cell is equal to or lower than the MCR in step S14, the second UPC 144 transfers that cell (makes that cell pass through) in step S21. If the transfer rate of the input cell exceeds the MCR, the process goes to step S22 where a cell whose transfer rate exceeds the MCR is discarded or tagged, and only a cell whose transfer rate does not exceed the MCR is transferred to the ATM network.

Thus, when the ATM network is in a congestion state, the cell whose transfer rate exceeds the PCR is discarded, and the cell whose transfer rate is between the MCR and the PCR is discarded or tagged.

In the configuration shown in FIG. 18B, the second UPC 145 is arranged instead of the second UPC 144 shown in FIG. 18A. In the second UPC 145, the MCR is set as a monitor rate.

If the ATM network is in a normal state (non-congestion state), the second UPC 145 makes the cell pass through as it is. If the ATM network enters a congestion state, the second UPC 145 switches its operation. That is, when recognizing a congestion state according to an RM cell received from the ATM network, the second UPC 145 discards or tags (assigns the value "1" to the CLP bit) a violation cell (cell whose transfer rate exceeds the MCR) after a predetermined time after the determination of the congestion state elapses.

The "predetermined time" is explained hereinafter. In an ABR communication, each terminal recognizes the state of use of the ATM network according to an RM cell. Once recognizing a congestion state according to the RM cell, each terminal progressively lowers the ACR at which a cell transmission to the ATM network is allowed, so that the ACR can be observed. If the congestion state of the ATM network continues, each terminal drops the ACR to the MCR set for each connection. That is, each terminal attempts to output a cell at a cell transmission rate not lower than the MCR. An approximate time from an occurrence of the congestion in the network till a drop of the ACR of each connection to the MCR can be calculated according to a configuration of the ATM network. That is, the "predetermined time" corresponds to the above described time "Tsi".

The "predetermined time" from the recognition of the congestion by the second UPC 145 till a switch of the operation corresponds to the time from the occurrence of the congestion in the ATM network till the drop of the ACR of each connection to the MCR. In such a situation, the cell transfer rate of each connection should be equal to or lower than the MCR at a point when the predetermined time elapses from the occurrence of the congestion in the ATM network. Accordingly, if a connection whose transfer rate exceeds the MCR exists even at the point when the predetermined time elapses from the occurrence of the congestion in the ATM network, it is appropriate to regard that connection as a violation connection. The second UPC 145 is intended to discard or tag a cell transferred via such a violation connection.

In the configuration shown in FIG. 18B as described above, the first UPC 143 discards only a cell whose transfer rate exceeds the PCR when the ATM network is in a normal state. The first UPC 143 selects and monitors a connection to which an instruction for dropping the transfer rate to the MCR according to control information from the ATM network is given, when the congestion occurs.

For the configuration shown in FIG. 18C, the second UPC 146 is arranged instead of the second UPC 144 shown in FIG. 18A. In the second UPC 146, the MCR is set as a monitor rate.

The second UPC 146 tags (assigns the value "1" to a CLP bit of) a violation cell (a cell whose transfer rate exceeds the MCR), when the ATM network is in a normal state (non-congestion state). If the ATM network enters a congestion state, the second UPC 146 switches its operation. That is, when recognizing the congestion state according to an RM cell received from the ATM network, the second UPC 146 discards the violation cell after a predetermined time elapses after the recognition of the congestion. The predetermined time in this case is the same as that explained earlier, by referring to FIG. 18B.

For the configuration shown in FIG. 18C as described above, the first UPC 143 discards the cell whose transfer rate exceeds the PCR, and the second UPC 146 tags a cell whose transfer rate is equal to or higher than the MCR, when the ATM network is in a normal state. Cells whose transfer rate exceeds the MCR flowing into the ATM network until the ACR of each connection drops to the MCR, are tagged. Therefore, when the ATM network transfers from the normal state to the congestion state, the tagged cells can be selected and discarded in the ATM network.

FIGS. 18A through 18C show operations in the case that the ATM network changes from the non-congestion state to the congestion state. When the ATM network changes from the congestion state to the non-congestion state, its state changes from that shown on the right-hand side to that shown on the left-hand side in these figures.

The above described principles and variations are also applicable to ABR data of a connection passing through an NNI (Network-Network Interface) between networks.

Figure 20:
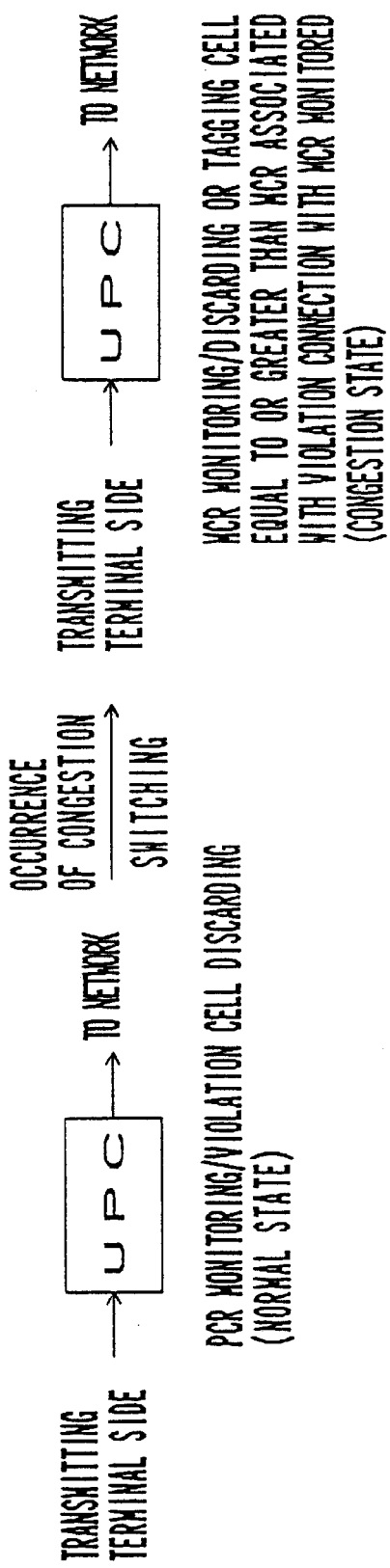
FIG. 20 is a schematic diagram showing a principle of the operations performed by a UPC for switching a monitor rate depending on a use-state of the ATM network.

FIG. 20 is a schematic diagram showing a principle of a process for switching monitor rates depending on a use-state of an ATM network, performed by a UPC.

A UPC 151 shown in this figure can switch monitor rates depending on a use-state of an ATM network (congestion/non-congestion). In the example shown in this figure, if the ATM network is in a normal state, a PCR of each connection is set as a monitor rate for each connection, and a cell whose transfer rate exceeds the PCR is discarded.

If a congestion occurs in the ATM network, the UPC 151 switches its monitor rate from the PCR to the MCR after a predetermined time elapses from the occurrence of the congestion. With this switching operation, a violation cell in a connection transmitting a cell at a transfer rate equal to or higher than the MCR, even after a sufficient amount of time elapses from the occurrence of the congestion, can be discarded.

Switching of the monitor rate (monitor parameter) is implemented by referencing a conversion table 152 storing a correspondence between each VPI/VCI and the monitor parameter. FIG. 21 shows an example of the conversion table 152. In the conversion table 152, a PCR for each VPI/VCI is included in an area of a flag bit "0", while an MCR for each VPI/VCI is included in an area of a flag bit "1".

The UPC 151 recognizes a use-state of an ATM network according to an RM cell received from the ATM network. If the ATM network is in a normal state (non-congestion state), the UPC 151 searches the area of the flag bit "0" for the conversion table using a VPI/VCI of an input cell, and retrieves a PCR corresponding to the VPI/VCI. The UPC 151 then takes advantage of the retrieved PCR to monitor a transfer rate of a connection specified by the VPI/VCI, and discards a violation cell if detected.

Once the congestion state of the ATM network is recognized, the UPC 151 searches the area of the flag bit "1" for the conversion table 152 using the VPI/VCI of the input cell, and retrieves an MCR corresponding to the VPI/VCI. The UPC 151 then takes advantage of the retrieved MCR to monitor the transfer rate of the connection specified by the VPI/VCI, and discards or tags the violation cell if detected.

According to this method, the monitor operation is performed by only one UPC, thereby reducing a hardware configuration of the UPC in size. The above described embodiment is a method for switching between the PCR and the MCR. This method can also implement a switch operation between the PCR and the ACR, or between the ACR and the MCR.

Figure 22:
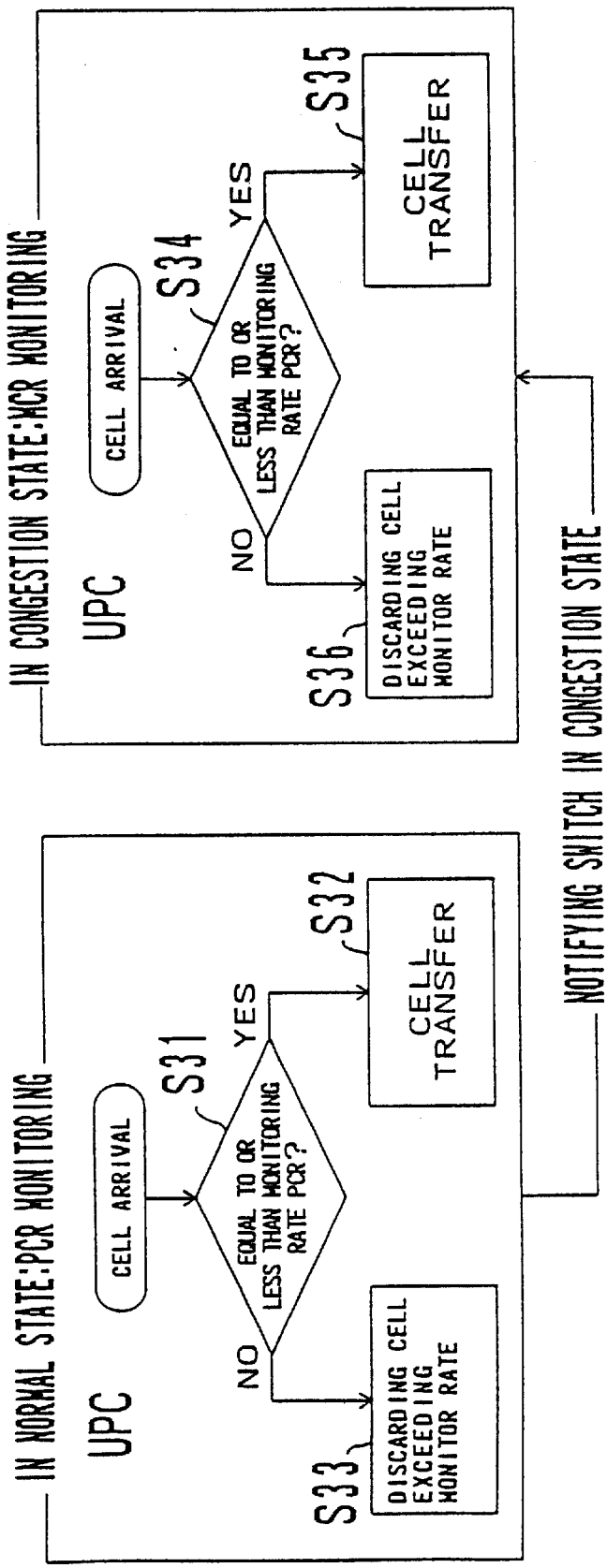
FIG. 22 is a flowchart showing operations performed by the cell flow monitor and control system shown in FIG. 20.

FIG. 22 is flowchart showing operations performed by the cell flow monitor and control system having the above described configuration.

If an ATM network is in a normal state (non-congestion state), a UPC 151 determines whether or not a transfer rate of an input cell is equal to or lower than a PCR in step S31. If the transfer rate of the input cell is equal to or lower than the PCR, the process goes to step S32 where the cell is passed to the ATM network as it is. If the transfer rate of the input cell exceeds the PCR, the process goes to step S33 where a cell whose transfer rate exceeds the PCR is discarded, and only a cell whose transfer rate does not exceed the PCR is transferred to the ATM network.

When a monitor rate of each connection is changed from the PCR to an MCR after the ATM network enters congestion state, the UPC 151 determines whether or not the transfer rate of the input cell is equal to or lower than the MCR in step S34. If the transfer rate of the input cell is equal to or lower than the MCR, the process goes to step S35 where the cell is passed to the ATM network as it is. If the transfer rate of the input cell exceeds the MCR, the process goes to step S36 where a cell whose transfer rate exceeds the MCR is discarded or tagged, and only a cell whose transfer rate does not exceed the MCR is transferred to the ATM network.

Each type of the above described UPCs monitors if a transfer rate of a cell transferred via each connection does not exceed a PCR and an MCR set for that connection, or an ACR determined for that connection depending on a use-state of the ATM network. These monitor operations are performed with, for example, the leaky bucket method. The technique for monitoring a cell transfer rate using the leaky bucket method is disclosed in, for example, TOKUGANHEI 6-264204, in detail.

The leaky bucket method applied to the UPC of this embodiment performs a count operation for each connection. That is, a count value is incremented by a predetermined value "I" each time a cell is input, and decremented at a predetermined interval "T". The predetermined value "I" and the predetermined interval "T" are determined according to values of the monitor rates PCR, MCR, and MCR. Each UPC stores the predetermined value "I" and the predetermined interval "T" determined by the monitor rates PCR, MCR, and ACR for each VPI/VCI together with these monitor rates, for example, in a conversion table 33 or 52.

The predetermined interval "T" is defined, for example, as the inverse of each of the monitor rates (or a value proportional to the inverse of each of the monitor rates). The inverse of a monitor rate is an interval between cells transferred at the monitor rate. That is, it is an expected value of the interval between cells. Thus, once the predetermined interval "T" and the predetermined "I" are suitably determined, a count value is incremented each time a cell is input, and decremented at the predetermined interval "T", on the condition that a transfer rate of the cell is equal to or lower than the monitor rate. As a result, the count value is reset to "0" (To be exact, the count value is set to the predetermined "I" each time the cell is input, and then reset to "0". This operation is repeatedly performed.)

In the meantime, if the transfer rate of the cell exceeds the monitor rate, a next cell is input before the count value is reset to "0", and the count value is incremented by that cell. As a result, the count value becomes greater than "0". Accordingly, it can be determined whether or not the transfer rate of a cell exceeds the monitor rate using this count value.

FIGS. 23A and 23B are schematic diagrams showing operations performed by a leaky bucket counter. For a cell flow monitor and control system shown in FIG. 23A, first and second UPCs operate with the leaky bucket method. By switching between monitor operations of the first and the second UPCs depending on whether or not an ATM network is in a congestion state, a cell transfer rate of each connection is monitored. A time chart in the upper portion of FIG. 23B shows operations performed by a counter arranged in the first UPC shown in FIG. 23A. A time chart in the lower portion of FIG. 23B shows operations performed by a counter arranged in the second UPC shown in FIG. 23A. The first UPC shown in FIG. 23A, which corresponds to the first UPC shown in FIG. 17 or in FIGS. 18A through 18C, is intended to monitor a PCR. The second UPC shown in FIG. 23A, which corresponds to the second UPC shown in FIG. 17 or in FIGS. 18A through 18C, is intended to monitor an MCR. Note that the first and the second UPCs shown in FIG. 23A may be implemented as a UPC in a normal state and a UPC in a congestion state as shown in FIG. 20.

As described above, the UPC implemented with the leaky bucket method monitors a transfer rate using a value of a leaky bucket counter. If the count value is equal to or greater than "0", the transfer rate of a cell is recognized to be exceeding a monitor rate. With this method applied strictly, if a fluctuation of an arrival time of a cell, etc. occurs, a state where the value of the leaky bucket counter is equal to or greater than "0" continues for a certain period, which leads to discarding the cell, though an actual cell transfer rate is equal to or lower than a monitor rate.

Therefore, for the leaky bucket method used in this embodiment, a parameter "tt" for setting a tolerance on the fluctuation of the arrival time of a cell is defined as described above. In the example shown in FIGS. 23A and 23B, "tt=1" is set in the first UPC, and "tt=2" is set in the second UPC. With these settings, when the count value is either "0" or "1" at an input of a cell to the first UPC, for example, a cell interval between a previously input cell and a currently input cell is determined as being longer than a predetermined value (an expected cell interval value according to a PCR), and the cell transfer rate is recognized as being lower than the monitor rate PCR. As a result, the cell is allowed to pass through. If the count value at the input of the cell is equal to or greater than "2", the cell interval between the previously input cell and the currently input cell is determined as being shorter than the predetermined value, and the cell transfer rate is recognized as being higher than the monitor rate PCR. As a result, the cell is discarded. If the parameter "tt" is not arranged, the cell is discarded on the condition that the count value is equal to or greater than "1" at the input of the cell. According to the method in this embodiment, the fluctuation of the arrival time of a cell has a tolerance as described above.

Provided below is the explanation about operations performed by the first and the second UPCs at an input of a cell, by referring to FIG. 23B. In this figure, an ATM network is in a normal state (non-congestion state) before a time T4, and enters a congestion state at and after a time T4. The first and the second UPCs recognize the congestion according to an RM cell received from the ATM network at the time T4.

A count value of a leaky bucket counter of the first UPC is "0", when a cell is input at a time T1. Accordingly, the cell transfer rate at this time is recognized as being equal to or lower than a monitor rate PCR, and that cell is transferred to the ATM network (indicated by "OK" in the figure). When a cell is input at a time T2, the value of the leaky bucket counter is "4". That is, the count value is greater than a parameter "tt". Accordingly, the cell transfer rate at that time is recognized as exceeding the monitor rate PCR, and the cell is discarded. When the cell is discarded, the count value is not incremented at that time. When a cell is input at a time T3, the count value is "1". The cell transfer rate at this time is therefore recognized as being equal to or lower than the monitor rate PCR, and the cell is transferred to the ATM network. As described above, when the ATM network is in a non-congestion state, the first UPC discards a violation cell whose transfer rate exceeds the PCR.

When the congestion is recognized at the time T4, the count value of the leaky bucket counter in the first UPC is examined. If the count value is equal to or less than the parameter "tt" ("0" or "1" in this case), monitor operations of the first and the second UPCs are switched. That is, the first UPC stops its monitor operation, while the second UPC sets an MCR as a monitor rate, and discards a cell in case the transfer rate exceeds the MCR. If the count value exceeds than the parameter "tt", the monitor operations of the first and the second UPCs are not switched.

In the example shown in FIGS. 23A and 23B, a time when the above described count value is equal to the parameter "tt" since the time T4, is a time T6. Accordingly, in the period between the time T4 and the time T6, the first UPC continues the monitor operation based on the PCR, though the ATM network is in a congestion state. Therefore, when a cell is input at a time T5, it is recognized as a violation cell exceeding the PCR, and discarded.

When the count value of the leaky bucket counter in the first UPC is equal to or less than the parameter "tt" at the time T6, the monitor operations of the first and the second UPCs are switched. At and after the time T6, the first UPC stops its monitor operation, while the second UPC performs its monitor operation using the MCR. That is, when a cell is input, the count value of the leaky bucket counter in the second UPC is examined. If the count value is equal to or greater than the parameter "tt" (=2), the input cell is discarded. In the example shown in FIGS. 23A and 23B, the input cell is discarded at a time T7.

In the period between the time T4 and the time T6 as described above, the ATM network is in a congestion state, and the count value of the leaky bucket counter in the first UPC is equal to or greater than the parameter "tt". Accordingly, if a cell is input in this duration, that cell must be discarded. If the monitor operations of the first and the second UPCs are immediately switched at the time T4, a cell input at and after the time T4 will be monitored by the second UPC. Since an initial value of such a leaky bucket counter is "0" in general, a cell input at the time T5, for example, is not discarded by the second UPC. If the monitor operations of the first and the second UPCs are switched simultaneously with the occurrence of the congestion, a cell to be discarded by the first UPC in the period from the time T4 till the time T6 will flow into the ATM network. The method according to this embodiment prevents a violation cell from flowing into the ATM network when the monitor operations are switched.

The above described cell flow monitor and control system in the ABR communication is also applicable to ABR data of a connection passing through an NNI (Network-Network Interface) between networks.

In the above described embodiment, the UPC discards or tags a violation cell whose transfer rate exceeds a monitor rate in a connection, when the ATM network enters a congestion state. In the next embodiment, a unit for obtaining an actual cell transfer rate is arranged outside a UPC. This unit allows an identification of a connection whose transfer rate exceeds a monitor rate, and notifies the UPC of the identified connection. The explanation about this embodiment is provided below.

FIG. 24 is a block diagram showing a cell flow monitor and control system comprising a cell transfer rate observation device arranged outside a UPC.

An observation device 161 is composed of an arrival cell number count unit 162 and a control unit 163. The arrival cell number count unit 162 counts the number of arrived cells for each predetermined period for each connection, and estimates an average data transmission rate of each connection for the predetermined period. If an ATM network enters a congestion state, a connection whose cell transfer rate exceeds an MCR even after a predetermined time elapses from the occurrence of the congestion, is identified, and the control unit 163 notifies a UPC 164 of identification information of such a connection. The UPC 164 in this case corresponds to one or a plurality of UPCs in the above described embodiment.

Figure 25:
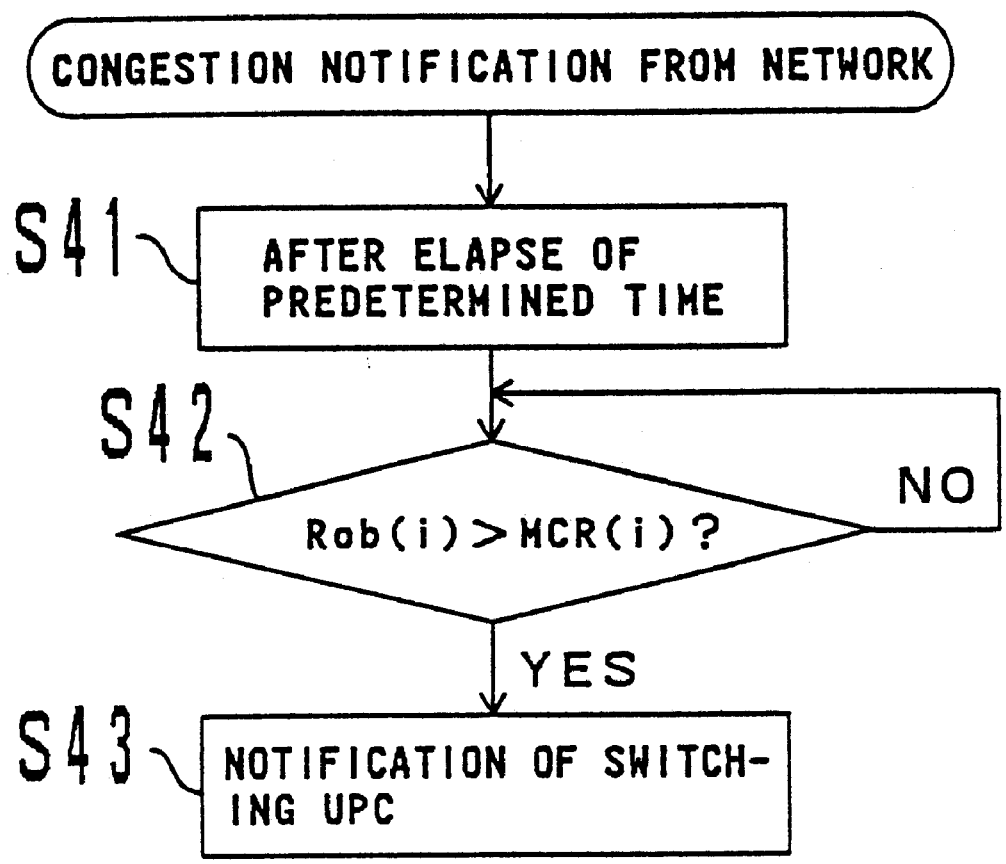
FIG. 25 is a flowchart showing operations performed by the cell flow monitor and control system shown in FIG. 24.

FIG. 25 is a flowchart showing operations performed by an observation device 161. When recognizing that an ATM network enters a congestion state according to an RM cell, the observation device 161 waits for a predetermined time to elapse in step S41. The predetermined time in this case is the same as that explained earlier by referring to FIG. 18B.

In step S42, a cell transfer rate Rob is obtained for each connection according to the number of cells input in an observation period, and compared with a monitor rate MCR set for each connection. If there is a connection whose cell transfer rate Rob exceeds the monitor rate MCR as a result of the comparison, the process goes to step S43 where an instruction for switching a monitor operation performed by a UPC associated with that connection is notified to the UPC 164. The UPC 164 switches the monitor operation associated with the connection specified by the received notification. With this switching operation, the states of the UPCs are shifted from the left-hand side to the right-hand side of the diagrams shown in FIGS. 18A through 18C.

As described above, the cell flow control and monitor system is configured by arranging the observation device for measuring a cell transfer rate outside a UPC. By using the observation device, a connection whose cell transfer rate exceeds a monitor rate is retrieved and notified to the UPC. Therefore, in the case the monitor operation of the UPC is switched, it is no longer necessary to switch the operation for all of the connections. Normally, each UPC monitors a large number of connections. Therefore, if the monitor operation is switched for all of the connections at the time of an occurrence of a congestion, a processor resource is exclusively used for a certain period. This may affect another process. With the method according to this embodiment, a monitor operation of a UPC is switched only for a connection whose actual transfer rate exceeds a monitor rate, thereby avoiding such a problem.

FIGS. 26A and 26B are block diagrams showing variations of the configuration shown in FIG. 24. FIG. 26A shows a configuration where an observation device 161 is arranged in series with a UPC 164, while FIG. 26B shows a configuration where an observation unit 161 and a UPC 164 are arranged in parallel. Operations of the observation device 161 shown in FIG. 26A or in FIG. 26B conform to the flowchart shown in FIG. 25.

For the configurations shown in FIGS. 24, 26A and 26B, the observation device is arranged outside the UPC in order to measure a transfer rate of a cell. Also a conventional capability equipped in an ATM network may be used to obtain a result of such a measurement. For example, an NDC (Network Data Correction) capability in the ATM network is available for estimating a cell transfer rate of a cell for each connection in an ABR communication.

Otherwise, a counter for incrementing (or decrementing) its count value by a predetermined value at an arrival of a cell, and decrementing (or incrementing) the count value at predetermined intervals, may be arranged instead of the observation device 161. In this case, an average transfer rate of a cell in each connection can be estimated by running the above described counter for a predetermined observation period for each connection, and dividing a difference between a count value at an observation start and a count value at an observation end by the observation period. Thus, a connection transmitting a cell at a rate equal to or higher than an MCR can be determined.

Figure 27:
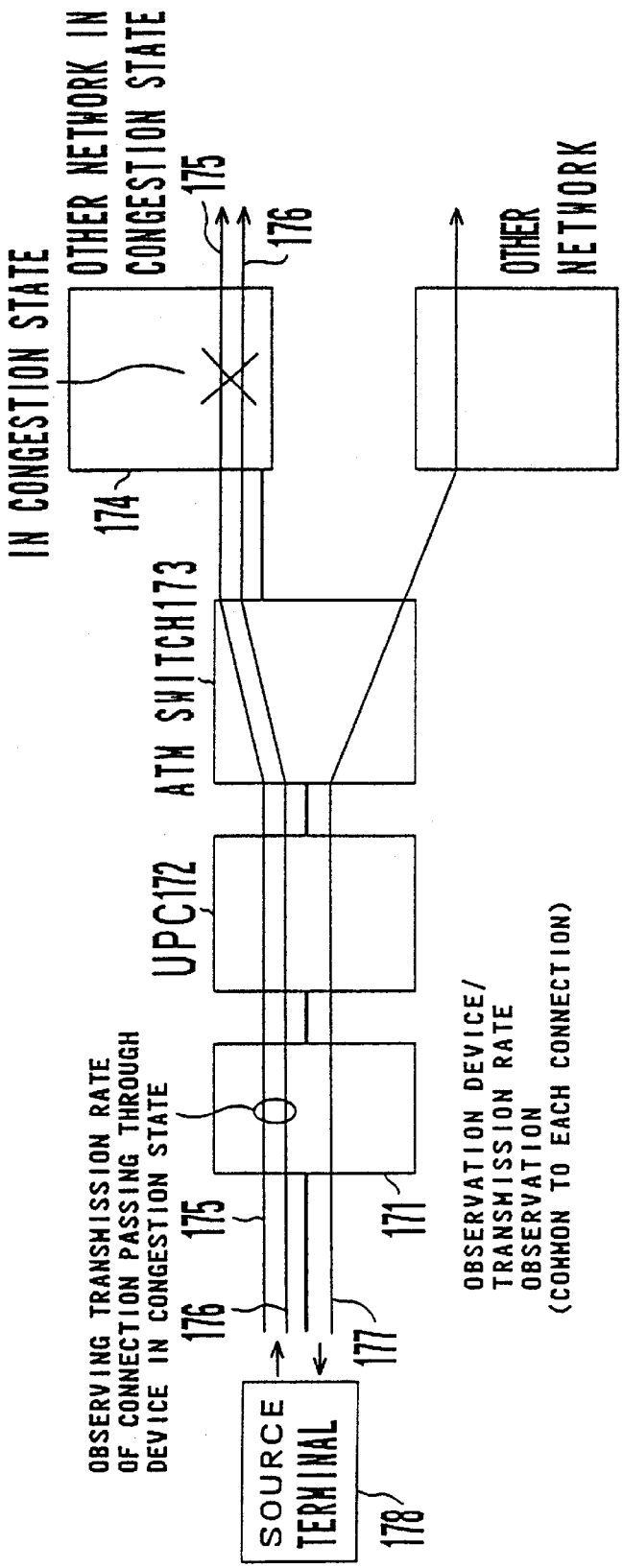
FIG. 27 is a schematic diagram showing a configuration where a cell transfer rate observation device is arranged in common with a plurality of connections.

FIG. 27 is a block diagram showing a configuration where a unit for measuring a cell transfer rate is arranged in common with a plurality of connections.

In this figure, an observation unit 171 measures cell transfer rates in connections 175 through 177 monitored by a UPC 172 The observation unit 171 does not perform an observation operation in a normal state (non-congestion state). If a congestion occurs in an ATM network, the observation unit 171 performs an observation capability only for a connection passing through a unit where the congestion occurs. In the example shown in FIG. 27, a network 174 connected via an ATM switch 173 is in a congestion state. In this case, the observation unit 171 measures only the transfer rates of the connections 175 and 176 to the network 174. When an RM cell is returned to a source terminal 178 via the connections 175 and 176, the observation unit 171 determines that the network 174 is in a congestion state by extracting the RM cell.

The observation unit 171 checks to see if each of the cell transfer rates of each of the connections 175 and 176 does not exceed an MCR set for each of the connections. If it exceeds the MCR, this is notified to the UPC 172. Thus, a shared use of the observation capability can reduce an amount of hardware for the observation capability.

Provided next is the explanation about a method for estimating a cell transfer rate of an ABR communication using a leaky bucket counter. A PCR is assumed to be set as a monitor parameter in this case. This method takes advantage of a duration where a value of the leaky bucket counter is not "0", and a value of the monitor rate PCR.

The following explanation assumes an observation duration where the cell transfer rate is estimated as a "Tob", and a duration where the value of the leaky bucket counter is not "0" in the duration "Tob" as "Tcounter>0". An expected cell interval value at a transfer rate PCR, that is, the inverse of the PCR, is also assumed as a "TPCR".

Assuming that "N" cells arrive in the observation duration "Tob", an average value of the cell transfer rate is obtained by "N/Tob". The number of arrived cells "N" is therefore N=Tcounter>0/TPCR according to the leaky bucket algorithm. As a result, the average value of the cell transfer rate is represented by:

$$\begin{aligned}\text{transfer rate } N \,/\, \text{Tob} &= (\text{Tcounter>0} \,/\, \text{TPCR}) \cdot 1\,\text{Tob} \\ &= (1/\text{TPCR}) \cdot (\text{Tcounter>0} \,/\, \text{Tob}) \\ &= \text{PCR} \cdot (\text{Tcounter>0} \,/\, \text{Tob})\end{aligned}$$

As described above, the average value of the cell transfer rate can be estimated using the PCR set for each connection, the observation duration "Tob" where the cell transfer rate is estimated, and the duration "Tcounter>0" where the value of the leaky bucket counter is not "0", without counting an actual number of arrived cells.

In an ABR communication, a cell transfer rate at which a cell transmission from each source terminal to an ATM network is allowed, is determined according to resource information in the ATM network. The determined cell transfer rate is set in a specific resource information cell (RM cell), and the RM cell is transmitted to the source terminal. When the RM cell is received, the source terminal determines its own transmission rate in order to obey the transfer rate included in the RM cell, transmits a cell at that transmission rate, generates an RM cell in which the transmission rate is written, and outputs the generated RM cell to the ATM network.

Since a cell transfer rate allowed for a transmission from a terminal to an ATM network varies depending on a state of resources (a use state) in the ATM network in the ABR communication as described above, a rate monitored at an entry point of the ATM network must be dynamically changed depending on the use state of the resources in the ATM network. Provided below is the explanation about an embodiment of the cell flow monitor and control system for monitoring a cell transfer rate while dynamically changing a monitor rate.

Figure 28:
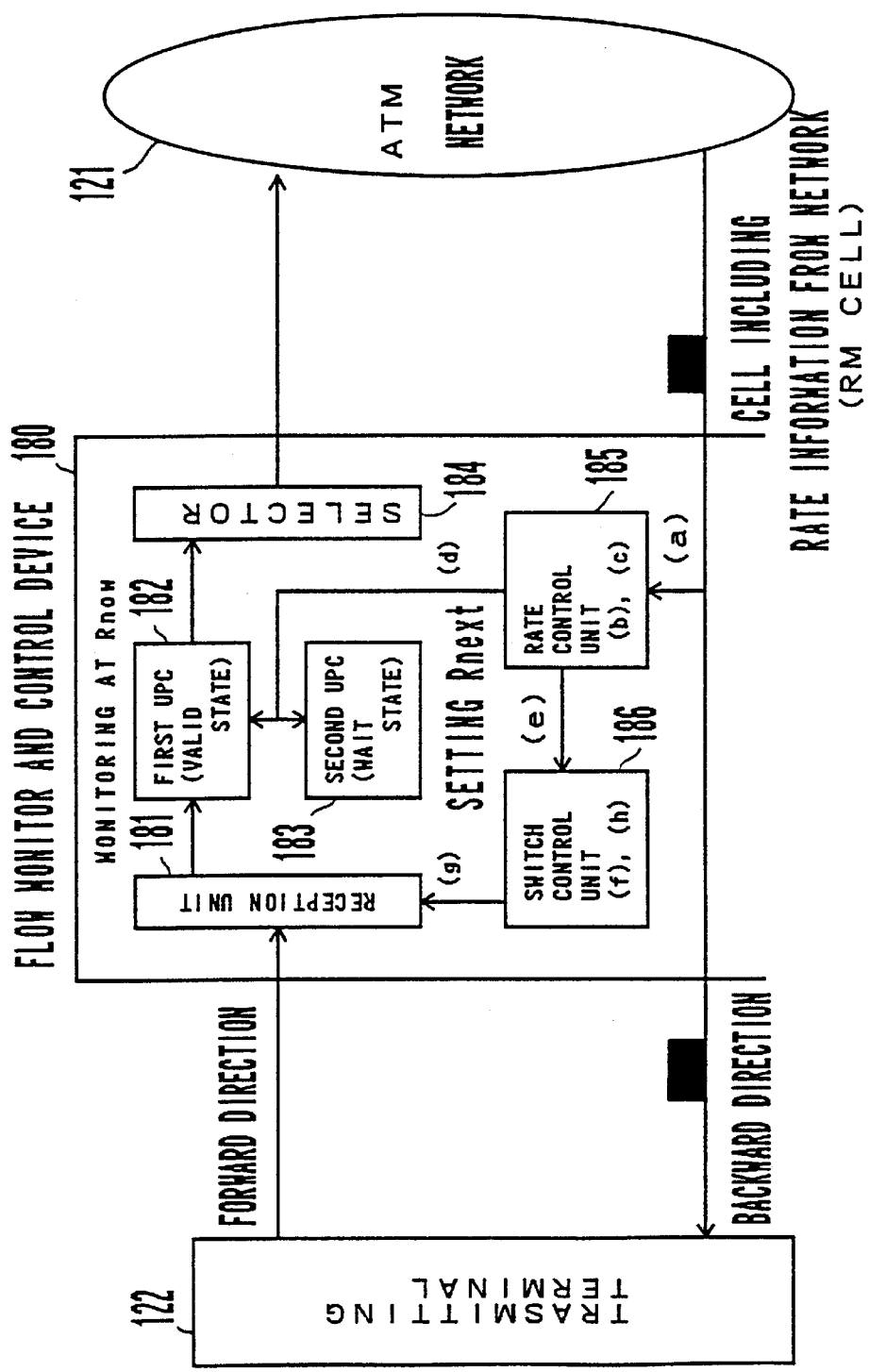
FIGS. 28 and 29 are block diagrams showing a cell flow monitor and control system for monitoring a cell transfer rate while changing a monitor rate dynamically.

FIG. 28 is a block diagram showing a cell flow monitor and control system for monitoring a cell transfer rate while dynamically changing a monitor rate.

In this figure, a flow monitor and control device 180, which is arranged in a UNI equivalent to an entry point of an ATM network 121, monitors a transfer rate of a cell transmitted from a transmitting terminal 122. A reception unit 181 passes the cell transmitted from the transmitting terminal to a first UPC 182 and a second UPC 183 according to an instruction given by a switch control unit 186. The first UPC 182 or the second UPC 183 monitors a transfer rate of an input cell using a monitor rate set by a rate control unit 185, discards or tags the input cell depending on need, and outputs the cell to the ATM network 121 via a selector 184.

In the above described configuration, either of the first UPC 182 and the second UPC 183 operates in a valid state in order to monitor the transfer rate of the input cell using the monitor rate set by the rate control unit 185. The other of the UPCs, which is in a wait state, sets a monitor parameter notified from the rate control unit 185. The input cell is passed to the first UPC 182 and the second UPC 183, but the UPC in a wait state does not perform its monitor operation, and makes the cell pass through as it is. Note that information for preventing the cell from being selected by the selector 184 is written to the cell passing through the UPC in a wait state.

Operations performed by the rate control unit 185 are as follows.
(a) Retrieves an RM cell returned from the ATM network to the transmitting terminal 122. The RM cell includes a cell transfer rate "Rnet" allowed for a transmission from the transmitting terminal 122 to the ATM network 121, which is determined depending on a use state of the ATM network. The rate control unit 185 extracts the cell transfer rate "Rnet". The rate "Rnet" indicates an ER value of the RM cell in this case.
(b) Calculates a cell transfer rate "Ra" allowed for a transmission from the transmitting terminal 122 to the ATM network 121, according to the same cell transfer rate determination algorithm as that of the transmitting terminal 122. That is, the cell transfer rate is determined using a PCR and an MCR set by a user of the transmitting terminal 122 for each connection, information indicating whether or not the ATM network is in a congestion state, etc. This cell transfer rate is an ACR. Thus, the cell transfer rate of the transmitting terminal 122 can be estimated in advance by determining the same cell transfer rate as that of the transmitting terminal 122 in the rate control unit 185. The "Ra" is the same as the rate ACR calculated by the transmitting terminal 122.
(c) Makes a comparison between the above described cell transfer rates "Rnet" and the "Ra".
(d) Sets a smaller value as a result of the comparison in a UPC currently in a wait state as the cell transfer rate "Rnext". In the example shown in FIG. 28, the second UPC 183 is currently in a wait state. Therefore, the rate control unit 185 sets the cell transfer rate "Rnext" in the second UPC 183 as a monitor parameter.
(e) Notifies the switch control unit 186 of the cell transfer rate "Rnext" simultaneously with the above described process (d).

Operations performed by the switch control unit 186 are as follows.
(f) Makes a comparison between the cell transfer rate received from the rate control unit 185 and a monitor rate "Rnow" of a UPC currently in a valid state. In the example shown in FIG. 28, the first UPC 182 is currently in a valid state. Therefore, the switch control unit 186 makes a comparison between the above described cell transfer rate "Rnext" and the transfer rate "Rnow" used in the first UPC 182.
(g) Immediately switches the operations of the two UPCs in case Rnext>Rnow as a result of the comparison. That is, the second UPC 183 currently in a wait state is validated in order to perform a cell flow monitor operation, while the first UPC 182 currently in an active state is made to enter a wait state.

In case Rnext<Rnow as a result of the comparison, the above described switch process is performed after a predetermined time has elapsed. The predetermined time in this case is the same as that explained earlier by referring to FIG. 18B. It indicates an estimated time required for dropping a cell transfer rate to an MCR in the transmitting terminal 122 after an occurrence of a congestion in the ATM network 121.

After the switch process is performed, the second UPC 183 performs its monitor operation using the above described cell transfer rate "Rnext".
(h) After the switch process is performed, the second UPC 183 replaces the cell transfer rate "Rnext" with the "Rnow". When receiving a next RM cell, the rate control unit 185 performs the above described operations (f) and (g).

The reason why the switch process is delayed by a predetermined amount of time in case Rnext<Rnow in the above described (g) is provided below. Rnext<Rnow means that a monitor rate to be set next is lower than a current monitor rate. The cell transfer rate of the transmitting terminal 122 must be lowered in order not to exceed the lower monitor rate. In other words, when Rnext<Rnow, switching the operations of the UPCs causes a flow of cells into the ATM network to be controlled more strictly.

In the meantime, an amount of delay time exists between when the transmitting terminal 122 recognizes a cell transfer rate allowed for a transmission to the ATM network 121 by receiving an RM cell, and when the transmitting terminal 122 can actually output a cell at the recognized cell transfer rate. Therefore, once the flow monitor and control device 180 controls the flow of cells into the ATM network 121 more strictly by setting the cell transfer rate "Rnext" upon receipt of the RM cell, the strict flow control has started before the transmitting terminal 122 drops the cell transfer rate as far as needed. Therefore, more cells than necessary are discarded. This embodiment can prevent such a problem.

In case Rnext>Rnow, the flow of cells into the ATM network becomes less strictly controlled by switching the operations of the UPC. Therefore, no problem may arise even if the operations of the UPC are immediately switched.

According to the cell flow monitor and control system configured as above, two UPCs are arranged. While either of the UPC performs a monitor operation, the other UPC sets a monitor parameter to be used next. Accordingly, even if a cell transfer rate continuously varies, a flow of cells can be quickly controlled for the varying cell transfer rate.

Figure 29:
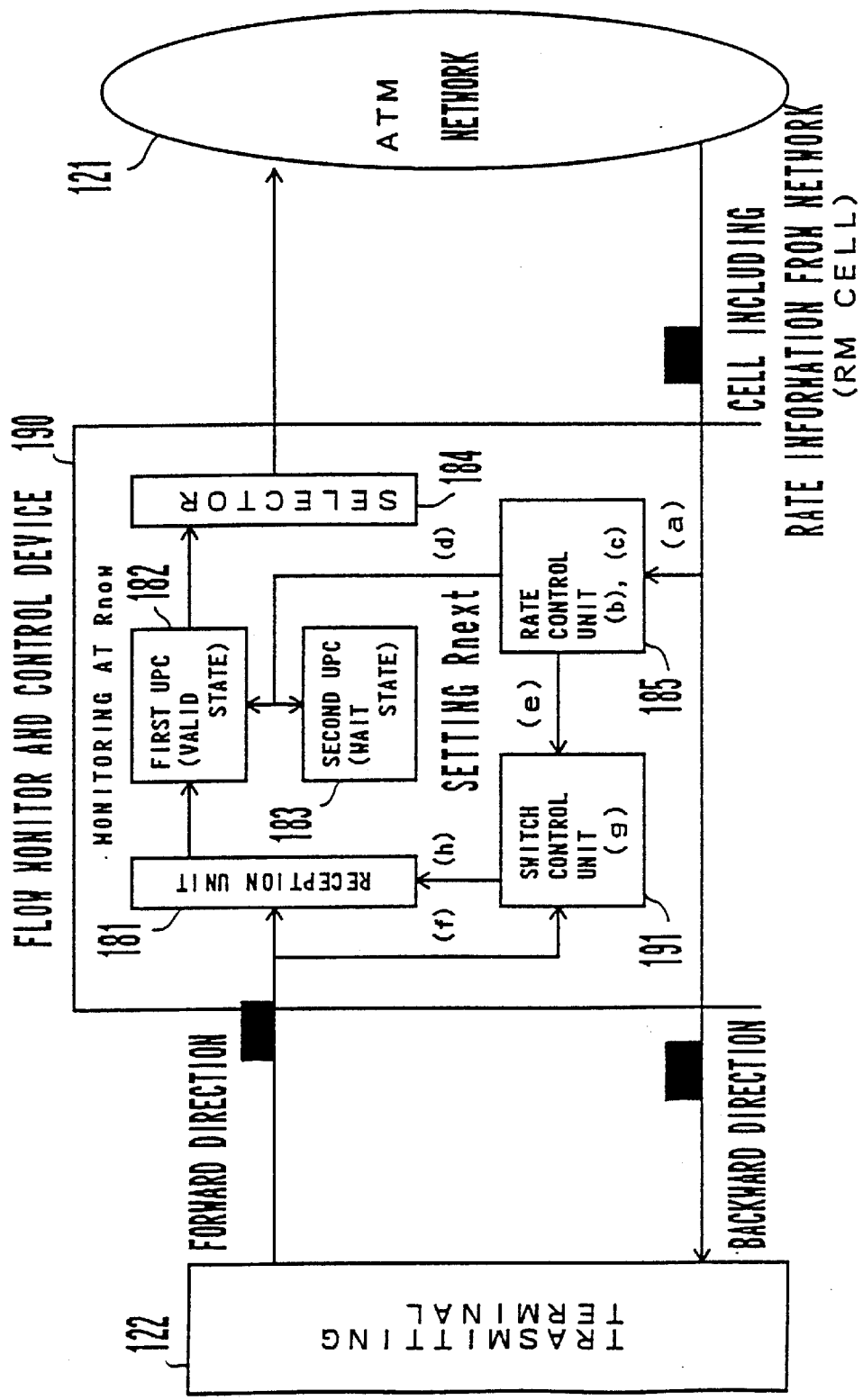

FIG. 29 is a block diagram showing another configuration of the cell flow monitor and control system for monitoring a cell transfer rate while dynamically changing a monitor rate. A flow monitor and control device 190 shown in FIG. 29 takes advantage of a cell transfer rate of a transmitting terminal 122 written to an RM cell transmitted from the transmitting terminal 122. In this figure, the same reference numerals as those used in FIG. 28 indicate the same portions.

In FIG. 29, operations (a) through (e) performed by a rate control unit 185 are the same as those performed by the flow monitor and control device 180 shown in FIG. 28, as described above. Operations performed by a switch control unit 191 are described below.
(f) Receives an RM cell transmitted from the transmitting terminal, and extracts a cell transfer rate Rt written to the RM cell.

(g) Makes a comparison between a cell transfer rate Rnext received from the rate control unit 185 and a monitor rate Rnow in the first UPC 182 currently in a valid state.

(h) Issues an instruction for immediately switching the operations of the two UPCs in a similar manner as in the switch control unit 186 explained earlier by referring to FIG. 28, in the case Rnext>Rnow is a result of the comparison. That is, the second UPC 183 currently in a wait state is validated in order to perform a cell flow monitor operation using the cell transfer rate Rnext, and the first UPC 182 currently in a valid state is made to enter a wait state.

If Rnext<Rnow as a result of the comparison, the cell transfer rate Rnext is compared with the cell transmission rate Rt of the transmitting terminal extracted in (f). When Rnext equals Rt, the instruction for switching the operations of the two UPCs is executed.

As described above, in case Rnext<Rnow, that is, if a flow control of cells into the ATM network becomes stricter, the flow control is not performed until the rate Rnow at which the transmitting terminal 122 actually transmits a cell equals the monitor rate Rnext to be set at a next timing. Therefore, it can be determined whether or not a cell observing the rate to be monitored passes through a UNI.

Provided below is the explanation about a configuration where one UPC dynamically sets a plurality of parameters in order to monitor and control a flow of packets. With the following configuration, one flow monitor device (UPC) can monitor the parameter which dynamically varies, by dynamically setting a varying parameter, like an ACR, in the device. In addition, a fixed parameter and the varying parameter can be monitored by connecting with a conventional UPC in parallel.

Figure 30:
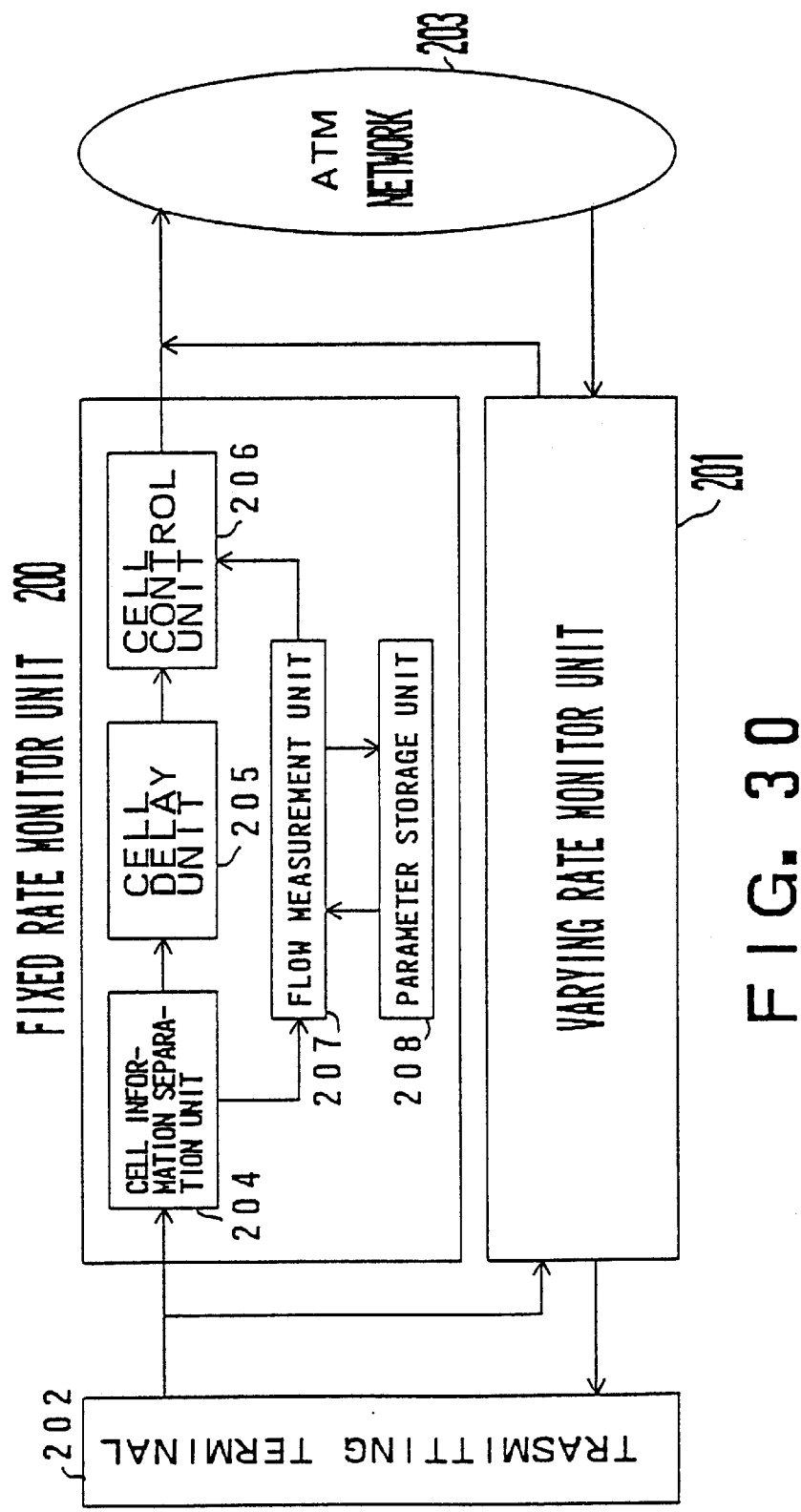
FIG. 30 is a block diagram showing a concept of the cell flow monitor and control system for monitoring the cell transfer rate while changing the monitor rate dynamically, where one UPC monitoring a varying rate is included.

FIG. 30 is a block diagram showing a configuration where a usage parameter control device, to be described later, is applied to the above described packet flow monitor and control device.

The usage parameter control device to be described later, is different from the above described UPC, and intended to monitor a varying parameter alone. In FIG. 30, a fixed rate monitor unit 200, which is used for a conventional system or in the above described embodiment, is intended to monitor one fixed rate only. A varying rate monitor unit 201 is a usage parameter control device to be described later. For example, the fixed rate monitor unit 200 monitors a PCR, while the varying rate monitor unit 201 monitors a varying rate such as an ACR.

The fixed rate monitor unit 200 may be implemented as a unit for monitoring an MCR instead of monitoring the PCR.

Figure 1:
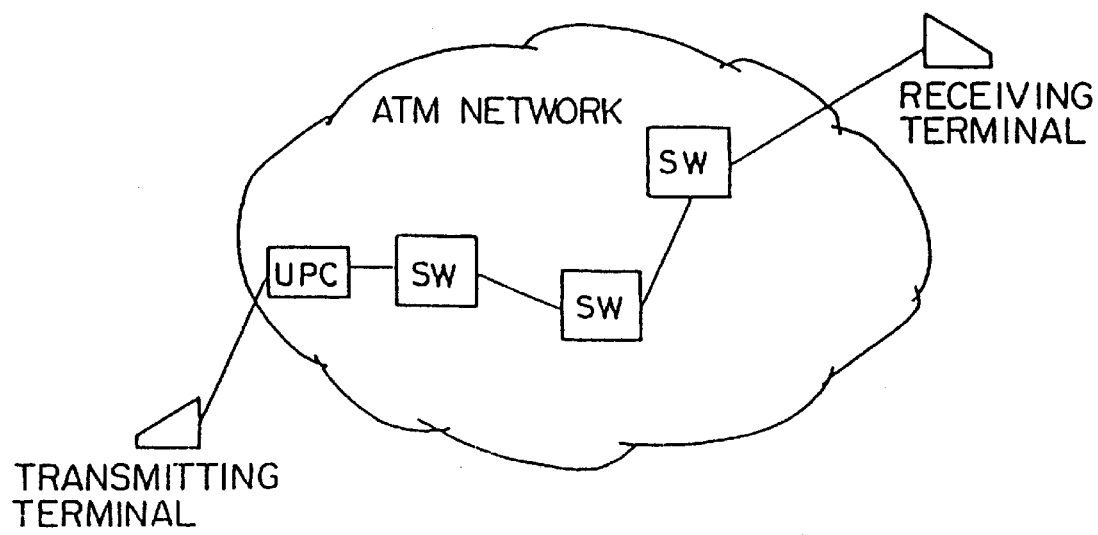
FIG. 1 is a schematic diagram showing an ATM network.
Figure 2A:
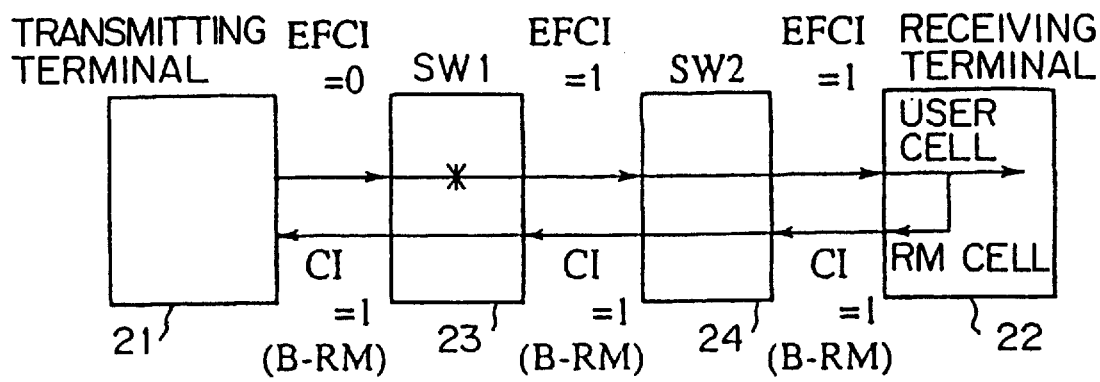
FIGS. 2A and 2B are schematic diagrams showing a process of a congestion notification.
Figure 2B:
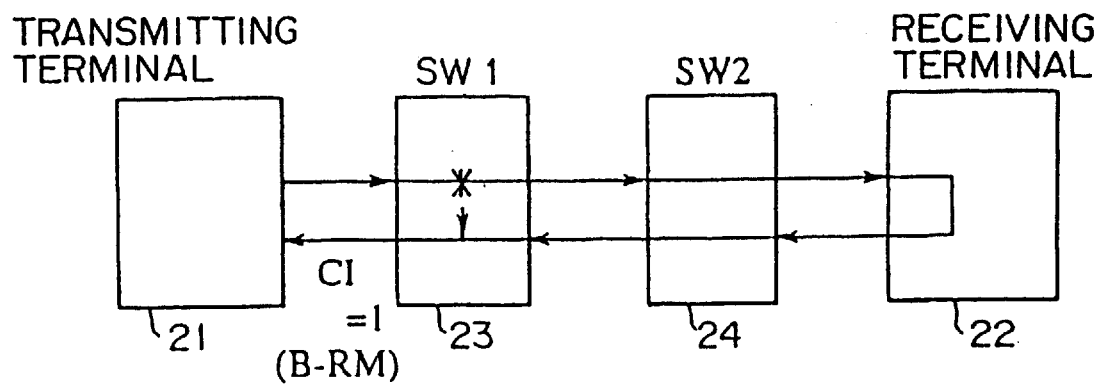
Figure 4:
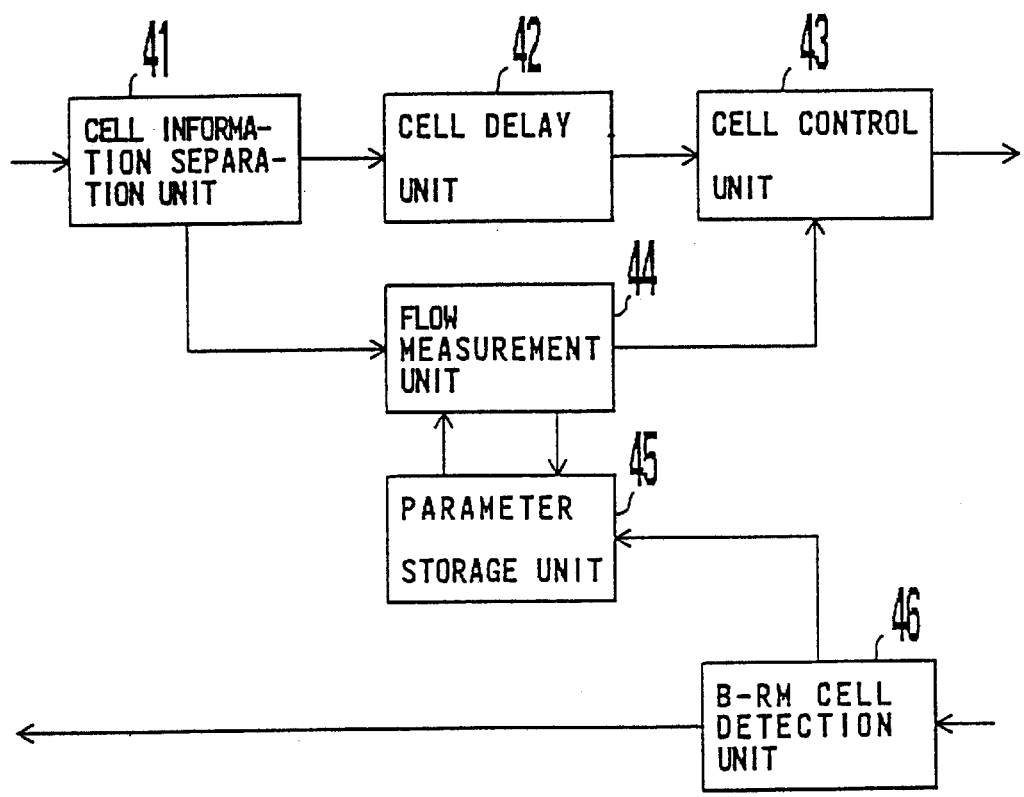
FIG. 4 is a block diagram showing a conventional usage parameter control device.

The configuration of fixed rate monitor unit 200 is the same as that explained by referring to FIG. 4, but a B-RM cell detection unit is omitted. A parameter storage unit 208 stores a parameter reported by a user. A cell information separation unit 204 identifies a VPI/VCI in a header of a cell transmitted from the user. A flow measurement unit 207 measures a flow of user cells for each VPI/VCI, and compares an amount of the flow of user cells with the value reported by the user. A cell control unit 206 discards or tags a user cell exceeding the value reported by the user. A cell delay unit 205 compensates for a delay of a process caused by the flow measurement unit 207, etc., and transmits the cell to the cell control unit 206.

The fixed rate monitor unit 200 determines whether or not an arrived cell is a violation cell according to a monitor parameter stored in the parameter storage unit 208, using the leaky bucket algorithm in the flow measurement unit 207. If a monitor rate is a PCR, a violation cell is discarded. If the monitor rate is an MCR, the violation cell is tagged, thereby discarding the tagged cell whose transfer rate exceeds the MCR when a congestion occurs in an ATM network 203.

Figure 31:
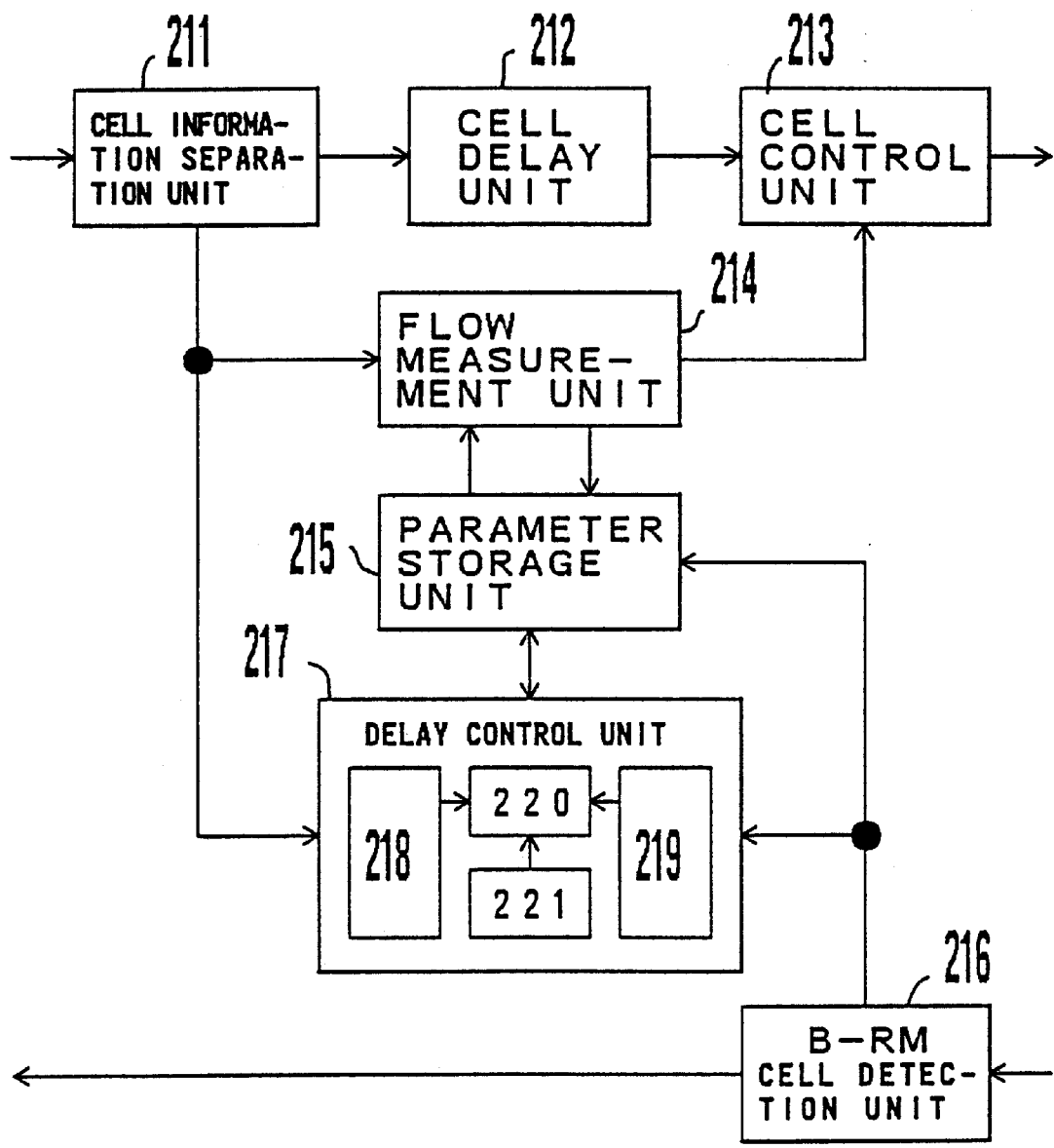
FIG. 31 is a block diagram showing the first embodiment of a usage parameter control unit as a varying rate monitor unit.

FIG. 31 is a block diagram showing a configuration of the first embodiment where one usage parameter control device dynamically updates a parameter. 211 indicates a cell information separation unit; 212 indicates a cell delay unit; 213 indicates a cell control unit; 214 indicates a flow measurement unit; 215 indicates a parameter storage unit; 216 indicates a B-RM cell detection unit; 217 indicates a delay control unit; in which 218 indicates a user cell arrival time register; 219 indicates a B-RM cell passage time register; 220 indicates a time comparison unit; and 221 indicates a delay standard value register. The configuration shown in FIG. 31 corresponds to the varying rate monitor unit 201 shown in FIG. 30.

The cell information separation unit 211, the cell delay unit 212, the cell control unit 213, and the flow measurement unit 214 perform operations in a similar manner as in a conventional system: the cell information separation unit 211 extracts a virtual path identifier VPI or a virtual channel identifier VCI from a header of a user cell; the flow measurement unit 214 measures a flow of user cells for each connection, and determines whether or not an arrived user cell is a violation cell according to a parameter such as an allowed cell rate, etc. stored in the parameter storage unit 215; and the cell control unit 213 discards or tags the violation cell.

The delay control unit 217 sets a passage time of a B-RM cell of a connection according to the VPI/VCI detected by the B-RM cell detection unit 216, to the B-RM cell passage time register 219, sets an arrival time of a user cell corresponding to a connection according to the VPI/VCI in the user cell arrival time register 218. The time comparison unit 220 obtains a time from the passage of the B-RM cell till the arrival of the user cell according to a difference between the contents of the B-RM cell passage time register 219 and the contents of the user cell arrival time register 218, and makes a comparison between the obtained time and a maximum value τ2 and a minimum value τ3 of delay standard values in a connection according to the VPI/VCI set in the delay standard value register 221, so that the parameter switch control can be performed.

Figure 32:
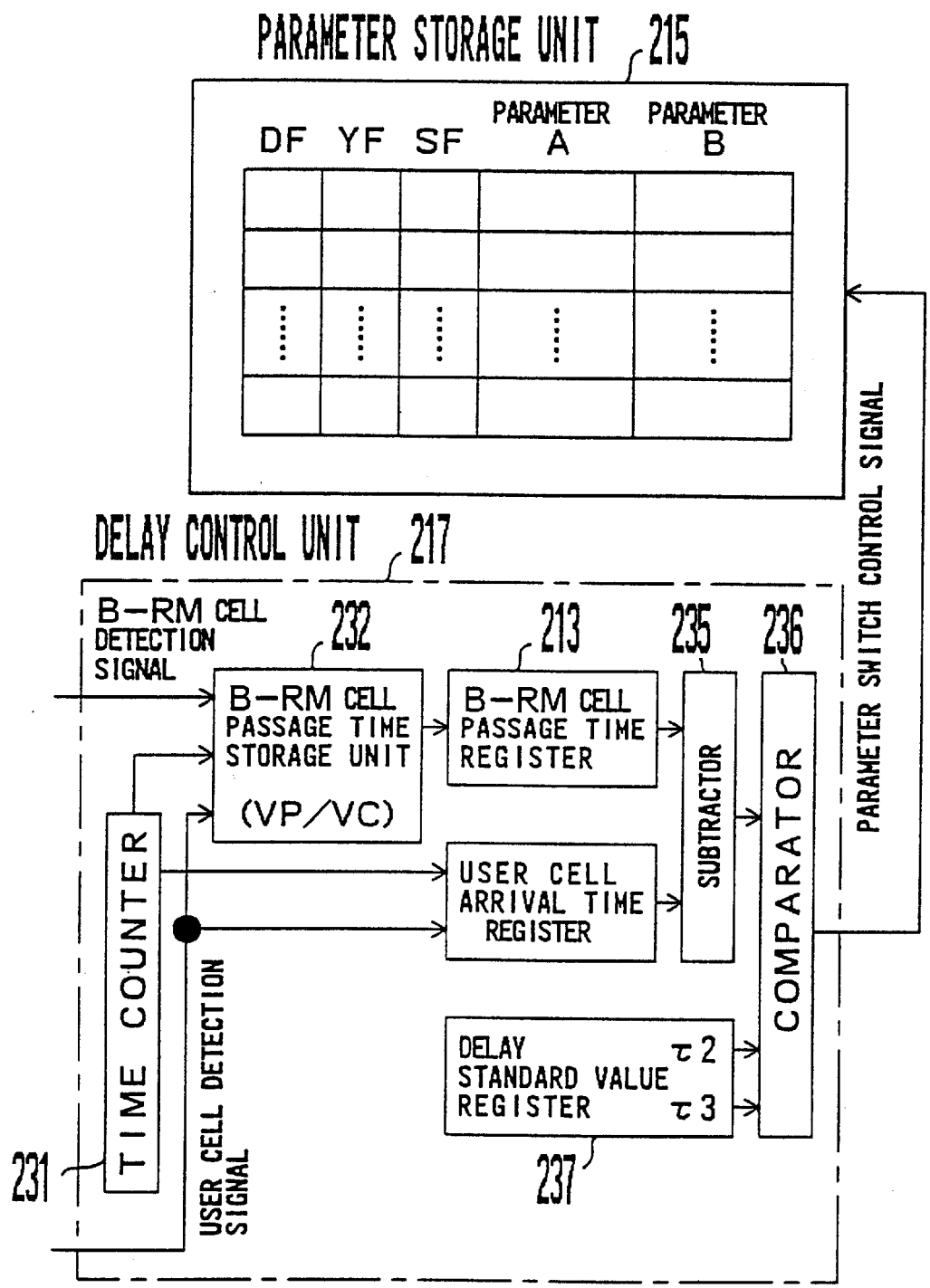
FIG. 32 is a block diagram showing a delay control unit and a parameter storage unit according to the first embodiment shown in FIG. 31.

FIG. 32 is a block diagram showing a delay control unit and a parameter storage unit of the usage parameter control unit in the first embodiment of the usage parameter control device according to the present invention. A parameter storage unit 215 includes an area corresponding to a connection where a greater/smaller flag DF, a valid area flag YF, a new parameter validity flag SF, a parameter A area, and a parameter B area are formed. Additionally, the delay control unit 217 comprises a time counter 231, a B-RM cell passage time storage unit 232, a B-RM cell passage time register 233, a user cell arrival time register 234, a subtractor 235, a comparator 236, and a delay standard value register 237.

The parameter A and B areas included in the parameter storage unit 215 respectively store a parameter used for a usage parameter control. This figure shows a case where the two parameter areas are included. If a parameter area switch often occurs, more parameter areas can be arranged. Note that the minimum number of the parameter areas is 2.

If the value of the valid area flag YF is, for example, "0", it indicates that the parameter A area is the valid area, while the "1" of the valid area flag YF indicates that the parameter B area is the valid area. Accordingly, by changing the value of the valid area flag YF from "0" to "1", the parameter A area can be switched to an invalid state, and the parameter B area is switched to a valid state. As a result, an operation unit, which is not shown in the attached drawing which is intended to perform a cell flow measurement and a determination of a violation cell, performs an operation by reading a parameter from the parameter area indicated as being valid by the valid area flag YF, thereby realizing a change of the parameter by changing of the valid area flag YF. For a rewrite, the parameter must written to an invalid area indicated by the valid area flag YF.

The greater/smaller flag DF indicates if the value of the parameter in the invalid area is either greater or smaller than the value of the parameter in the valid area. The "1", for example, indicates that the parameter in the invalid area is greater. The value "0" indicates that the parameter of the invalid area is smaller. The new parameter validity flag SF indicates whether or not a new parameter exists. If the parameter of the invalid area is a new parameter, the value of the SF is "1". If a parameter of the invalid area is not a new parameter (in a case where no B-RM cell passes, or in a case where a switch to the new parameter is completed), the value of the SF is"0". The time comparison unit 220 shown in FIG. 31 is composed of the subtractor 235 and the comparator 236 in the delay control unit 217. The user cell arrival time register 234 corresponds to the user cell arrival time register 218 shown in FIG. 31. The B-RM cell passage time register 233 corresponds to the B-RM cell passage time register 219 shown in FIG. 31. The time counter 213 indicates a time by counting a clock signal, and corresponds to a clock. Generally, the clock is implemented by hardware, but it can be implemented by software.

If a B-RM cell detection signal from the B-RM cell detection unit 216 (see FIG. 31) is fed to the B-RM cell passage time storage unit 232, the contents of the time counter 231 at that time can be stored as a B-RM cell passage time. The B-RM cell passage time is stored for each connection, and updated to a value of a next B-RM cell when passing through.

If a user cell detection signal including VPI/VCI information according to header information, etc. from the cell information separation unit 211 (see FIG. 31) is supplied for the B-RM cell passage time storage unit 232, a B-RM cell passage time corresponding to a connection according to a VPI/VCI of a user cell is read and stored in the B-RM cell passage time register 233. Additionally, an arrival time of a user cell according to the contents of the time counter 231 is stored in the user cell arrival time register 234 by the user cell detection signal.

Then, the subtractor 235 subtracts the B-RM cell passage time from the user cell arrival time, so that a time T from the passage of the B-RM cell till the arrival of the user cell can be obtained. The comparator 236 makes a comparison between the obtained time T and both the maximum value τ2 and the minimum value τ3 in a connection according to the VCI/VPI stored in the delay standard value register 237. If the time T is smaller than the minimum value τ3, a parameter switch control signal is not output. If the time T is equal to or greater than the minimum value τ3 and smaller than the maximum value τ2, or if the time T is equal to or greater than the maximum value τ2, a parameter switch control signal indicating each of these cases is output.

Figure 33:
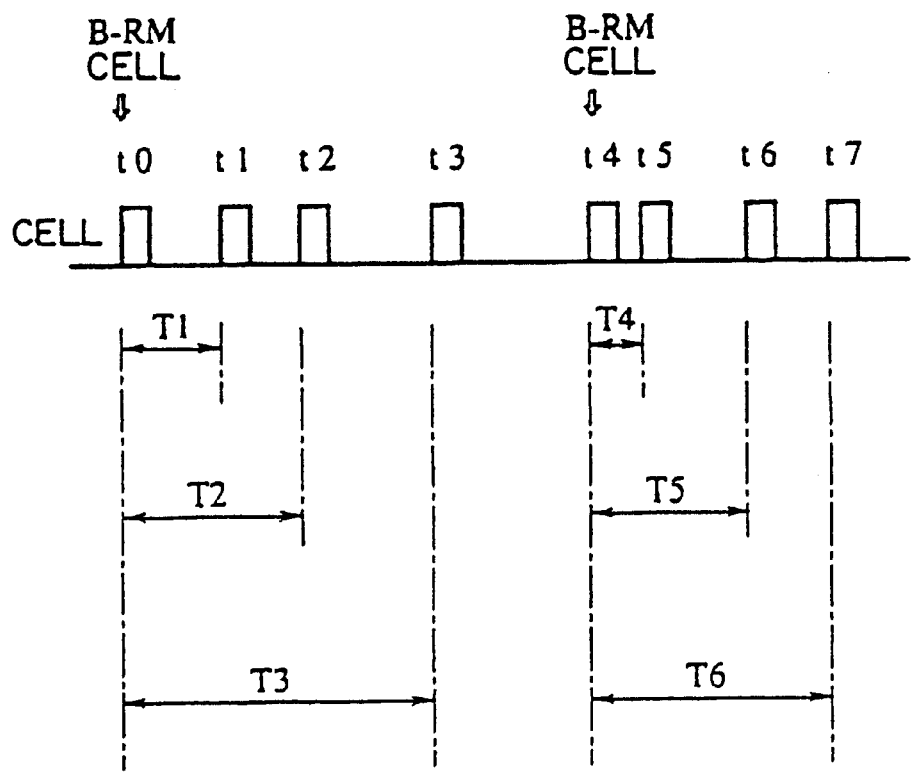
FIG. 33 is a schematic diagram showing operations of the first embodiment shown in FIG. 31.

FIG. 33 is a schematic showing operations performed by the first embodiment. This figure indicates a case where B-RM cells pass through at a time t0 and a time t4, and user cells arrive at a time t1, a time t2, a time t3, a time t5, a time t6, and a time t7. The B-RM cell passage time storage unit 232 stores a passage time of a B-RM cell for each connection as described above. If B-RM cells in an identical connection pass at the time t0 and the time t4, the time t0 indicated by the time counter 231 is stored in the B-RM cell passage time storing unit 232, and the time t4 is updated at the time t4 indicated by the time counter 231.

The times t1, t2 t3, t5, t6, and t7 are sequentially assigned to the user cell arrival time register 234. Each time one of the times is assigned the passage time of the B-RM cell in a connection according to a user cell is read and stored in the B-RM cell passage time register 233. Then, the periods T1 through T6 from the passage of the B-RM cell till the arrival of the user cell are obtained by the subtractor 235.

A comparison between a time Ti (i=1, 2, 3, . . . ) and both the maximum value τ2 and the minimum value τ3 of each connection included in the delay standard value register 237 is made by the comparator 236. A parameter switch control signal corresponding to the result of the comparison is fed to the parameter storage unit 215.

When the above described B-RM cell passes through, its passage time is stored in the B-RM cell passage time storage unit 232. In addition, a parameter to be B-RM cell information is written to the parameter storage unit 215 by the B-RM cell detection unit 216 (See FIG. 31). In this case, the valid area flag YF is examined in order to write the parameter to an invalid area (a parameter area storing a parameter not used for an operation). Then, it is determined whether the parameter in the valid area (the previous parameter) is either greater or smaller than the parameter written to the invalid area (the new parameter). If the previous parameter is equal to or greater than the new parameter, the value "0" is assigned to the greatness/smallness flag DF. If the previous parameter is smaller than the new para meter, the value "1" is assigned to the greatness/smallness flag DF, and the value "1" is set to the new parameter validity flag SF.

Furthermore, an arrival time of a user cell is stored in the user cell arrival time register 234, and the new parameter validity flag SF is examined. If the value of the new parameter validity flag SF is "0" no new parameter exists. Accordingly, the valid area flag YF is examined, and the parameter in the valid area (previous parameter) is used to perform a usage parameter control.

If the value of the new parameter validity flag SF is "1", a passage time of the B-RM cell in a connection of a user cell is read from the B-RM cell passage time storage unit 232, and stored in the B-RM dell passage time register 233. Then, the subtractor 235 subtracts the B-RM cell passage time from the user cell arrival time in order to obtain the time Ti from the passage of the B-RM cell till the arrival of the user cell. The comparator 236 then makes a comparison between the obtained time Ti and both the maximum value τ2 and the minimum value τ3 stored in the delay standard value register 237.

Figure 5:
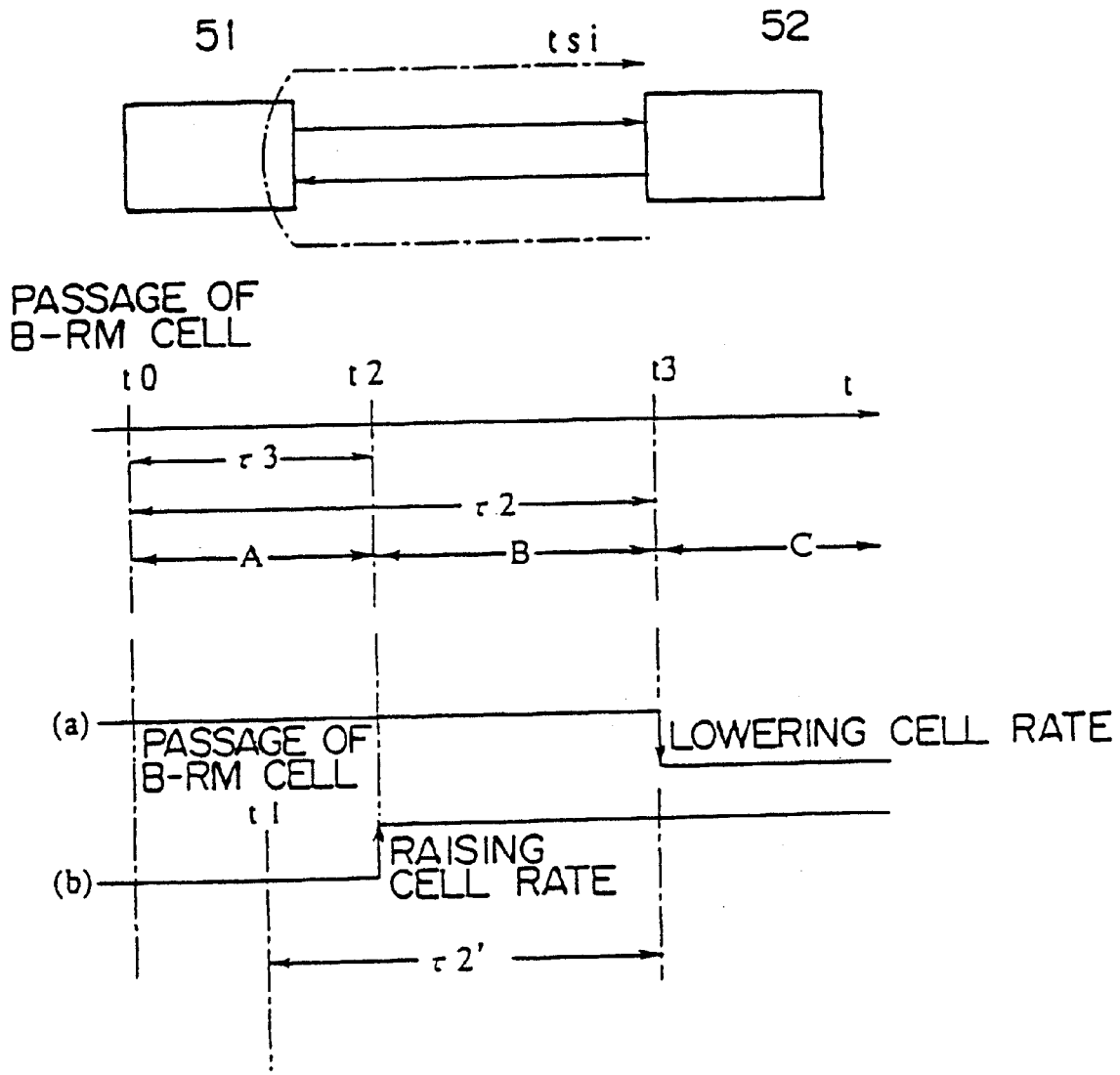
FIG. 5 is a schematic diagram showing a conventional delay control.

If the result of the comparison is Ti<τ3, it indicates a case where the user cell arrives within the duration A shown in FIG. 5, and it is not affected by the B-RM cell. As a result, the usage parameter control is performed using the previous parameter, and a flag manipulation is not performed.

If τ3≦Ti<τ2, it indicates a case where the user cell arrives within the duration B shown in FIG. 5, and it may be sometimes affected by the B-RM cell. In this case, the greatness/smallness flag DF is examined. If the value of this flag is "0" (a case where the new parameter is smaller, that is, a rate is higher), the valid area flag YF is reversed and the new parameter is validated, and the new parameter validity flag SF is set to "0". By performing this operation, the usage parameter control can be immediately switched to a direction where a cell rate is raised. If the greatness/smallness flag DF is "1" (a case where the new parameter value is greater, that is, the rate is lower in this example), the flag is not changed. Accordingly, the usage parameter control is performed using the previous parameter.

If $\tau 2 \leq Ti$, it indicates a case where the user cell arrives in the duration C shown in FIG. 5. If the value of the new parameter validity flag SF is "1", the valid area flag YF is reversed, and the value "0" is assigned to the new parameter validity flag SF. As a result, the usage parameter control is performed by immediately switching to the new parameter. If the value of the new parameter validity flag SF is "0", it indicates that a switch to the new parameter has been made, and the parameter in the invalid area is not a new parameter. Therefore, the flag is not changed.

The above described operations allow the usage parameter control including a delay control using a parameter change. Since a parameter corresponding to a connection is changed only when a user cell arrives, parameter changes for a plurality of connections may not occur. This method is not limited to the above described configuration. It can be modified and expanded in various manners. For example, the maximum value $\tau 2$ and the minimum value $\tau 3$ of delay standard values may be updated by an upper device for each connection via a computer interface. For the parameter storage unit 215, the parameter A and B areas may be implemented as two memories.

Figure 34:
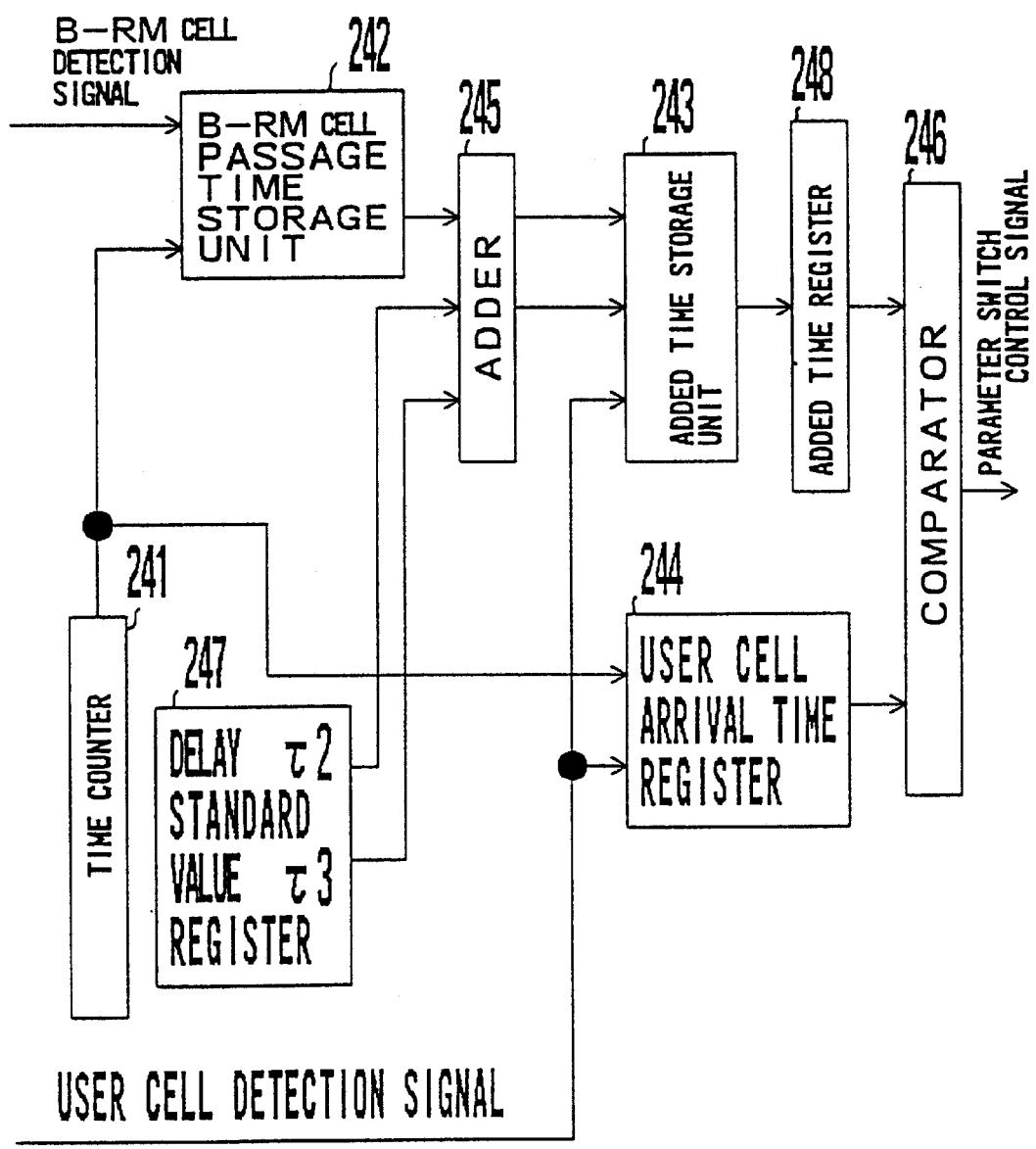
FIG. 34 is a block diagram showing a delay control unit in the usage parameter control unit according to the second embodiment as a varying rate monitor unit.

FIG. 34 is a block diagram showing a configuration of a delay control unit according to the second embodiment, where one usage parameter control device dynamically updates a parameter. The components other than the delay control unit are the same as those in the first embodiment. In this figure, 241 indicates a time counter; 242 indicates a B-RM cell passage time storage unit; 243 indicates an added time storage unit; 244 indicates a user cell arrival time register; 245 indicates an adder; 246 indicates a comparator; 247 indicates a delay standard value register; and 248 indicates an added time register.

The time comparison unit 220 shown in FIG. 31 is composed of the added time register 248 and the comparator 246. The user cell arrival time register 244 corresponds to the user cell arrival time register 218 shown in FIG. 31. The B-RM cell passage time register 242 corresponds to the B-RM cell passage time register 219 shown in FIG. 31. The time counter 241, which indicates a time by counting a clock signal, is implemented as a hardware or software clock.

If a B-RM cell detection signal is supplied to the B-RM cell passage time storage unit 242, a time indicated by the time counter 241 at that time is stored as a B-RM cell passage time. Additionally, values obtained by adding the maximum value $\tau 2$ and the minimum value $\tau 3$ stored in the delay standard value register 247 to the B-RM cell passage time, are stored in the added time storage unit 243. When a user cell detection signal is supplied, the time indicated by the time counter 241 at that time is stored in the user cell arrival time register 244. Then, the contents of the added time storage unit 243 corresponding to a connection according to a VPI/VCI of a user cell is read and stored in the added time register 248. A comparison between the contents of the added time register 248 and the contents of the user cell arrival time register 244 is made by the comparator 246. According to a result of the comparison, a parameter switch control signal is output, and added to the parameter storage unit.

Figure 35:
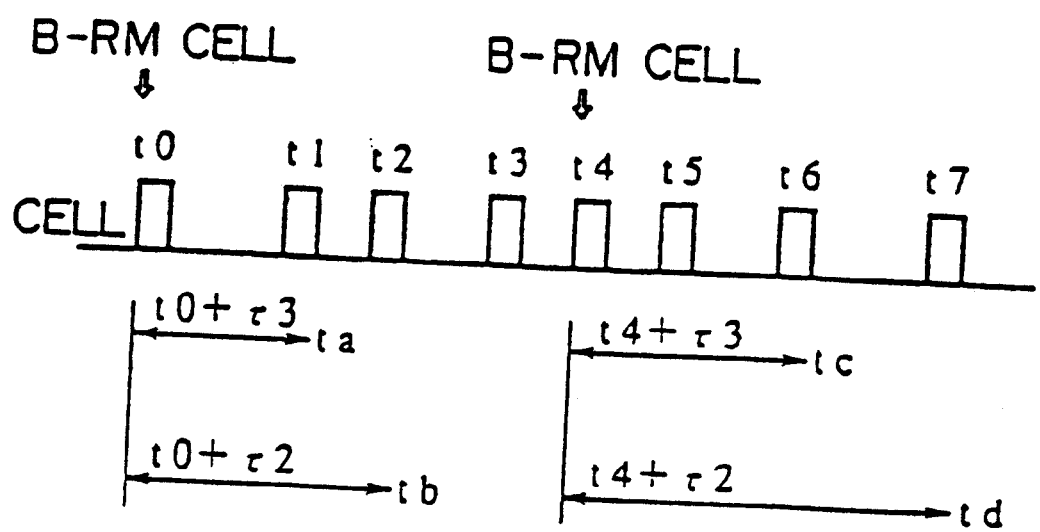
FIG. 35 is a schematic diagram showing operations performed by the delay control unit shown in FIG. 31.

FIG. 35 is a schematic diagram showing operations performed by another embodiment of the usage parameter control device. When a B-RM cell passes at time t0, the time t0 indicated by the time counter 241 at that time is stored in the B-RM cell passage time storing unit 242. Then, the minimum value $\tau 3$ and the maximum value $\tau 2$ included in the delay standard value register 247 are added to the time "t0" by the adder 245. That is, $t0+\tau 3=ta$, and $t0+\tau 2=tb$ are obtained, and stored in the added time storage unit 243 for each connection according to a VPI/VCI.

When a user cell arrives at a next time t1, the time t1 indicated by the time counter 241 at that time is stored in the user cell arrival time register 244. Then, the "ta" and the "tb" corresponding to a connection according to the VPI/VCI of the user cell are read from the added time storage unit 243, and stored in the added time register 248. The comparator 246 then makes a comparison between the "t1" and both the "ta" and the "tb". Similarly, when the user cell arrives at the time "t2" and the time "t3", the comparator makes respective comparisons between the time "t2" and both the time "ta" and the time "tb", and between the time "t3", and both the time "ta" and the time "tb". As a result, the following relationships may be derived:

t1<ta, t1<tb, t2>ta, t2>tb, t3>ta, t3>tb

Accordingly, by taking advantage of the results of comparisons made by the comparator 246, a parameter can be switched by manipulating the flags such as a DF, a YF, an SF, etc. as shown in FIG. 33. That is, at the time "t1", a parameter is not switched. At the time "t2", a cell rate is immediately raised in a case where the cell rate can be raised. On the contrary, the cell rate is not changed in a case where the cell rate is lowered. At the time "t3", the cell rate is lowered in a case where the cell rate is lowered.

Similarly, when a B-RM cell passes at the time "t4" and the user cell arrives at the times "t5", "t6", and "t7", $t4+\tau 3=tc$, and $t4+\tau 2=td$ are obtained and stored in the added time storage unit 243. Then, comparisons between both the "tc" and the "td", and each of the user cell arrival times "t5", "t6", and "t7" are made in order to control a switch timing of a parameter. An added time can be stored one or more values for one connection. In this case, the parameter storing unit can store two or more parameters for one connection.

Figure 36A:
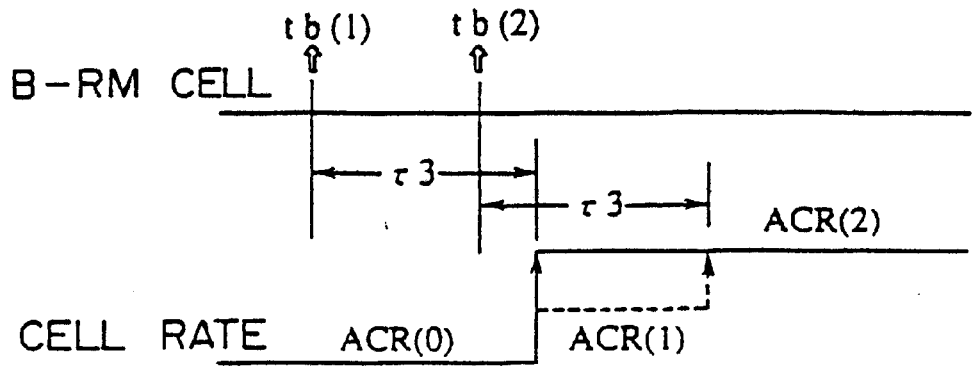
FIGS. 36A and 36B are schematic diagrams explaining a passage time of a B-RM cell and a delay standard value.
Figure 36B:
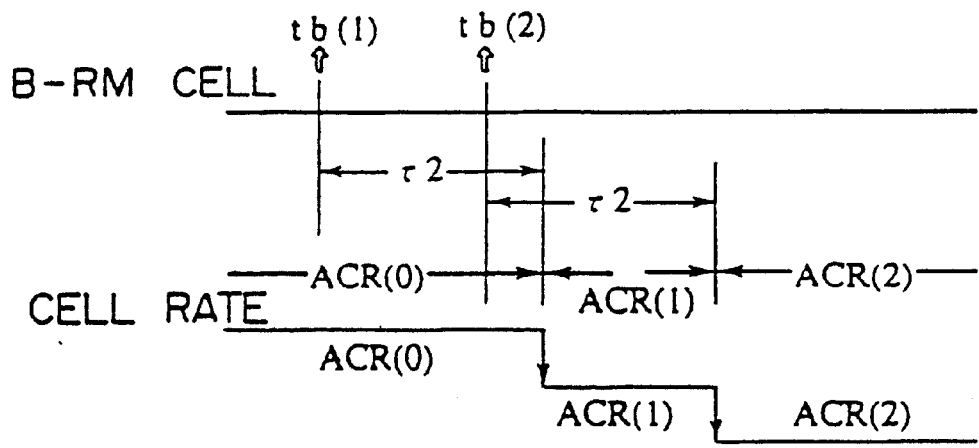

FIGS. 36A and 36B are schematic diagrams showing a passage time of a B-RM cell and a delay standard value. FIG. 36A shows a case where a B-RM cell passes at an interval equal to or shorter than the minimum value $\tau 3$ of the delay standard value in a state where a cell rate can be raised. FIG. 36B shows a case where a B-RM cell passes at an interval equal to or shorter than the maximum value $\tau 2$ of the delay standard value in a state where the cell rate is lowered.

In FIG. 36A, the B-RM cell passes at a time "tb(1)" at a cell rate of ACR(0), and the cell rate is raised to an ACR (1) after the minimum value $\tau 3$ of the delay standard value elapses. Another B-RM cell passes at a next time "tb(2)", and the cell rate is raised to an ACR (2) after the minimum value $\tau 3$ of the delay standard value elapses. In this case, also when the B-RM cell passes at the time "tb(2)" in a relationship of $(tb(1)+\tau 3)>tb(2)$, the cell rate will be raised from the ACR(1) to the ACR(2) after the minimum value $\tau 3$ elapses from the time "tb(2)" as indicated by the dotted line. Since this case is not disadvantageous for a user side, the passage time of the B-RM cell is left unchanged as being the "tb(1)", and the cell rate can be immediately raised from the ACR(0) to the ACR(2) according to the B-RM cell. In this case, a passage time of one B-RM cell or a value obtained by adding the minimum value $\tau 3$ to the passage time must be stored.

In FIG. 36B, a B-RM cell passes at the time "tb(1)" at the cell rate ACR(0). The cell rate is lowered to the ACR(1) after the maximum value $\tau 2$ of the delay standard value elapses. At a next time "tb(2)", the B-RM cell passes, and the cell rate is lowered to the ACR(2) after the maximum value $\tau 2$ elapses. When the B-RM cell passes at the time "tb(2)" in the relationship of (tb(1)+τ2)>tb(2), the times tb(1) and tb(2) are stored, and the cell rate is lowered from the ACR(0) to the ACR(1) at the time tb(1)+τ2. Additionally, the cell rate can be lowered from the ACR(1) to the ACR(2) at the time tb(2)+τ2. In this case, two passage times "tb(1)" and the "tb(2)" of the B-RM cell, or the values "tb(1)+τ2" and "tb(2)+τ2" are stored.

Also to the above described cases of the passage of the B-RM cell in the time relationships shown in FIGS. 36A and 36B, a usage parameter control device implemented by switching a parameter according to each of the embodiments which is not disadvantageous to a user, can be applied.

FIG. 37 is a block diagram showing a configuration employing a delay control unit 252 and a rate control unit 253 as a means for switching a monitor system which monitors a varying rate by combining two conventional flow monitor devices.

A usage parameter control device shown in this figure is configured by replacing the switch control unit 186 and 191 included in the cell flow monitor and control system, respectively shown in FIGS. 28 and 29, with a delay control unit 252. A cell information separation unit 254 extracts a VPI and a VCI from a header of a cell, and transfers them to the delay control unit 252. A reception unit 255 passes the cell transmitted from a transmitting terminal 250 to a first rate monitor unit 256 and a second rate monitor unit 257, according to an instruction given by the delay control unit 252. The first rate monitor unit 256 or the second rate monitor unit 257 monitors a transfer rate of the cell using a monitor rate specified by a rate control unit 253, discards or tags the cell depending on need, and outputs the cell to an ATM network 251 via a selector 258.

The rate control unit 253 outputs a B-RM cell detection signal to the delay control unit 252. The delay control unit 252 which receives this signal generates a signal for switching the two rate monitor units 256 and 257, according to the operations performed by the delay control unit 217 shown in FIG. 32 or 34. By using this signal, either of the rate monitor units 256 and 257 in a wait state is validated, while the other of the rate monitor units 256 and 257 is made to enter into a wait state. The validated monitor device monitors a rate. Then, the rate control unit 253 performs the same operation as that of the transmitting terminal in order to calculate an "Ra", and makes a comparison between the "Ra" and an "Rnet" included in the B-RM cell. As a result of the comparison, the smaller value is set as an "Rnext" in either of the rate monitor units 256 and 257 which is in a wait state. Alternatively, the rate monitor unit 253 may assign the "Rnet" to either of the rate monitor units 256 and 257 which is in a wait state, as an "Rnext", without calculating the "Ra".

Provided below is the explanation about another variation of a usage parameter control device where a parameter is dynamically changed by one UPC unit.

Figure 38:
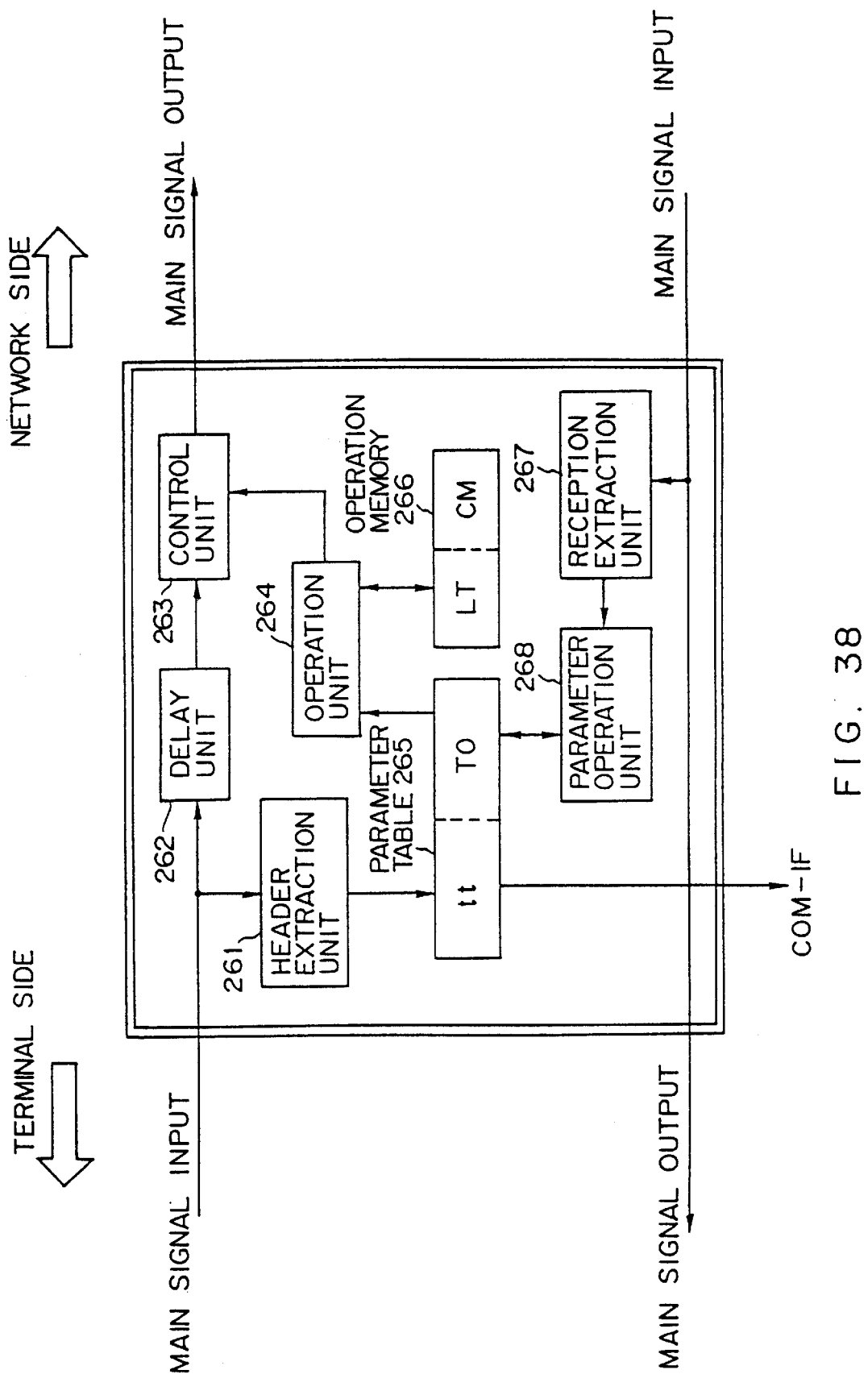
FIG. 38 is a block diagram showing a variation of the usage parameter control device according to the third embodiment of the present invention.

FIG. 38 is a block diagram showing a configuration where one usage parameter control unit dynamically updates a parameter according to the third embodiment: 261 indicates a header extraction unit; 262 indicates a delay unit; 263 indicates a control unit; 264 indicates an operation unit; 265 indicates a parameter table; 266 indicates an operation memory; 267 indicates a reception extraction unit; and 268 indicates a parameter operation unit. A "tt" is a violation threshold value corresponding to the above described parameter "tt". A "T0" indicates a minimum cell interval. An "LT" indicates an arrival time of a preceding cell. A "CM" indicates a leaky bucket counter. A "COM-IF" indicates a computer interface. Explanation below is based on the assumption that the leaky bucket algorithm is adopted. A forward direction means a direction of a main signal input and a main signal output indicated by an arrow directed to a network side. A backward direction means a direction of a main signal input and a main signal output indicated by an arrow directed to a terminal side. The header extraction unit 261, the delay unit 262, and the control unit 263 correspond to the cell information separation unit 211, the cell delay unit 212, and the cell control unit 213 shown in FIG. 31 respectively. The operation unit 264 and the operation memory 266 correspond to the flow measurement unit 214 shown in FIG. 31. The parameter table 265 corresponds to the parameter storage unit 215 shown in FIG. 31.

A header extraction unit 261 extracts a header of an arrived cell in a forward direction, and accesses the parameter table 265 and the operation memory 266 using a virtual path identifier VPI or a virtual channel identifier VCI included in the header as an address. The operation unit 264 determines whether or not the arrived cell is a violation cell based on a violation threshold value "tt", the minimum cell interval "T0", the arrival time of the preceding cell "LT", and the value of the leaky bucket counter "CM" using the leaky bucket algorithm. If the arrived cell is not a violation cell, the operation unit 264 transmits it to the network side via the delay unit 262 and the control unit 263. If the arrived cell is determined as a violation cell, the control unit 263 discards that cell.

The reception extraction unit 267 extracts a resource management cell in a backward direction (B-RM cell). The parameter operation unit 268 calculates the minimum cell interval "T0", for example, depending on the existence/non-existence of a congestion indicated by a CI field, and updates the minimum cell interval "T0" included in the parameter table 265. That is, the minimum cell interval "T0" is shortened in order to raise a cell rate in a non-congestion state, while it is extended in order to lower the cell rate in a congestion state.

Accordingly, the parameter table 265 can store the violation threshold value "tt", the minimum cell interval "T0", etc. from a computer, not shown in the attached drawings, etc. via the computer interface COM-IF. At the same time, contents of the parameter table 265 can be updated at an interval such as the minimum cell interval "T0", etc. resulting from an operation performed by the parameter operation unit 268, thereby implementing an ABR service by dynamically changing a parameter. That is, when an RM cell in a forward direction passes through a switch in a congestion state during a transmission in an ATM network, the congestion state is set in a CI field. When reaching a terminal, the RM cell is doubled back and transmitted as a B-RM cell. With the B-RM cell, the existence/non-existence of a congestion in an ATM network is determined, thereby dynamically updating a parameter.

Figure 39:
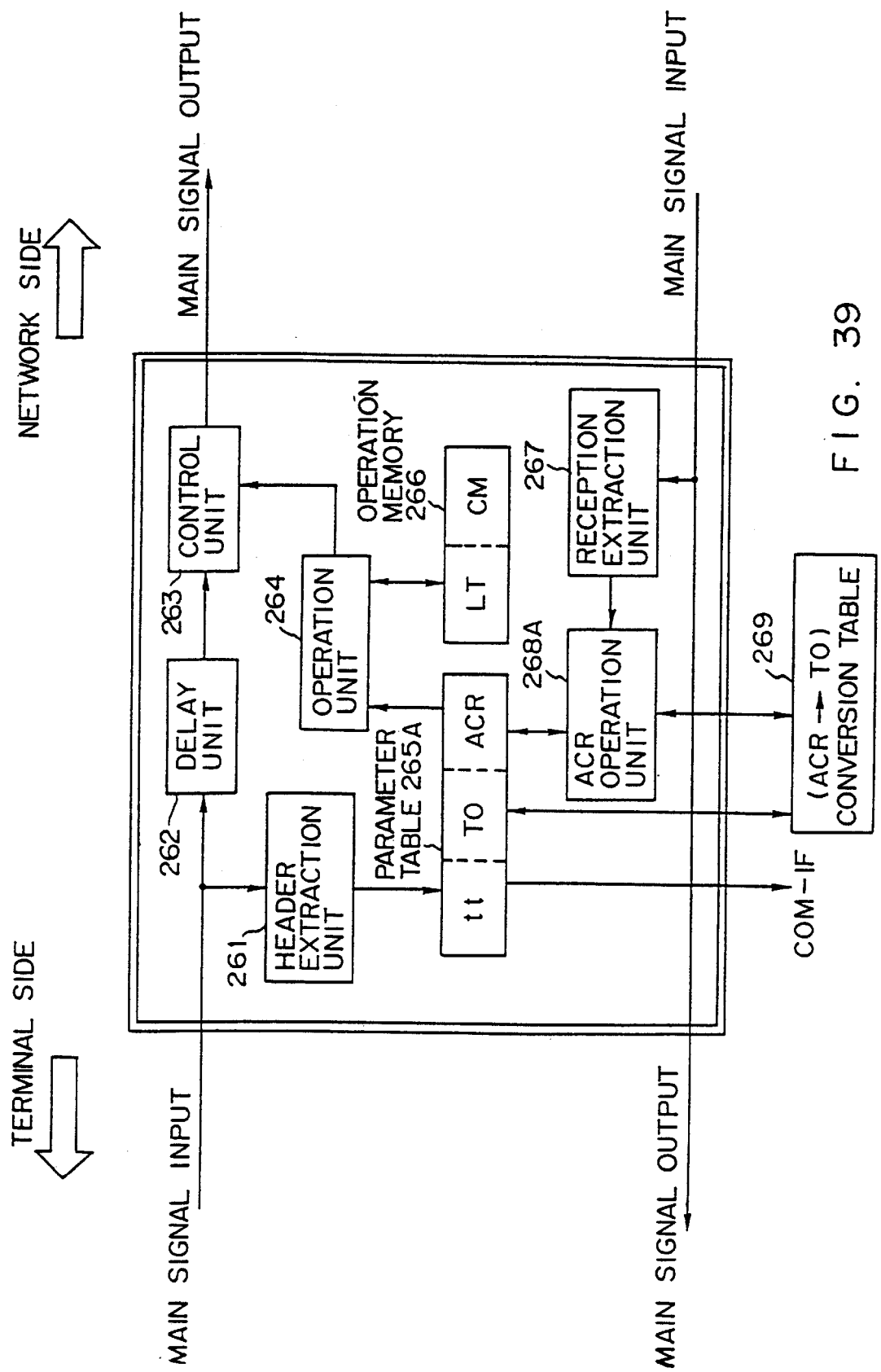
FIG. 39 is a block diagram showing a variation of the usage parameter control device according to the fourth embodiment of the present invention.

FIG. 39 is a block diagram showing a configuration where one usage parameter control device updates a parameter, according to the fourth embodiment of the present invention. In this figure, the same reference numerals as those in FIG. 38 indicate the same portions. 265A indicates a parameter table; 268A indicates an ACR operation unit; and 269 indicates a conversion table. The parameter table 265A stores parameters such as a violation threshold value "tt", a minimum cell interval "T0", and an allowed cell rate "ACR". The conversion table 269 converts the allowed cell rate "ACR" into the minimum cell interval "T0".

Assuming that a newly allowed cell rate is defined as a "NewACR" when a cell rate is lowered:

$$NewACR = \min(ER, ACR - ACR*Nrm/RDF) \quad (1)$$

where the value of the "Nrm" is normally 32, and the RDF (Rate Decrease Factor) is a parameter for determining a rate decrease amount. That is, the smaller value of the "ER" and (ACR−ACR*Nrm/RDF) is used to obtain the newly allowed cell rate "NewACR". On the contrary, when the cell rate is raised:

$$NewACR=ACR+AIR*Nrm \quad (2)$$

is used. The AIR (Additive Increase Rate) is a parameter for determining a rate increase amount.

Since the minimum cell interval "T0" is a value proportional to the inverse of the allowed cell rate ACR, the conversion from the allowed cell rate ACR into the minimum cell interval "T0" can be easily performed by the conversion table 269. As a result, the parameter table 265A is updated using the above described minimum cell interval "T0". Accordingly, the operation unit 264 uses the contents of the updated parameter table 265A in order to determine whether or not an arrived cell is a violation cell.

Figure 40:
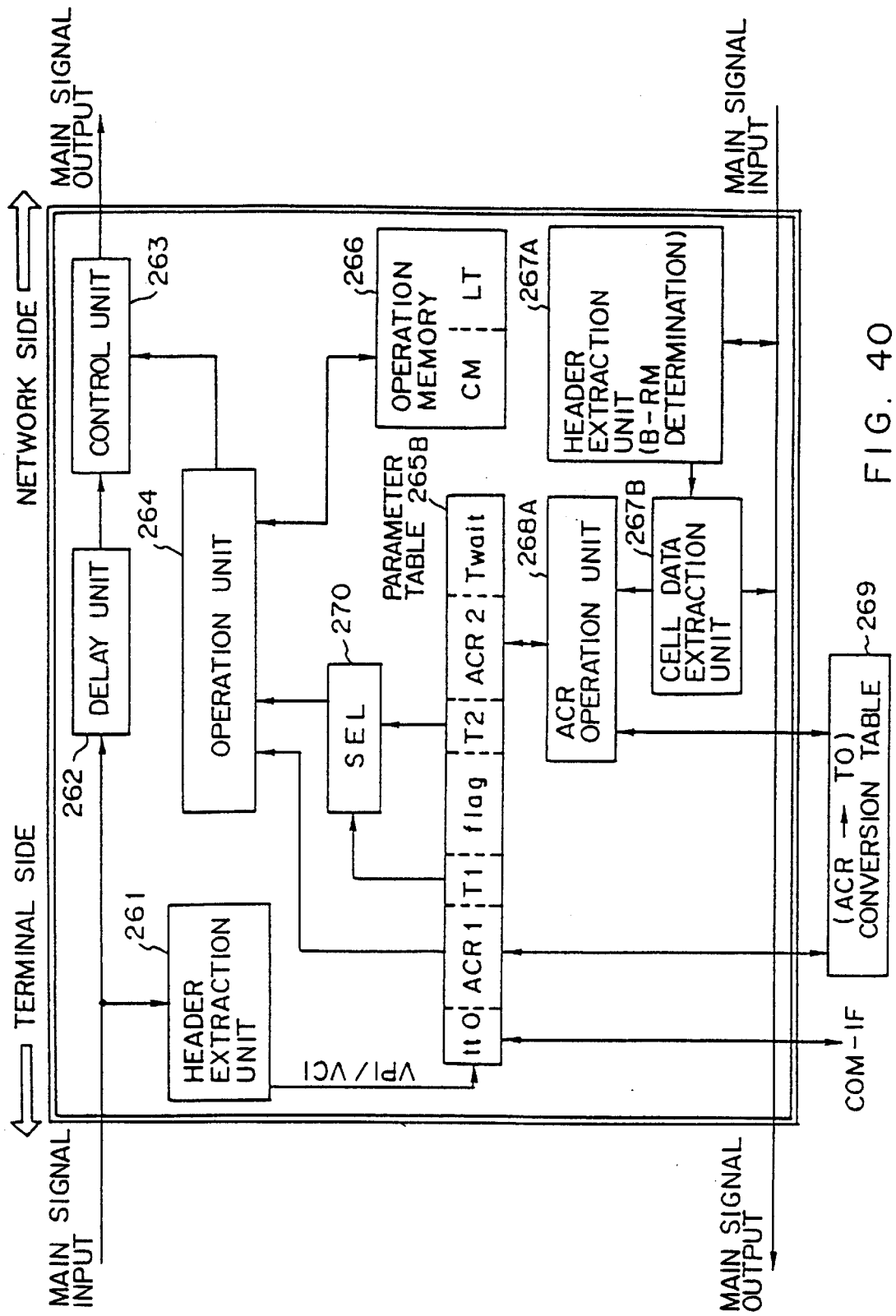
FIG. 40 is a block diagram showing a variation of the usage parameter control device according to the fifth embodiment of the present invention.

FIG. 40 is a block diagram showing a configuration where one usage parameter control device updates a parameter, according to the fifth embodiment. In this figure, the same reference numerals as those in FIGS. 38 and 39 indicate the same portions. 265B indicates a parameter table; 267A indicates a header extraction unit for extracting a header of a cell in a backward direction in order to determine a B-RM cell; 267B indicates a cell data extraction unit; and 270 indicates a selector (SEL).

The header extraction unit 267A and the cell data extraction unit 267B correspond to the reception extraction unit 267 shown in FIGS. 38 and 39. The parameter table 265B is composed of a violation threshold value area "tt0", allowed cell rate areas "ACR1" and "ACR2", minimum cell interval areas "T1" and "T2", a flag area "flag", and a wait time area "Twait". The "ACR 1" and "T1" areas and the "ACR2" and "T2" areas indicate an updated parameter and an unupdated parameter depending on a value of the flag. Additionally, the explanation about a case where a switch from the unupdated parameter to the updated parameter is performed after a wait time "Twait" elapses, is provided below. Assume that a time required for a round-trip of a cell between a terminal and the device is a round-trip time $\tau 2$, a sum of a current time parameter "Tnow" and the round-trip time $\tau 2$ is defined as the wait time "Twait".

The selector 270, which is controlled according to the wait time "Twait", is intended to switch from the unupdated parameter to the updated parameter for the operation unit 264. The violation threshold value "tt0" in the parameter table 265B is fed to the operation unit 264 not via the selector 270. The flag area "flag" indicates that either the unupdated parameter or the updated parameter is read based on the "Twait".

Figure 41:
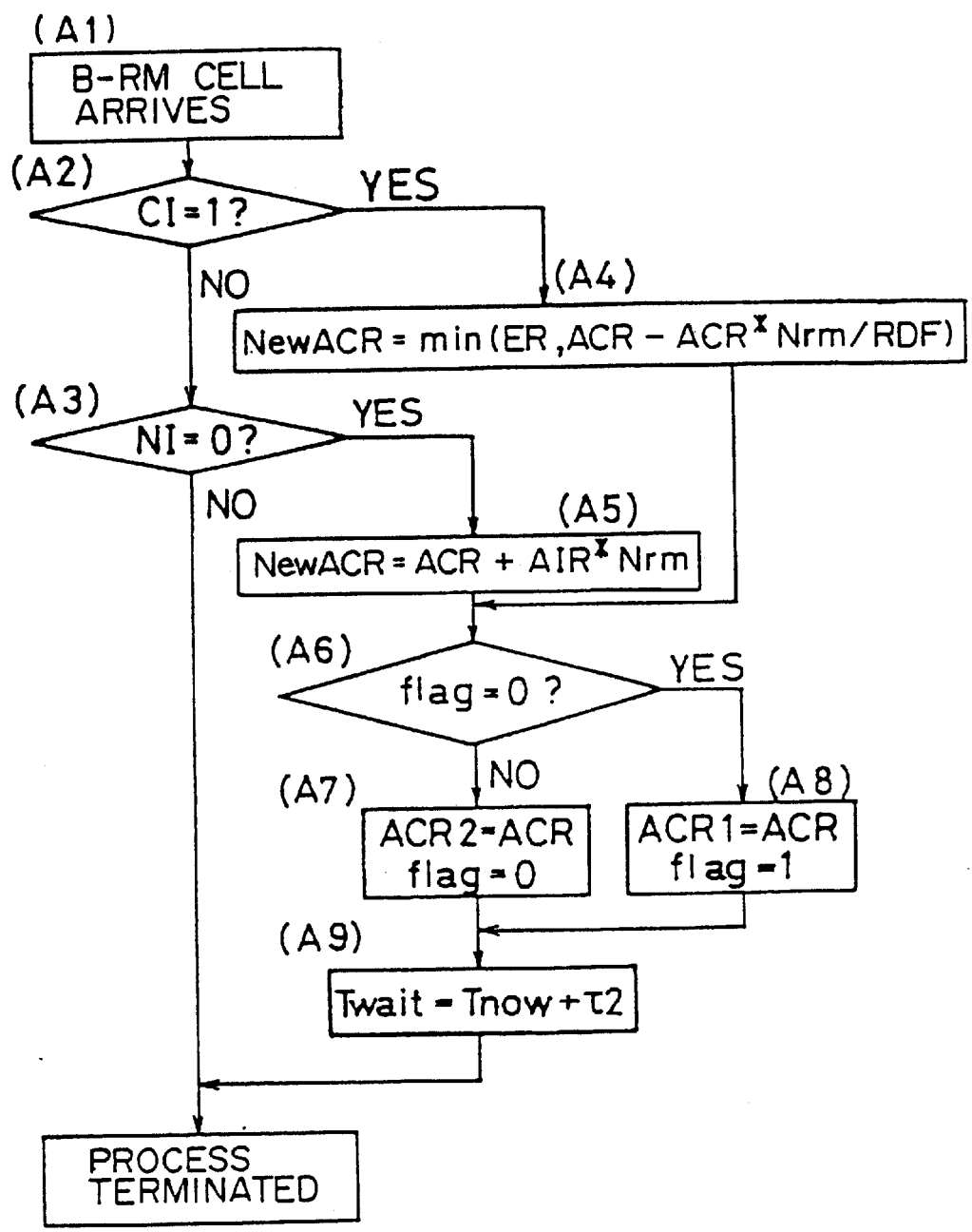
FIG. 41 is a first flowchart showing a process performed by the variation of the usage parameter control device according to the fifth embodiment of the present invention.

FIG. 41 is a flowchart showing a process performed by the usage parameter control device according to the fifth embodiment. If the header extraction unit 267A determines that a B-RM cell arrives (step A1), the cell data extraction unit 267B extracts data included in its payload, and determines whether or not a CI (Congestion Indication) field (see FIG. 3) is "1" (step A2). The value "1" of the CI field indicates a congestion state, and a process is performed to lower a cell rate. The value "0" indicates a non-congestion state. In the non-congestion state, it is determined whether or not an NI (invariable cell rate) field of the B-RM cell is "0" (step A3). The value "0" indicates the non-congestion state and a raise of the cell rate. If the value is "1", the NI field is determined as being invariable, and the process is completed.

Since the value of the CI field "1" indicates a congestion state, the cell rate must be lowered. Therefore, the allowed cell rate ACR is calculated based on the above described equation (1) (step A4), and the process goes to step A6. If the value of the NI field is "0" in a non-congestion state, the cell rate must be raised. Therefore, the allowed cell rate ACR is calculated based on the above described equation (2) (step A5), and the process goes to step A6. After the allowed cell rate ACR is calculated, the minimum cell intervals T1 and T2 are obtained by referencing the conversion table 269.

In step A6, it is determined whether or not the value of the flag area "flag" is "0". If it is "0", the allowed cell rate ACR updated in step A4 or step A5 is stored in the ACR 1 area in the parameter table 265B, the minimum cell interval converted by the conversion table 269 is stored in the "T1" area, and the value of the flag area "flag" is set to "1" (step A8). If the value of the flag area "flag" is "1", the updated allowed cell rate ACR is stored in the ACR2 area in the parameter able 265B, and the minimum cell interval converted by the conversion table 269 is stored in the T2 area. After that, the value of "flag" is set to "0" (step A7).

Then, a sum of a round-trip time of a cell between a terminal and this device (corresponding to the above described "Tsi"), that is the round-trip time $\tau 2$, and the current time "Tnow", is defined as a wait time "Twait"(= Tnow+$\tau 2$), and stored in the parameter table 265B (step A9). The wait time "Twait" indicates a time for switching between an unupdated parameter and an updated parameter. $\tau 2$ is used as a round-trip time for adding to the "Tnow" in this case, but the above described $\tau 3$ and "Tsi" may also be used.

Figure 42:
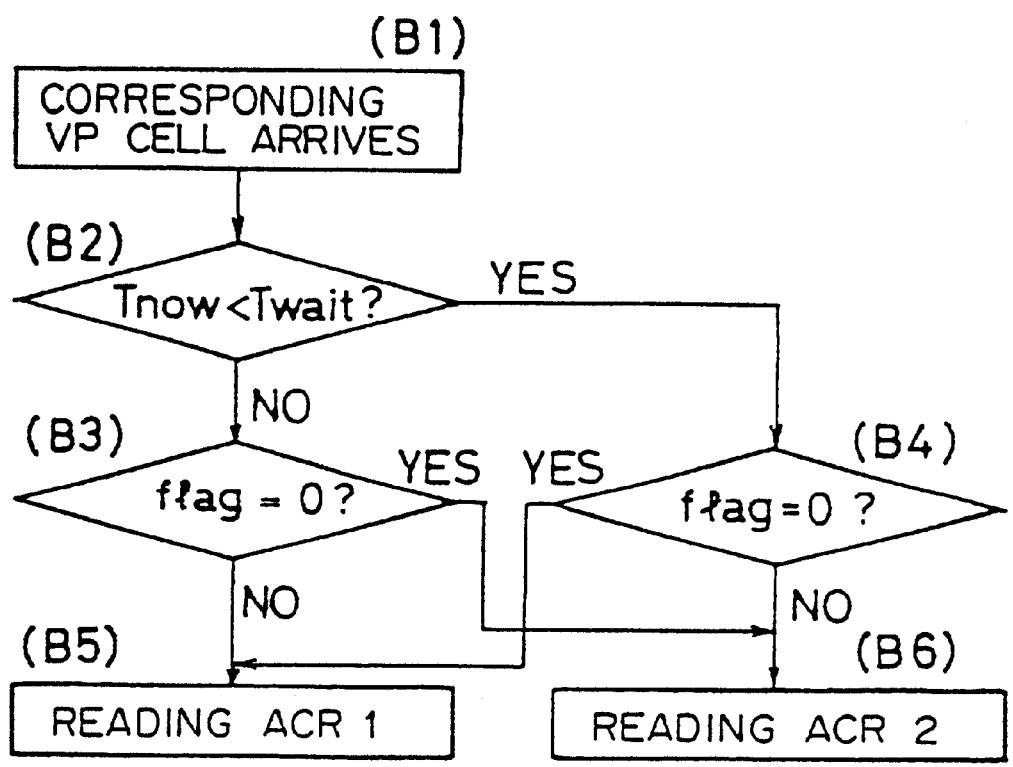
FIG. 42 is a second flowchart showing a process performed by the variation of the usage parameter control device according to the fifth embodiment of the present invention.

FIG. 42 is a flowchart showing operations performed by the usage parameter control device according to the fifth embodiment. As shown in FIG. 41, when a cell rate is controlled for each virtual path VP after unupdated and updated parameters are stored in the parameter table 265B, the header extraction unit 261 determines that the VP cell arrives (step B1). Then, a comparison between the current time "Tnow" and the wait time "Twait" is made (step B2). If the current time "Tnow" is prior to the time "Twait", that is, Tnow<Twait, it is determined whether or not the value of the flag area "flag" is "0" (step B4). If it is "0", an allowed cell rate ACR is read from the ACR1 area in the parameter table 265B. If it is "1", an allowed cell rate is read from the ACR2 area.

If the current time "Tnow" is after the wait time "Twait", that is, Tnow>Twait, it is determined whether or not the value of the flag area "flag" is "0" (step B3). If it is "0", the allowed cell rate ACR is read from the ACR2 area in the parameter table 265B (step B6). If it is "1", the allowed cell rate ACR is read from the ACR1 area (step B5). That is, the updated parameter is read. As described above, the selector for selecting whether a parameter is read from either the ACR1 and T1 areas or the ACR2 and T2 areas, is controlled by using the wait time "Twait" and the flag "flag". Accordingly, after a B-RM cell arrives at a terminal, a transmission rate is updated depending on the existence/non-existence of a congestion. As a result, determination of whether or not a cell is a violation cell using an updated parameter at a time when the cell arrives at the usage parameter control device is made.

Figure 43:
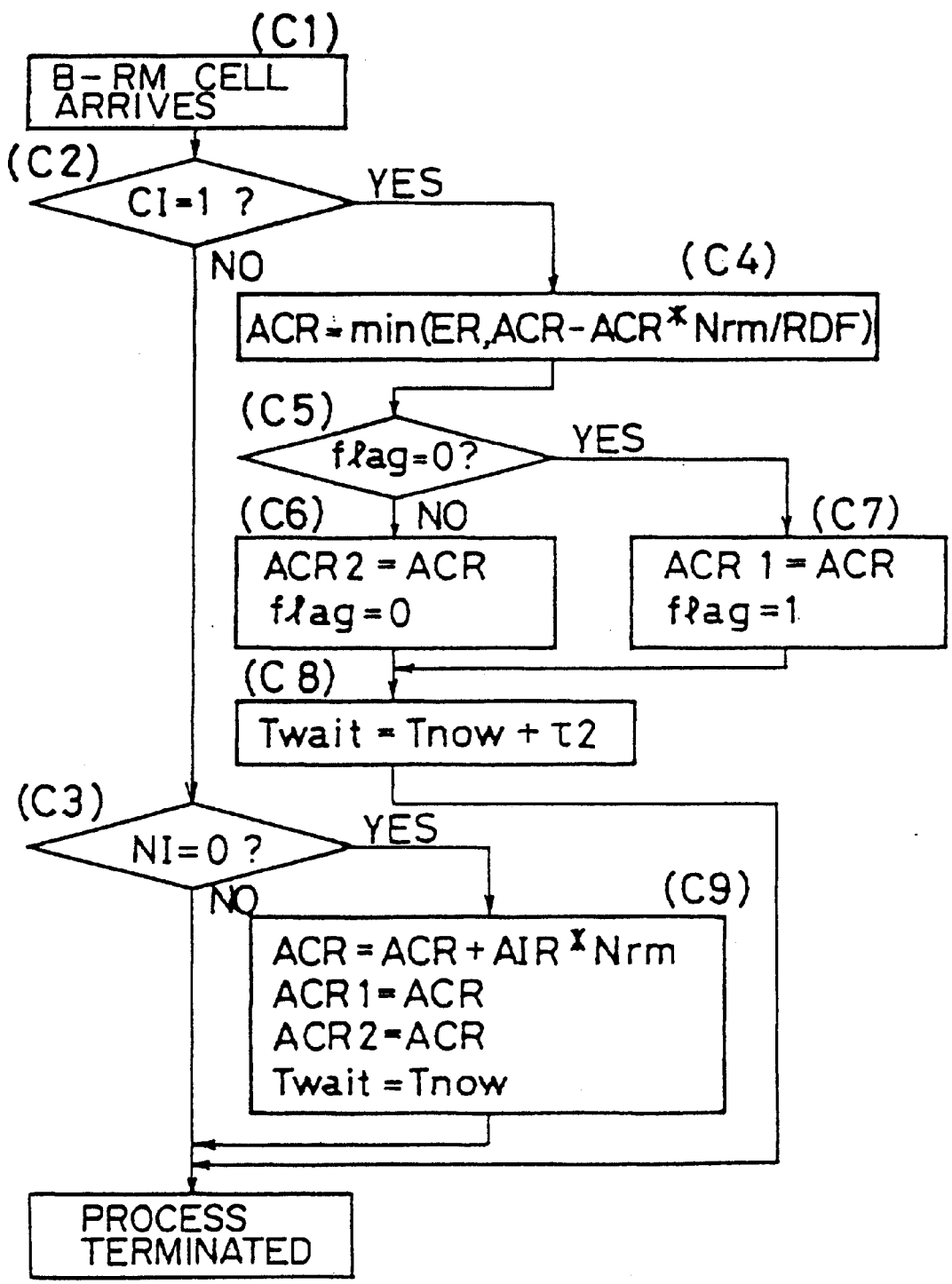
FIG. 43 is a flowchart showing operations performed by the variation of the usage parameter control device according to the sixth embodiment of the present invention.

FIG. 43 is a flowchart showing operations performed by the usage parameter control device, according to the sixth embodiment. If a header extraction unit 267A (see FIG. 40) determines an arrival of a B-RM cell (step C1), a cell data extraction unit 267B extracts data included in a payload, and determines whether or not a value of a CI (congestion indication) field (see FIG. 3) is "1" (step C2). If it is "1", it indicates a congestion state and a process for lowering a cell rate is performed. If it is "0", it indicates a non-congestion state. In the non-congestion state, it is determined whether or not a value of an NI (invariable cell rate) field is "0" (step C3). If it is "0", it indicates the non-congestion state and a raise of the cell rate. If it is "1", it indicates that the cell rate is invariable and the process is terminated.

If the value of the CI field is "1", it indicates the congestion state. Therefore, the cell rate must be lowered. That is, the allowed cell rate ACR is calculated based on the above described equation (1) (step C4). It is then determined whether or not the value of the flag area "flag" is "0" (step C5). If it is "0", the updated allowed cell rate ACR is stored in an ACR1 area in the parameter table 265B, and the minimum cell interval is stored in a T1 area. Then, the value of the flag area "flag" is set to "1" (step C7). If the value of the flag area "flag" is "1", the updated allowed cell rate ACR is stored in an ACR2 area in the parameter table 265B, and the minimum cell interval is stored in a T2 area. The value of the flag area "flag" is then set to "0" (step C6). The wait time "Twait" is further processed: Twait=Tnow +τ2 (step C8).

In a non-congestion state, if the value of the NI field is "0", the allowed cell rate is calculated according to the above described equation (2). The updated allowed cell rate is stored in the ACR1 and ACR2 areas, and the wait time "Twait" is defined as the current time "Tnow" (step C9). In the T1 and T2 areas in the parameter table 265B, the updated minimum cell interval is stored.

When a corresponding VP cell arrives, the allowed cell rate is read according to the flowchart shown in FIG. 42. When the cell rate is raised, ACR1=ACR2=ACR regardless of the value of the flag area "flag". Therefore, the allowed cell rate ACR is immediately raised in order to determine whether or not the arrived cell is a violation cell. When the cell rate is lowered, an unupdated parameter is used prior to the wait time "Twait", according to the wait time "Twait" and the flag "flag". After the wait time "Twait", a switch operation is performed in order to use the updated parameter.

Figure 44:
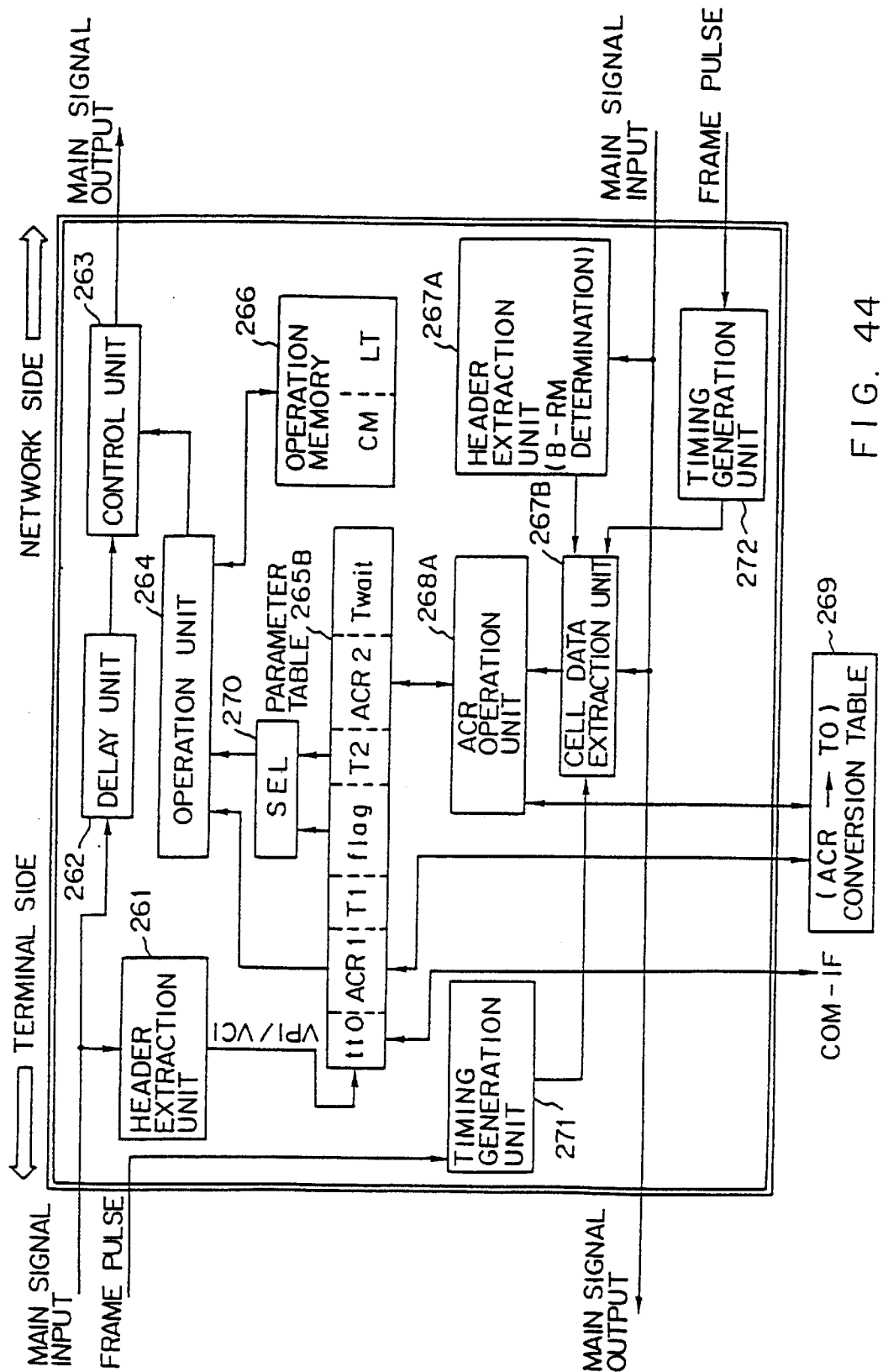
FIG. 44 is a block diagram showing a variation of the usage parameter control device according to the seventh embodiment of the present invention.

FIG. 44 is a block diagram showing the usage parameter control device, according to the seventh embodiment. In this figure, the same reference numerals as those in FIG. 40 indicate the same portions. 271 and 272 indicate timing generation units. An input phase of a main signal in a forward direction does not always synchronize with that of a main signal in a backward direction. Accordingly, a process is performed in synchronization with the input phase of the main signal input in a forward direction.

To perform the process, a frame pulse indicating a head position of an arrived cell in a forward direction is input to the timing generation unit 271, and a frame pulse indicating a head position of an arrived cell in a backward direction is input to the timing generation unit 272. For a B-RM cell, data in a payload of the B-RM cell is latched, for example, in a register, etc. included in a cell data extraction unit 267B, by a clock signal in synchronization with a frame pulse from the timing generation unit 272. Then, the data is read by a clock signal in synchronization with a frame pulse in a forward direction from the timing generation unit 271, and calculated in the ACR operation unit 268A. That is, the header extraction unit 267A, the cell data extraction unit 267B, etc. operate in synchronization with a clock signal from the timing generation unit 272. The ACR operation unit 268A, the operation unit 264, etc. operate in synchronization with a clock signal from the timing generation unit 271. Each of the units can be operated in synchronization with the input phase of the main signal in a forward direction. Thus, a conflict of memory accesses, etc. can be controlled and avoided with ease.

FIG. 45 is a block diagram showing a configuration and operations of the usage parameter control device according to the eighth embodiment. In this figure, the same reference numerals as those in FIG. 40 indicate the same portions. 273 indicates an ACR detection unit, and 274 indicates a comparator. For an RM cell in a forward direction, an allowed cell rate ACR calculated in a terminal is stored in a CCR field (see FIG. 3). The allowed cell rate ACR is a rate for notifying that the terminal transmits a cell to an ATM network at this rate. A calculation algorithm of the allowed cell rate ACR performed in the terminal is the same as that for the allowed cell rate ACR performed in the ACR operation unit 268A in the usage parameter control device.

The allowed cell rate ACRt detected from the CCR field of the RM cell in a forward direction by the ACR detection unit 273, is compared with the allowed cell rate ACRu, calculated and stored in the parameter table 265B by the ACR operation unit 268A, by the comparator 274 for each virtual path identifier VPI or each virtual channel identifier VCI. Here, ACRt is defined as the allowed cell rate set in the CCR filed of the RM cell and ACRU is defined as that set in the parameter table. If they do not match, it is determined that the mismatch is caused by a problem occurring externally, and an alarm is transmitted. For the allowed cell rate ACRu in the parameter table 265B at that time, an unupdated value is used before the wait time "Twait" elapses, and an updated value is used after the wait time "Twait" elapses. A determination of whether or not an arrived cell is a violation cell is the same as that made in the above described embodiments. Therefore, this explanation is omitted.

Figure 46:
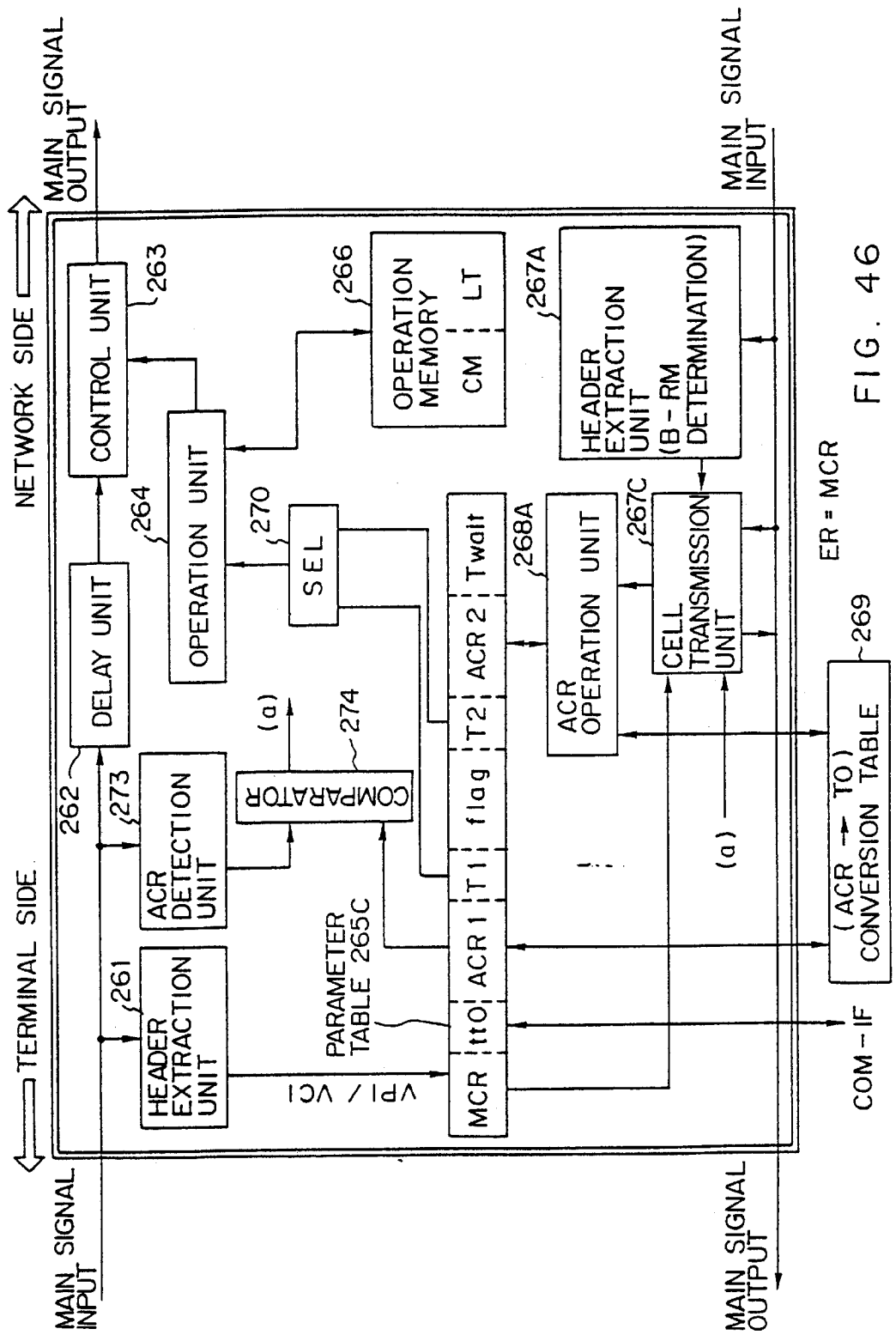
FIG. 46 is a block diagram showing a variation of the usage parameter control device according to the ninth embodiment of the present invention.

FIG. 46 is a block diagram showing a configuration of the usage parameter control device, according to the ninth embodiment. In this figure, the same reference numerals as those in FIG. 45 indicate the same portions. 265C indicates a parameter table, and 267C indicates a cell transmission unit. A parameter table 265C includes a minimum cell rate area MCR, a violation threshold value area tt0, an allowed cell rate area ACR1 and ACR2, minimum cell interval areas T1 and T2, a flag area "flag", and a wait time area "Twait" for each virtual path identifier VPI or virtual channel identifier VCI.

The cell transmission unit 267C is equipped with a capability for rewriting cell data as well as the capabilities equipped in the cell data extraction unit in the above described embodiment. That is, the header extraction unit 267A extracts a header of an arrived cell, and determines whether or not the arrived cell is a B-RM cell. If the arrived cell is a B-RM cell, the header extraction unit 267A extracts a payload of the B-RM cell by controlling the cell transmission unit 267C in a similar manner as in the above described embodiment. Then, the ACR operation unit 268A calculates an allowed cell rate ACR, and writes the calculated result to either of the ACR1 and the ACR2 in the parameter table 265C, according to the value of the flag area "flag". Then, a conversion from the allowed cell rate ACR into the minimum cell interval T0 is performed using the conversion table 269, and writes the minimum cell interval T0 to either of the T1 and T2 areas.

The ACR detection unit 273 extracts an allowed cell rate ACRt of an RM cell in a forward direction. The comparator 274 makes a comparison between the allowed cell rate ACRt and an allowed cell rate ACRu included in the parameter table 265C. In case ACRu>ACRt, a control signal is fed to the cell transmission unit 267C. The cell transmission unit 267C stores the minimum cell rate MCR in an ER field in the B-RM cell, and transmits that cell. At the same time, the cell transmission unit 267C controls the ACR operation unit 268A, etc., in order to replace the allowed cell rate ACRu in the parameter table 265C with the minimum cell rate MCR.

Thus, a transmission rate of a terminal is set to the minimum cell rate MCR, and also a monitor rate in the usage parameter control device is set to the minimum cell rate MCR. That is, the both rates become an identical cell rate. After that, raising and lowering operations of the cell rate are controlled depending on the existence/non-existence of a congestion state. Since the process of determining whether or not an arrived cell is a violation cell is the same as that in the above described embodiments, this explanation is omitted.

Figure 47:
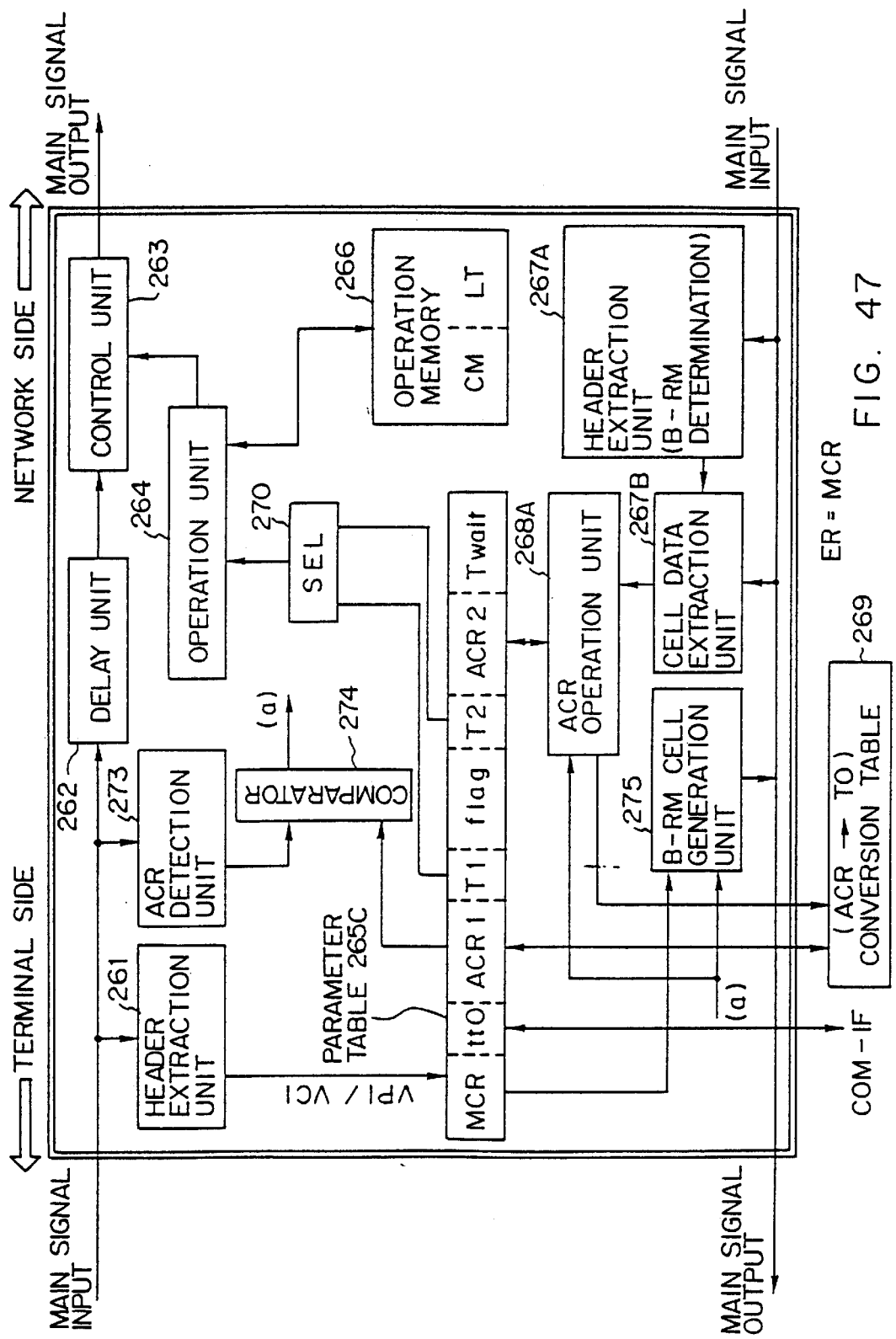
FIG. 47 is a block diagram showing a variation of the usage parameter control device according to the tenth embodiment of the present invention.

FIG. 47 is a block diagram showing a configuration of the usage parameter control device, according to the tenth embodiment. In this figure, the same reference numerals as those in FIGS. 45 and 46 indicate the same portions. 275 indicates a B-RM cell generation unit (backward resource management cell generation unit). In a similar manner as in the above described seventh embodiment, the comparator 274 makes a comparison between an allowed cell rate ACRt of an RM cell in a forward direction and an allowed cell rate ACRU included in the parameter table 265C. In case ACRu>ACRt, a control signal is fed to the ACR operation unit 268A and the B-RM cell generation unit 275.

The B-RM cell generation unit 275 generates a B-RM cell where the minimum cell rate MCR is stored in its ER field, and transmits the generated B-RM cell to a terminal. Additionally, the allowed cell rate ACRU in either the ACR1 area or the ACR2 area in the parameter table 265C is replaced with the minimum cell rate MCR by a control of the ACR operation unit 268A. The allowed cell rate ACRu is converted into the minimum cell interval T0 corresponding to the minimum cell rate MCR using the conversion table 269, and written to either of the T1 and T2 areas in the parameter table 265C. In this case, even if a cell in a backward direction has not yet arrived, the B-RM cell can be transmitted in order to change the terminal cell rate ACRt to the same minimum cell rate MCR as the allowed cell rate ACRu in the usage parameter control device.

Figure 48:
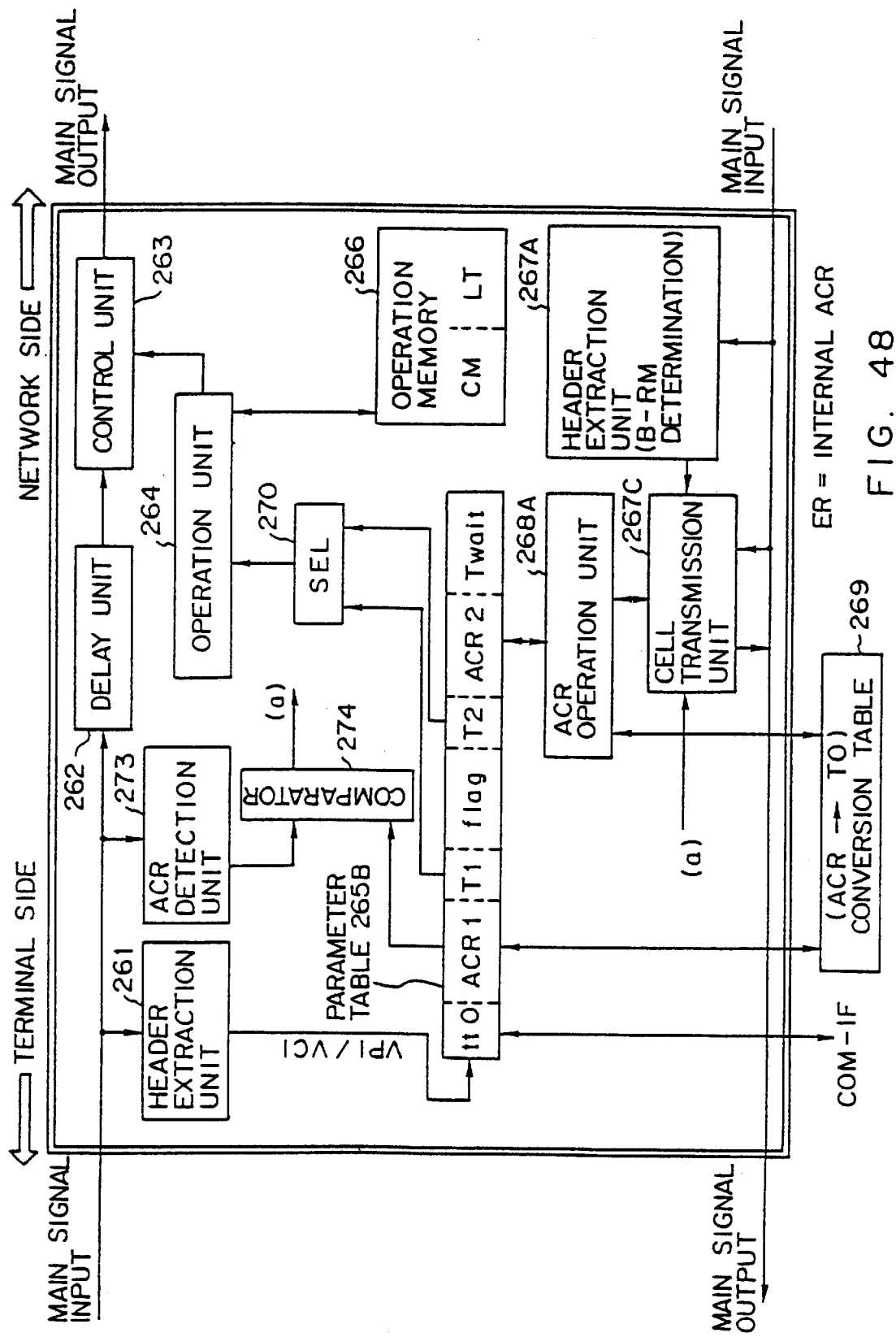
FIG. 48 is a block diagram showing a variation of the usage parameter control device according to the eleventh embodiment of the present invention.

FIG. 48 is a block diagram showing a configuration of the usage parameter control device, according to the eleventh embodiment. In this figure, the same reference numerals as those in FIGS. 45 and 46 indicate the same portions. In this embodiment, a comparator 274 makes a comparison between an allowed cell rate ACRt of an RM cell in a forward direction extracted by the ACR detection unit 273, and an allowed cell rate ACRu in the parameter table 265B. In case ACRu<ACRt, a control signal is fed to the cell transmission unit 267C.

The cell transmission unit 267C extracts data in a payload of an arrived B-RM cell, and transfers it to the ACR operation unit 268A. At the same time, the cell transmission unit 267C stores the allowed cell rate ACRu in the parameter table 265B in an ER field of the arrived B-RM cell, by the control signal from the comparator 274, and transmits the B-RM cell. Thus, the allowed cell rate of a terminal becomes the same as the allowed cell rate ACRu in the parameter table 265B, thereby equalizing the transmission rate and the monitor rate. The duplicate explanations provided in the above described embodiments are omitted.

Figure 49:
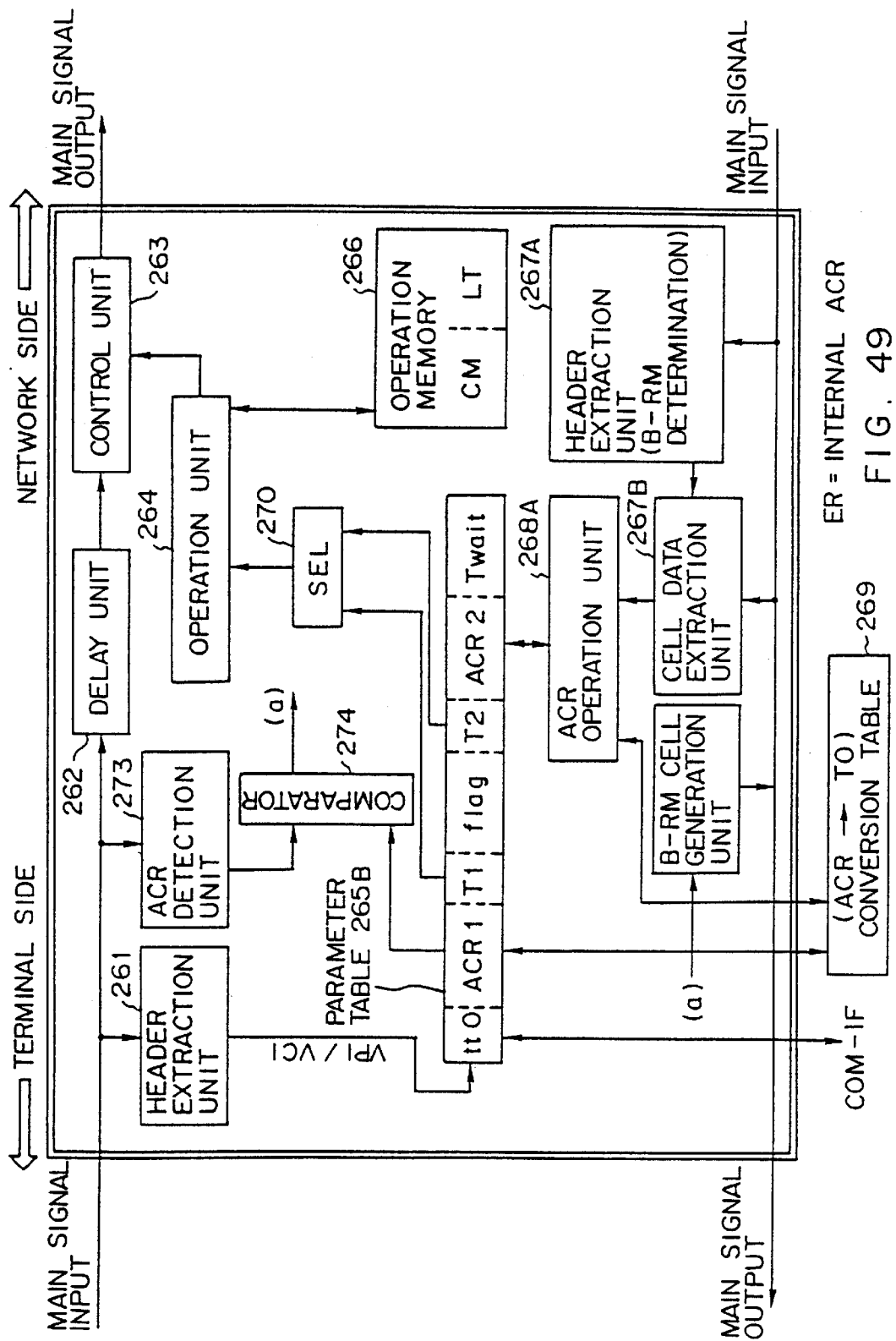
FIG. 49 is a block diagram showing a variation of the usage parameter control device according to the twelfth embodiment of the present invention.

FIG. 49 is a block diagram showing a configuration of the usage parameter control device, according to the twelfth embodiment. In this figure, the same reference numerals as those in FIGS. 47 and 48 indicate the same portions. In this embodiment, the comparator 274 makes a comparison between an allowed cell rate ACRt of an RM cell in a forward direction extracted by the ACR detection unit 273, and an allowed cell rate ACRu in the parameter table 265B. In case ACRu<ACRt, a control signal is fed to the B-RM cell generation unit 275.

The B-RM cell generation unit 275 generates a B-RM cell according to the control signal, stores the allowed cell rate ACRu in the parameter table 265B in an ER field of the generated B-RM cell, and transmits that cell. Accordingly, even if the B-RM cell does not arrive, the transmission rate of the terminal and the monitor rate can be equalized to the ACRu. The duplicate explanations provided in the above described embodiments are omitted.

Each of the above described embodiments are discussed by assuming an ABR communication service using an ATM network. The present invention, however, is not limited to the ABR service. This technique can be applied also to a device for monitoring an amount of data flowing into a network which transfers fixed-length packets.

According to the present invention, a plurality of usage parameter control units are arranged at an entry point of a network, a transfer rate determined by an ABR communication service is set in each of the plurality of usage parameter control mechanisms as a monitor parameter, so that a monitor operation can be changed depending on a use-state of the network. As a result, a flow of cells can be properly monitored for the ABR communication service.

Furthermore, two usage parameter control units are arranged in parallel at an entry point of a network. Since a monitor parameter to be used next is stored in one of the usage parameter control units while the other of the usage parameter control units performs a monitor operation, a flow of cells can be quickly controlled even for a monitor rate which varies often.

Furthermore, the present invention stores a passage time of a control cell in a backward direction (that is, a B-RM cell), compares a difference between the passage time and an arrival time of a user cell with delay standard values ($\tau 2$ and $\tau 3$), and controls a parameter change by a parameter switch control signal depending on a result of the comparison. This parameter change process is performed at the arrival time for the user cell. Since the user cells have not arrived at the same time. Therefore, the parameter change process need not be performed simultaneously for a plurality of connections.

In addition, since a passage time of a B-RM cell is stored for each connection, both the number of B-RM cell passage time registers and the number of user cell arrival time registers are 1. Compared with a delay control unit which obtains the maximum value $\tau 2$ and the minimum value $\tau 3$ of a delay control using, for example, a counter, the delay control unit according to the present invention can reduce a scale of a circuit.

For a parameter change, parameters written to at least two parameter areas can be switched by changing a flag. Even if a plurality of flags such as a valid area flag YF, a greatness/smallness flag DF, and a new parameter validity flag SF are arranged, all of them are flags of one bit. Therefore, operations such as an examination, an inversion, etc. performed for these flags are simple and only require a small amount of time, thereby stably performing a usage parameter control for an ATM cell transmitted at high speed.

Additionally, the delay standard minimum value $\tau 3$ and the delay standard maximum value $\tau 2$ are added to a passage time of a B-RM cell, and the added values are compared with an arrival time of user B-RM cell, so that the speed of the comparison process can be improved.

According to the present invention, it is determined whether or not an arrived cell in a forward direction is a violation cell, after a B-RM cell is received and a parameter is updated according to data included in its payload. Since a parameter can be updated dynamically, a flow of cells can be monitored in an ABR service. Even if an allowed cell rate ACRt on a terminal side is different from an allowed cell rate ACRu on a usage parameter control device side, these parameters can be modified to match. Therefore, the present invention offers a smooth ABR service.

What is claimed is:

1. A packet flow monitor and control system for monitoring a flow of fixed-length packets into a network routing fixed-length packets, comprising first usage parameter control means for setting a first monitor rate, and monitoring the flow of the fixed-length packets using the first monitor rate;

second usage parameter control means for setting a second monitor rate, and monitoring the flow of the fixed-length packets using the second monitor rate;

switch means for validating either of said first and second usage parameter control means to make it monitor the flow of fixed-length packets, entering the other of said usage parameter control means into a wait state, and alternately switching states of said first and second usage parameter control means between a valid state and the wait state;

setting means for receiving the monitor rate from the network, calculating a transfer rate of a fixed-length packet transmitted by a transmitting terminal, and setting a lower rate of the monitor rate and the transfer rate as a next monitor rate, in said first or second usage parameter control means in a wait state; and comparison means for making a comparison between the monitor rate set in said first or second usage parameter control means in a valid state, and the next monitor rate set by said setting means, wherein:

said switch means immediately switches the valid state and the wait state of said first and second usage parameter control means if the next monitor rate is higher than the monitor rate set in said first or second usage parameter control means in a valid state, and switches the valid state and the wait state of said first and second usage parameter control means after a predetermined time elapses if the next monitor rate is lower than the monitor rate set in said first or second usage parameter control means in a valid state.

2. A packet flow monitor and control system for monitoring a flow of fixed-length packets into a network routing fixed-length packets, comprising first usage parameter control means for setting a first monitor rate, and monitoring the flow of the fixed-length packets using the first monitor rate;

second usage parameter control means for setting a second monitor rate, and monitoring the flow of the fixed-length packets using the second monitor rate;

switch means for validating either of said first and second usage parameter control means to make it monitor the flow of fixed-length packets, entering the other of said usage parameter control means into a wait state, and alternately switching states of said first and second usage parameter control means between a valid state and the wait state;

setting means for receiving the monitor rate from the network, calculating the transfer rate of the fixed-length packet transmitted by the transmitting terminal, and setting a lower rate of the monitor rate and the transfer rate as the next monitor rate in said first or second usage parameter control means in a wait state;

first comparison means for making a comparison between the monitor rate set in said first or second usage parameter control means in a valid state and the next monitor rate set by said setting means; and second comparison means for making a comparison between the transmission rate of the transmitting terminal transferred from the transmitting terminal and the next monitor rate, wherein:

said switch means immediately switches the valid state and the wait state of said first and second parameter control means if the next monitor rate is higher than the monitor rate set in said first or second usage parameter control means in a valid state, and switches the valid state and the wait state of said first and second usage parameter control means when both of the rates match as a result of the comparison made by said second comparison means, if the next monitor rate is lower than the monitor rate set in said first or second usage parameter control means in a valid state.

3. A usage parameter control device for controlling a flow of user cells, comprising:

parameter storage means for storing a parameter changed according to information of a control cell for determining whether or not an arrived cell is a violation cell;

means for extracting the information of the control cell which is transmitted from a network and writing the information in said parameter storage means; and delay control means for storing a passage time of a control cell in a backward direction, obtaining a time from the passage of the control cell until an arrival of the user cell according to a difference between the passage time and the arrival time of the user cell, comparing the obtained time with a predetermined delay standard value, and controlling a change of the parameter stored in said parameter storage means.

4. The usage parameter control device as set forth in claim 3, wherein said delay control means comprises a passage time storage means for storing the passage time of the control cell for each connection.

5. The usage parameter control device as set forth in claim 3, wherein said delay control means compares the time obtained according to the difference between the passage time of the control cell and the arrival time of the user cell, with maximum and minimum values as delay standard values, and controlling the change of the parameter stored in said parameter storage means according to the comparison result of that, the time is smaller than the minimum value, the time is equal to or greater than the minimum value and equal to or smaller than the maximum value, and the time is greater than the maximum value.

6. The usage parameter control device as set forth in claim 3, wherein said delay control means comprises a delay standard value register where the delay standard values are set for each connection.

7. The usage parameter control device as set forth in claim 3, wherein said parameter storage means includes at least two parameter areas for storing the parameter and a valid area flag indicating a parameter area storing a parameter used for an operation, and switches the parameter areas storing the parameter used for the operation by changing the valid area flag.

8. The usage parameter control device as set forth in claim 3, wherein said parameter storage means controls a timing of a parameter change by referencing a greatness/smallness flag indicating a greatness/smallness relationship between a value of a parameter in a parameter area currently being used and a value of a parameter to be switched and used next.

9. A usage parameter control device for controlling a flow of user cells, comprising:
parameter storage means for storing a parameter for determining whether or not an arrived user cell is a violation cell, said parameter being changed according to information of a control cell;
means for extracting the information of the control cell which is transmitted from a network and writing the information in said parameter storage means; and
delay control means for controlling the change of the parameter stored in said parameter storage means, by storing a time obtained by adding a predetermined delay standard value to a passage time of the control cell in a backward direction and comparing the time with an arrival time of a user cell.

10. A usage parameter control device comprising;
a header extracting means for identifying a type of cell by extracting a header of an arrived cell;
a parameter table for storing at least parameters including a violation threshold value and a minimum cell interval;
an operation means for determining whether or not the arrived cell is a violation cell by referring to contents of said parameter table;
a control means for discarding the arrived cell if said operation means determines that the arrived cell is a violation cell;
reception extraction means for receiving and extracting a resource management cell in a backward direction;
parameter operation means for updating the contents of said parameter table according to contents of the resource management cell extracted by said reception extraction means; and
backward resource management cell transmission means for setting the allowed cell rate in said parameter table in the allowed cell rate field of the resource management cell in the backward direction, and transmitting the resource management cell, if the allowed cell rate set in the payload of the resource management cell in the forward direction is lower than the allowed cell rate written in said parameter table.

11. The usage parameter control device as set forth in claim 10, further comprising:
a conversion table for extracting an allowed cell rate set in the resource management cell in a backward direction, and obtaining a minimum cell interval based on the allowed cell rate.

12. The usage parameter control device as set forth in claim 10, wherein:
said parameter table includes areas for unupdated and updated parameters, and an area for time information for switching the areas of the unupdated and updated parameters; and
said operation means performs a calculation of whether or not the arrived cell is a violation cell by switching from the unupdated parameter to the updated parameter after a time according to the time information for switching the areas of the unupdated and updated parameters.

13. The usage parameter control device as set forth in claim 10, wherein:
said parameter table includes the areas of the unupdated and updated parameters; and said operation means immediately switches to the updated parameter if the parameter indicates a raising of a cell rate, and switches from the unupdated parameter to the updated parameter in order to perform the calculation of whether or not the arrived cell is a violation cell, after an elapse of a time according to the time information for switching the areas of the updated and unupdated parameters, if the parameter indicates a lowering of the cell rate.

14. The usage parameter control device according to claim 10, wherein the resource management cell in a backward direction is written to a memory in synchronization with a frame pulse in the backward direction, read from the memory in synchronization with a frame pulse in a forward direction, and supplied to said parameter operation means.

15. The usage parameter control device as set forth in claim 10, further comprising:
comparator for making a comparison between an allowed cell rate set in a payload of the resource management cell in the forward direction, and an allowed cell rate written to said parameter table, and determining a mismatch as an external fault if the allowed cell rates do not match, and transmitting an alarm.

16. A packet flow monitor and control system for monitoring a flow of fixed-length packets for a service varying an allowed transmission rate of each connection in a network depending on a use-state of the network routing fixed-length packets to which a priority can be assigned, comprising:
first usage parameter control means having a peak rate which is a maximum request band in a connection, for monitoring if the flow of fixed-length packets in the connection exceeds the peak rate; and
second usage parameter control means having an allowed rate which is an allowed transmission band in the connection, determined depending on the use-state of the network, for monitoring if the flow of fixed-length packets exceeds the allowed rate, wherein:
said second usage parameter control means comprises:
parameter storage means for storing a parameter, which is changed according to information of a control cell, for determining whether or not an arrived user cell is a violation cell; and
delay control means for storing a passage time of a control cell in a backward direction, obtaining a time from the passage of the control cell till an arrival of the user cell according to a difference between the passage time and the arrival time of the user cell, comparing the obtained time with a predetermined delay standard value, and controlling a change of the parameter stored in said parameter storage means.

17. A packet flow monitor and control system for monitoring a flow of fixed-length packets for a service varying an allowed transmission rate of each connection in a network depending on a use-state of the network routing fixed-length packets to which a priority can be assigned, comprising:
first usage parameter control means having an allowed rate which is an allowed transmission band in a connection, determined depending on the use-state of the network, for monitoring if the flow of fixed-length packets in the connection exceeds the allowed rate; and
second usage parameter control means having a minimum rate which is a minimum guarantee band in the connection, for monitoring if the flow of fixed-length packets exceeds the minimum rate, wherein:
said first usage parameter control means comprises:

parameter storage means for storing a parameter, which is changed according to information of a control cell, for determining whether or not an arrived user cell is a violation cell; and delay control means for storing a passage time of a control cell in a backward direction, obtaining a time from the passage of the control cell till an arrival of the user cell according to a difference between the passage time and the arrival time of the user cell, comparing the obtained time with a predetermined delay standard value, and controlling a change of the parameter stored in said parameter storage means.

18. A packet flow monitor and control system for monitoring a flow of fixed-length packets into a network routing the fixed-length packets, comprising first usage parameter control means for setting a first monitor rate, and monitoring the flow of fixed-length packets using the first monitor rate;

second usage parameter control means for setting a second monitor rate, and monitoring the flow of the fixed-length packets using the second monitor rate;

parameter storage means for storing a parameter, which is changed according to information of a control cell, for determining whether or not an arrived user cell is a violation cell; and delay control means for storing a passage time of a control cell in a backward direction, obtaining a time from the passage of the control cell till an arrival of the user cell according to a difference between the passage time and the arrival time of the user cell, comparing the obtained time with a predetermined delay standard value, controlling a change of the parameter stored in said parameter storage means, entering either of said first and second usage parameter control means into a valid state in order for it to monitor the flow of fixed-length packets, entering the other of said first and second usage parameter control means into a wait state, and entering said first and second parameter control means into valid and wait states in turn.

* * * * *